(12) United States Patent
McConnell et al.

(10) Patent No.: US 12,445,559 B1
(45) Date of Patent: Oct. 14, 2025

(54) SYSTEMS AND METHODS FOR MODIFYING CONTACT CENTER QUEUE ASSIGNMENTS

(71) Applicant: Intradiem, Inc., Marietta, GA (US)

(72) Inventors: Matthew Grady McConnell, Atlantic Beach, FL (US); Theodore Lango, Fort Lauderdale, FL (US); Kevin Wilson, Bradenton, FL (US); Michael Carl Jarus, Danielsville, GA (US); Harper Flores, Cleveland, TX (US); Christopher Powell Busbee, Marietta, GA (US); Ernest Foster, Roswell, GA (US); Naveen Thilagan, Atlanta, GA (US)

(73) Assignee: Intradiem, Inc., Marietta, GA (US)

( * ) Notice: Subject to any disclaimer, the term of this patent is extended or adjusted under 35 U.S.C. 154(b) by 0 days.

(21) Appl. No.: 19/005,906

(22) Filed: Dec. 30, 2024

Related U.S. Application Data

(60) Provisional application No. 63/704,717, filed on Oct. 8, 2024.

(51) Int. Cl.
*H04M 3/523* (2006.01)
(52) U.S. Cl.
CPC .............................. *H04M 3/5232* (2013.01)
(58) Field of Classification Search
None
See application file for complete search history.

(56) References Cited

U.S. PATENT DOCUMENTS

| | | | |
|---|---|---|---|
| 6,192,122 B1* | 2/2001 | Flockhart | H04M 3/5233 379/266.01 |
| 7,676,034 B1 | 3/2010 | Wu et al. | |

(Continued)

OTHER PUBLICATIONS

"Check staffing coverage," Calabrio, https://help.calabrio.com/doc/Content/quick-start-guides/wfm-team-leader/check-staffing-coverage.htm, accessed Dec. 20, 2024.
"Compare forecasted with actual volume," Calabrio, https://help.calabrio.com/doc/Content/user-guides/intraday/compare-forecasted-with-actual.htm, accessed Dec. 20, 2024.
"Compare predicted with actual service level," Calabrio, https://help.calabrio.com/doc/Content/user-guides/intraday/compare-predicted-actual-sl.htm, accessed Dec. 20, 2024.

(Continued)

*Primary Examiner* — Nafiz E Hoque
(74) *Attorney, Agent, or Firm* — GrowIP Law Group LLC

(57) ABSTRACT

A method, system, and article of manufacture for modifying a queue assignment for a contact center are provided. At least one computing device determines, by solving for constraints, at least one staffing change for at least one of the first queue or the second queue, using as inputs (a) first time-based service metrics, (b) second time-based service metrics, (c) data describing eligible staffing changes, and (d) at least one predetermined constraint. The at least one staffing change is a modification to the queue assignment of a subset of the computing device instances that is predicted to improve net staffing relating to service targets selected from (a) an average speed of answer (ASA) specifying an average time for one of the computing device instances to initiate handling of a particular task after the particular task has been assigned to the relevant queue and (b) a service level specifying a percentage of tasks for which handling is initiated within a specified time frame after the tasks are assigned to the queue. The at least one staffing change can be implemented by modifying the queue assignment of the subset of the computing device instances.

28 Claims, 39 Drawing Sheets

(56) References Cited

U.S. PATENT DOCUMENTS

| | | | |
|---|---|---|---|
| 8,175,254 B2 | 5/2012 | Li et al. | |
| 8,811,597 B1 * | 8/2014 | Hackbarth | G06Q 10/06393 |
| | | | 379/266.08 |
| 10,346,785 B2 | 7/2019 | Tamblyn et al. | |
| 10,440,181 B1 | 10/2019 | Brown et al. | |
| 10,491,748 B1 | 11/2019 | Wu et al. | |
| 10,623,233 B1 | 4/2020 | McConnell et al. | |
| 10,824,979 B1 | 11/2020 | Veloso et al. | |
| 10,833,916 B1 | 11/2020 | McConnell et al. | |
| 10,833,917 B1 | 11/2020 | McConnell et al. | |
| 11,075,794 B2 | 7/2021 | McConnell et al. | |
| 11,089,162 B1 | 8/2021 | Traba et al. | |
| 11,108,618 B2 | 8/2021 | Busbee et al. | |
| 11,228,479 B1 | 1/2022 | McConnell et al. | |
| 11,329,861 B2 | 5/2022 | Busbee et al. | |
| 11,356,316 B2 | 6/2022 | McConnell et al. | |
| 11,528,362 B1 | 12/2022 | Bhat et al. | |
| 11,601,322 B2 | 3/2023 | McConnell et al. | |
| 11,601,552 B2 | 3/2023 | Scodary et al. | |
| 11,665,044 B2 | 5/2023 | Busbee et al. | |
| 11,949,549 B2 | 4/2024 | Pahud et al. | |
| 12,074,754 B2 | 8/2024 | McConnell et al. | |
| 2020/0036588 A1 * | 1/2020 | Porter | H04L 41/0816 |
| 2022/0101220 A1 | 3/2022 | Wicaksono et al. | |
| 2023/0308340 A1 | 9/2023 | McConnell et al. | |
| 2025/0094230 A1 | 3/2025 | Ungar et al. | |
| 2025/0094910 A1 | 3/2025 | Kadu et al. | |
| 2025/0103979 A1 | 3/2025 | Gupta et al. | |

OTHER PUBLICATIONS

"Review intraday data by interval," Calabrio, https://help.calabrio.com/doc/Content/user-guides/intraday/review-intraday-by-interval.htm, accessed Dec. 20, 2024.

"Service Level and Agents Ready report," Calabrio, https://help.calabrio.com/doc/Content/user-guides/wfm-reports/report-service-level.htm, accessed Dec. 20, 2024.

"Understanding the result table parameters," Calabrio, https://help.calabrio.com/doc/Content/user-guides/schedules/about-result-table.htm, accessed Dec. 20, 2024.

"View staffing levels and actual need," Calabrio, https://help.calabrio.com/doc/Content/user-guides/intraday/view-staffing-actual-need.htm, accessed Dec. 20, 2024.

OptaPlanner User Guide, OptaPlanner, https://docs.optaplanner.org/latestFinal/optaplanner-docs/pdf/optaplanner-docs.pdf, accessed Dec. 14, 2023.

Pearce, "Erlang C Formula—Made Simple with an Easy Worked Example," https://www.callcentrehelper.com/erlang-c-formula-example-121281.htm, accessed on Oct. 7, 2024.

Qstory. How Intraday Automation Can Help Your Call Centre. Date unknown. www.qstory.co.uk, p. 1-8, United Kingdom.

Qstory. Real-Time Management: Gaining real efficiencies in your Contact Centre. Date unknown. p. 1-8; www. qstory.co.uk, United Kingdom.

* cited by examiner

| | | |
|---|---|---|
| Rules | QUEUE TARGETS | CONFIGURATION |
| Task Management ˅ | RECOMMENDATION STRATEGY | Allowed Recommendation Type * ▽  Add Queues Only | Queue Fill Strategy * ▽  Fill Greatest Need First ← 602 |
| Filters | | |
| Reports | | Requirements Model * ▽  Erlang-C | Requirements Buffer % ▽  50 ← 604 |
| Users | | |
| Queue Optimizer ˄ | USER FAIRNESS PREFERENCES | Max # Queues  Soft Limit | Hard Limit * ▽ |
| Settings | | Max # Recommendations Per Week  Soft Limit | Hard Limit * ▽ |
| Recommendations | | Max # Queue Changes Per Recommendation  Soft Limit | Hard Limit * ▽ ← 606 |
| | QUEUE QUALIFICATION CRITERIA | Min # Hours Assigned *  Within Last # Days * | |
| | RUN FREQUENCY | First: Daily Run Time *  09:00 AM ⏰ | Timezone * ▽ ← 608 |
| | | # Days Before First Monthly Recommendation * ▽ | |
| | | # Days Before First Quarterly Recommendation * ◁ | |
| | | Days of the week  Monday, Tuesday | |
| | | ☐ Select All  ☑ Monday  ☑ Tuesday  ☐ Wednesday  ☐ Thursday | |
| ⓘ Help | | | |
| ⏻ Log Out | | | |

SAVE

FIG. 6

RECOMMENDATIONS BY QUEUE | RECOMMENDATIONS BY USER

Last Refresh: 05/22/2024 07:15:00    Next Refresh: 05/22/2024 15:15:00

Filter: ALL Queues

| Instance ∨ | Queue # | Busines... | Target Type | Target | Run Rate | Actual | Current Net... | Proposed... | Users to A... | Users to R... |
|---|---|---|---|---|---|---|---|---|---|---|
| Avaya Node 3 | 301 | BU121 | ASA | 30 | 28 | 33 | -2 | +2 | 4 | |
| Avaya Node 3 | 302 | BU121 | ASA | 30 | 28 | 33 | -2 | +2 | 4 | |
| Avaya Node 3 | 303 | BU121 | Service Level | 80% | 83% | 77% | -4 | +2 | 6 | |
| Avaya Node 3 | 304 | BU121 | ASA | 35 | 25 | 30 | -4 | +2 | 6 | |
| Avaya Node 3 | 305 | BU121 | Service Level | 75% | 77% | 75% | -1 | +2 | 3 | |
| Avaya Node 3 | 306 | BU220 | ASA | 35 | 25 | 26 | -1 | +2 | 3 | |
| Avaya Node 3 | 307 | BU220 | ASA | 35 | 27 | 28 | -1 | +2 | 3 | 2 |
| Avaya Node 3 | 308 | BU220 | ASA | 25 | 28 | 22 | +4 | +2 | 8 | |
| Avaya Node 3 | 309 | BU220 | ASA | 25 | 19 | 28 | -10 | -2 | | 6 |
| Avaya Node 3 | 310 | BU220 | ASA | 25 | 27 | 22 | +8 | +2 | | 6 |
| Avaya Node 3 | 311 | BU220 | ASA | 30 | 27 | 22 | +8 | +2 | | |
| Avaya Node 3 | 312 | BU220 | ASA | 30 | 27 | 29 | -3 | +2 | 5 | |

Rows per page: 25 ▽    Page: 1 ▽    < >    981 items in 99 pages

Rules
Task Management >
Filters
Reports >
Users
Queue Optimizer ∧
  Settings
  Recommendations Help
Log Out

FIG. 10

| Field Name | Default Column? | Value Format | Definition |
|---|---|---|---|
| Instance | Yes | String | Comes from Queue Analysis Input |
| Queue # | Yes | String | Comes from Queue Analysis Input |
| Business Unit | Yes | String | Comes from Queue Analysis Input |
| Target Type | Yes | String | Comes from Queue Analysis Input |
| Target | Yes | Integer/Percent | Comes from Queue Analysis Input |
| Run Rate | Yes | Integer/Percent | Comes from Queue Analysis Input<br>• If Target Type = "ASA", then [Run Rate] = [ASA Daily Run Rate]<br>• If Target Type = "Service Level", then [Run Rate] = [SL Daily Run Rate] |
| Actual | Yes | Integer/Percent | Comes from Queue Analysis Input<br>• If Target Type = "ASA", then [Actual] = [ASA]<br>• If Target Type = "Service Level", then [Actual] = [SL] |
| Current Net Staff | Yes | Integer | Comes from Queue Analysis Input, [Net Staff]<br>• If [Net Staff] is Negative, then Font Should be Red<br>• If [Net Staff] is Positive, then Font Should be Green |

FIG. 11

| Field Name | Default Column? | Value Format | Definition |
|---|---|---|---|
| Proposed Net Staff | Yes | Integer | =[Net Staff] + [Users to Add] - [Users to Remove] |
| Users to Add | Yes | Integer | Comes from the Constraint Solver Results/Stored Application Data. For a Given Instance-Queue, this Should be the Count of Users that the System is Recommending be Added to a Queue (i.e., Change Type = "Add") for the Most Recent Recommendation Engine Execution. |
| Users to Remove | Yes | Integer | Comes from the Constraint Solver Results/Stored Application Data. For a Given Instance-Queue, this Should be the Count of Users that the System is Recommending be Removed from a Queue (i.e., Change Type = "Remove") for the Most Recent Recommendation Engine Execution. |
| Priority | No | String | Comes from Queue Analysis Input |
| Missed Target Strategy | No | String | Comes from Queue Analysis Input |
| Has Penalty | No | Yes/No | Comes from Queue Analysis Input |

FIG. 11
(Continued)

RECOMMENDATIONS BY QUEUE | RECOMMENDATIONS BY USER

Last Refresh: 05/22/2024 07:15:00    Next Refresh: 05/22/2024 15:15:00

Filter: ALL Queues

- Rules
- Task Management >
- Filters
- Reports >
- Users
- Queue Optimizer ∧
  - Settings
  - Recommendations

| First Name | Last Name | Login | Busines... | Location | Reports TO | Instance | Cross-Ref ID | # Queues A... | # Queues R... | Status |
|---|---|---|---|---|---|---|---|---|---|---|
| Sarah | Davidson | Login1 | BU121 | Loc A | Name 1 | Avaya Node 3 | 81c860dd-2686 | 2 | 1 | Accepted |
| Sarah | Davidson | Login1 | BU121 | Loc A | Name 1 | Avaya Node 3 | 81c860dd-2686 | 2 | 1 | Accepted |
| Sarah | Davidson | Login1 | BU121 | Loc A | Name 1 | Avaya Node 3 | 81c860dd-2686 | - | 1 | Accepted |
| Sarah | Davidson | Login1 | BU121 | Loc A | Name 1 | Avaya Node 3 | 81c860dd-2686 | - | 3 | Rejected |
| Sarah | Davidson | Login1 | BU121 | Loc A | Name 1 | Avaya Node 3 | 81c860dd-2686 | - | 2 | Rejected |
| Sarah | Davidson | Login1 | BU220 | Loc A | Name 1 | Avaya Node 3 | 81c860dd-2686 | - | 1 | Rejected |
| Sarah | Davidson | Login1 | BU220 | Loc A | Name 1 | Avaya Node 3 | 81c860dd-2686 | - | 1 | Accepted |
| Sarah | Davidson | Login1 | BU220 | Loc A | Name 1 | Avaya Node 3 | 81c860dd-2686 | - | 1 | Accepted |
| Sarah | Davidson | Login1 | BU220 | Loc A | Name 1 | Avaya Node 3 | 81c860dd-2686 | - | 1 | Accepted |
| Sarah | Davidson | Login1 | BU220 | Loc A | Name 1 | Avaya Node 3 | 81c860dd-2686 | - | 1 | |
| Sarah | Davidson | Login1 | BU220 | Loc A | Name 1 | Avaya Node 3 | 81c860dd-2686 | - | 1 | |
| Sarah | Davidson | Login1 | BU220 | Loc A | Name 1 | Avaya Node 3 | 81c860dd-2686 | - | 1 | |

Rows per page: 25    Page: 1    < >    981 items in 99 pages

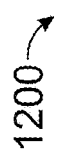
- Help
- Log Out

FIG. 12

| Field Name | Default Column? | Value Format | Definition |
|---|---|---|---|
| Login | Yes | String | |
| Last Name | Yes | String | |
| First Name | Yes | String | |
| Business Unit | Yes | String | |
| Location | Yes | String | |
| Reports to | Yes | String | |
| Instance | Yes | String | The Instance User was Logged Into at the Time of the Recommendation Execution |
| Cross-Reference ID | Yes | String | The Corresponding Cross-Reference ID to the Instance that User was Logged into at the Time of the Recommendation Execution |
| # Queues Added | Yes | Integer | Comes from the Constraint Solver Results/Stored Application Data. For a Given User, this Should be the Count of Queues that the System is Recommending be Added to the User (i.e., Change Type = "Add") for the Most Recent Recommendation Engine Execution. |
| # Queues Removed | Yes | Integer | Comes from the Constraint Solver Results/Stored Application Data. For a Given User, this Should be the Count of Queues that the System is Recommending be Removed from the User (i.e., Change Type = "Remove") for the Most Recent Recommendation Engine Execution. |

| Field Name | Default Column? | Value Format | Definition |
|---|---|---|---|
| Status | Yes | String | • Blank<br>  ○ Status in the UI will be Blank Whenever the [Status] = "Pending" in the User-to-Queue Change Recommendations Table (See Section 4.2) for All user-to-Queue Changes Being Recommended for a Given User.<br>  ○ That is, if the User Only has a Single Recommendation for a given Execution Instance, and [Status] = "Pending" then Status in the UI will be Blank. Likewise, if the User has Three Recommendations for a Given Execution Instance, then Status in the UI will be Blank so Long as [Status] = "Pending" for all Three Recommendations.<br>• "Accepted"<br>  ○ Status in the UI will be "Accepted" so Long as at Least One of the Recommendations for the User in a Given Execution Instance is Accepted(See Section 4.3.2.5).<br>  ○ So, If a User has a Recommendation to Add Two Queues and Remove One, But the Customer Only Chooses to Accept Adding One Queue and Rejects the Two Other Recommendations, then Status in the UI will Still be "Accepted." |

FIG. 13
(Continued)

| Field Name | Default Column? | Value Format | Definition |
|---|---|---|---|
| | | | • "Rejected"<br>  ○ Status in the UI will be "Rejected" If the Customer Chooses to Reject All Recommendations for the User in a Given Execution Instance. |
| Processed By | No | String | • This is the Login ID of the User who Processed the Set of Recommendations by Either Accepting/ Rejecting the Recommended Changes. |
| Processed Date/Time | No | Date/ Time | • Timestamp of When the Set of Recommendations was Accepted/Rejected. |
| ** All Other Custom User Attributes Should be Available in the Column Selector** | No | Varies | |

FIG. 13
(Continued)

QUEUES TO MODIFY

User Name: Last, First  Instance: Avaya Node 3
Login: login  Cross-Ref ID: 7f2aef34-cef6-4df6

QUEUES TO ADD

| ☐ QUEUE # | Queue Name | Priority Level |
|---|---|---|
| ☐ 301 | El_301_East123_WOE | 1 |

QUEUES TO REMOVE

| ☐ Queue # | Queue Name |
|---|---|
| ☐ 302 | El_302_East123_WOE |
| ☐ 302 | El_302_East123_WOE |

CANCEL   REJECT ALL   ACCEPT SELECTED

FIG. 14

| Field | Format | Notes |
|---|---|---|
| Year/Month | YYYY/MM | |
| # Active Queues | #,### | Similar to [# Active Users], this is the Number of Queues Configured in Queue Targets with Status = "Active" |
| # Queues Receiving Recommendation | #,### | The Number of Unique Queues that Received at Least One Recommendation During the Date Range Selected |
| % Queues Receiving Recommendation | #,##% | [# Queues Receiving Recommendation] / [# Active Queues] |
| # Active Users | #,### | |
| # Users Receiving Recommendation | #,### | The Number of Unique Users that Received at Least One Recommendation During the Date Range Selected |
| % Users Receiving Recommendation | #,##% | [# Users Receiving Recommendation] / [# Active Users] |
| # Queue Optimizer Recommendations | #,### | Total Number of User-to-Queue Change Recommendations for the Date Range Selected |
| # Queue Optimizer Recommendations Accepted | #,### | Total Number of User-to-Queue Change Recommendations for the Date Range Selected with [Status] = "Accepted" |
| Queue Optimizer Recommendations Accept Rate | #,##% | [#Queue Optimizer Recommendations Accepted] / [# Queue Optimizer Recommendations] |

FIG. 15

| Field | Format | Notes |
|---|---|---|
| # Queue Optimizer Recommendations Rejected | #,### | Total Number of User-to-Queue Change Recommendations for the Date Range Selected with [Status] = "Rejected" |
| Queue Optimizer Recommendations Reject Rate | #.##% | [# Queue Optimizer Recommendations Rejected] / [# Queue Optimizer Recommendations] |
| # Queue Optimizer Recommendations Ignored | #,### | Total Number of User-to-Queue Change Recommendations for the Date Range Selected with [Status] = "Ignored" |
| Queue Optimizer Recommendations Ignore Rate | #.##% | [# Queue Optimizer Recommendations Ignored] / [# Queue Optimizer Recommendations] |
| # Queue Optimizer Add Recommendations | #,### | Total Number of User-to-Queue Change Recommendations for the Date Range Selected with [Change Type] = "Add" |
| # Queue Optimizer Add Recommendations Accepted | #,### | Total Number of User-to-Queue Change Recommendations for the Date Range Selected with [Change Type] = "Add" and [Status] = "Accepted" |
| Queue Optimizer Add Recommendation Accept Rate | #.##% | [# Queue Optimizer Add Recommendations Accepted] / [# Queue Optimizer Add Recommendations] |

FIG. 15
(Continued)

| Field | Format | Notes |
|---|---|---|
| # Queue Optimizer Add Recommendations Rejected | #,### | Total Number of User-to-Queue Change Recommendations for the Date Range Selected with [Change Type] = "Add" and [Status] = "Rejected" |
| Queues Optimizer Add Recommendation Reject Rate | #.##% | [# Queue Optimizer Add Recommendations Rejected] / [# Queue Optimizer Add Recommendations] |
| # Queue Optimizer Add Recommendations Ignored | #,### | Total Number of User-to-Queue Change Recommendations for the Date Range Selected with [Change Type] = "Add" and [Status] = "Ignored" |
| Queue Optimizer Add Recommendations Ignore Rate | #.##% | [# Queue Optimizer Add Recommendations Ignored] / [# Queue Optimizer Add Recommendations] |
| # Queue Optimizer Remove Recommendations | #,### | Total Number of User-to-Queue Change Recommendations for the Date Range Selected with [Change Type] = "Remove" |
| # Queue Optimizer Remove Recommendations Accepted | #,### | Total Number of User-to-Queue Change Recommendations for the Date Range Selected with [Change Type] = "Remove" and [Status] = "Accepted" |

FIG. 15
(Continued)

| Field | Format | Notes |
|---|---|---|
| Queue Optimizer Remove Recommendation Accept Rate | #,##% | [# Queue Optimizer Remove Recommendations Accepted] / [# Queue Optimizer Remove Recommendations] |
| # Queue Optimizer Remove Recommendations Rejected | #,### | Total Number of User-to-Queue Change Recommendations for the Date Range Selected with [Change Type] = "Remove" and [Status] = "Rejected" |
| Queue Optimizer Remove Recommendation Reject Rate | #,##% | [# Queue Optimizer Remove Recommendations Rejected] / [# Queue Optimizer Remove Recommendations] |
| # Queue Optimizer Remove Recommendations Ignored | #,### | Total Number of User-to-Queue Change Recommendations for the Date Range Selected with [Change Type] = "Remove" and [Status] = "Ignored" |
| Queue Optimizer Remove Recommendation Ignore Rate | #,##% | [# Queue Optimizer Remove Recommendations Ignored] / [# Queue Optimizer Remove Recommendations] |

FIG. 15
(Continued)

| Field | Format | Notes |
|---|---|---|
| Year/Month | YYYY/MM | |
| Business Unit | String | |
| # Active Queues | #,### | Similar to [# Active Users], this is the Number of Queues Configured in Queue Targets with Status = "Active" |
| # Queues Receiving Recommendation | #,### | The Number of Unique Queues that Received at Least One Recommendation During the Date Range Selected |
| % Queues Receiving Recommendation | #,##% | [# Queues Receiving Recommendation] / [# Active Queues] |
| # Active Users | #,### | |
| # Users Receiving Recommendation | #,### | The Number of Unique Users that Received at Least One Recommendation During the Date Range Selected |
| % Users Receiving Recommendation | #,##% | [# Users Receiving Recommendation] / [# Active Users] |
| # Queue Optimizer Recommendations | #,### | Total Number of User-to-Queue Change Recommendations for the Date Range Selected |
| # Queue Optimizer Recommendations Accepted | #,### | Total Number of User-to-Queue Change Recommendations for the Date Range Selected with [Status] = "Accepted" |

FIG. 16

| Field | Format | Notes |
|---|---|---|
| Queue Optimizer Recommendations Accept Rate | #,##% | [# Queue Optimizer Recommendations Accepted] / [# Queue Optimizer Recommendations] |
| # Queue Optimizer Recommendations Rejected | #,### | Total Number of User-to-Queue Change Recommendations for the Date Range Selected with [Status] = "Rejected" |
| Queue Optimizer Recommendations Reject Rate | #,##% | [# Queue Optimizer Recommendations Rejected] / [# Queue Optimizer Recommendations] |
| # Queue Optimizer Recommendations Ignored | #,### | Total Number of User-to-Queue Change Recommendations for the Date Range Selected with [Status] = "Ignored" |
| Queue Optimizer Recommendations Ignore Rate | #,##% | [# Queue Optimizer Recommendations Ignored] / [# Queue Optimizer Recommendations] |
| # Queue Optimizer Add Recommendations | #,### | Total Number of User-to-Queue Change Recommendations for the Date Range Selected with [Change Type] = "Add" |
| # Queue Optimizer Add Recommendations Accepted | #,### | Total Number of User-to-Queue Change Recommendations for the Date Range Selected with [Change Type] = "Add" and [Status] = "Accepted" |

FIG. 16
(Continued)

| Field | Format | Notes |
|---|---|---|
| Queue Optimizer Add Recommendation Accept Rate | #,##% | [# Queue Optimizer Add Recommendations Accepted] / [# Queue Optimizer Add Recommendations] |
| # Queue Optimizer Add Recommendations Rejected | #,### | Total Number of User-to-Queue Change Recommendations for the Date Range Selected with [Change Type] = "Add" and [Status] = "Rejected" |
| Queue Optimizer Add Recommendation Reject Rate | #,##% | [# Queue Optimizer Add Recommendations Rejected] / [# Queue Optimizer Add Recommendations] |
| # Queue Optimizer Add Recommendations Ignored | #,### | Total Number of User-to-Queue Change Recommendations for the Date Range Selected with [Change Type] = "Add" and [Status] = "Ignored" |
| Queue Optimizer Add Recommendation Ignore Rate | #,##% | [# Queue Optimizer Add Recommendations Ignored] / [# Queue Optimizer Add Recommendations] |
| # Queue Optimizer Remove Recommendations | #,### | Total Number of User-to-Queue Change Recommendations for the Date Range Selected with [Change Type] = "Remove" |
| # Queue Optimizer Remove Recommendations Accepted | #,### | Total Number of User-to-Queue Change Recommendations for the Date Range Selected with [Change Type] = "Remove" and [Status] = "Accepted" |

FIG. 16
(Continued)

| Field | Format | Notes |
|---|---|---|
| Queue Optimizer Remove Recommendation Accept Rate | #,##% | [# Queue Optimizer Remove Recommendations Accepted] / [# Queue Optimizer Remove Recommendations] |
| # Queue Optimizer Remove Recommendations Rejected | #,### | Total Number of User-to-Queue Change Recommendations for the Date Range Selected with [Change Type] = "Remove" and [Status] = "Rejected" |
| Queue Optimizer Remove Recommendation Reject Rate | #,##% | [# Queue Optimizer Remove Recommendations Rejected] / [# Queue Optimizer Remove Recommendations] |
| # Queue Optimizer Remove Recommendations Ignored | #,### | Total Number of User-to-Queue Change Recommendations for the Date Range Selected with [Change Type] = "Remove" and [Status] = "Ignored" |
| Queue Optimizer Remove Recommendation Ignore Rate | #,##% | [# Queue Optimizer Remove Recommendations Ignored] / [# Queue Optimizer Remove Recommendations] |

FIG. 16 (Continued)

| Field | Format | Notes |
|---|---|---|
| ACD Instance | | |
| Queue # | | |
| Business Unit | | |
| # Queue Optimizer Recommendations | #,### | Total Number of User-to-Queue Change Recommendations for the Date Range Selected |
| # Queue Optimizer Recommendations Accepted | #,### | Total Number of User-to-Queue Change Recommendations for the Date Range Selected with [Status] = "Accepted" |
| Queue Optimizer Recommendations Accept Rate | #.##% | [# Queue Optimizer Recommendations Accepted] / [# Queue Optimizer Recommendations] |
| # Queue Optimizer Recommendations Rejected | #,### | Total Number of User-to-Queue Change Recommendations for the Date Range Selected with [Status] = "Rejected" |
| Queue Optimizer Recommendations Reject Rate | #.##% | [# Queue Optimizer Recommendations Rejected] / [# Queue Optimizer Recommendations] |
| # Queue Optimizer Recommendations Ignored | #,### | Total Number of User-to-Queue Change Recommendations for the date Range Selected with [Status] = "Ignored" |
| Queue Optimizer Recommendations Ignore Rate | #.##% | [# Queue Optimizer Recommendations Ignored] / [# Queue Optimizer Recommendations] |

FIG. 17

| Field | Format | Notes |
|---|---|---|
| # Queue Optimizer Add Recommendations | #,### | Total Number of User-to-Queue Change Recommendations for the Date Range Selected with [Change Type] = "Add" |
| # Queue Optimizer Add Recommendations Accepted | #,### | Total Number of User-to-Queue Change Recommendations for the Date Range Selected with [Change Type] = "Add" and [Status] = "Accepted" |
| Queue Optimizer Add Recommendation Accept Rate | #,##% | [# Queue Optimizer Add Recommendations Accepted] / [# Queue Optimizer Add Recommendations] |
| # Queue Optimizer Add Recommendations Rejected | #,### | Total Number of User-to-Queue Change Recommendations for the Date Range Selected with [Change Type] = "Add" and [Status] = "Rejected" |
| Queue Optimizer Add Recommendation Reject Rate | #,##% | [# Queue Optimizer Add Recommendations Rejected] / [# Queue Optimizer Add Recommendations] |
| # Queue Optimizer Add Recommendations Ignored | #,### | Total Number of User-to-Queue Change Recommendations for the Date Range Selected with [Change Type] = "Add" and [Status] = "Ignored" |
| Queue Optimizer Add Recommendation Ignore Rate | #,##% | [# Queue Optimizer Add Recommendations Ignored] / [# Queue Optimizer Add Recommendations] |
| # Queue Optimizer Remove Recommendations | #,### | Total Number of User-to-Queue Change Recommendations for the Date Range Selected with [Change Type] = "Remove" |

FIG. 17
(Continued)

| Field | Format | Notes |
|---|---|---|
| # Queue Optimizer Remove Recommendations Accepted | #,### | Total Number of User-to-Queue Change Recommendations for the Date Range Selected with [Change Type] = "Remove" and [Status] = "Accepted" |
| Queue Optimizer Remove Recommendation Accept Rate | #.##% | [# Queue Optimizer Remove Recommendations Accepted] / [# Queue Optimizer Remove Recommendations] |
| # Queue Optimizer Remove Recommendations Rejected | #,### | Total Number of User-to-Queue Change Recommendations for the Date Range Selected with [Change Type] = "Remove" and [Status] = "Rejected" |
| Queue Optimizer Remove Recommendation Reject Rate | #.##% | [# Queue Optimizer Remove Recommendations Rejected] / [# Queue Optimizer Remove Recommendations] |
| # Queue Optimizer Remove Recommendations Ignored | #,### | Total Number of User-to-Queue Change Recommendations for the Date Range Selected with [Change Type] = "Remove" and [Status] = "Ignored" |
| Queue Optimizer Remove Recommendation Ignore Rate | #.##% | [# Queue Optimizer Remove Recommendations Ignored] / [# Queue Optimizer Remove Recommendations] |

FIG. 17
(Continued)

| Field | Format | Notes |
|---|---|---|
| ACD Instance | string | |
| Queue # | string | |
| Business Unit | string | |
| Date Time Recommended | YYYY-MM-DD HH:MM | Date Time of Each Execution Instance of the Recommendation Engine for a Given Queue |
| # Recommendations | #,### | Total Number of User-Queue Change Recommendations for Each Execution Instance |
| # Recommendations Accepted | #,### | Total Number of User-Queue Change Recommendations for Each Execution Instance with [Status] = "Accepted" |
| # Recommendations Rejected | #,### | Total Number of User-Queue Change Recommendations for Each Execution Instance with [Status] = "Rejected" |
| # Recommendations Ignored | #,### | Total Number of User-Queue Change Recommendations for Each Execution Instance with [Status] = "Ignored" |
| # Add User Recommendations | #,### | Total Number of User-Queue Change Recommendations for Each Execution Instance with [Change Type] = "Add" |
| # Add User Recommendations Accepted | #,### | Total Number of User-Queue Change Recommendations for Each Execution Instance with [Change Type] = "Add" and [Status] = "Accepted" |

FIG. 18

| Field | Format | Notes |
|---|---|---|
| # Add User Recommendations Rejected | #,### | Total Number of User-Queue Change Recommendations for Each Execution Instance with [Change Type] = "Add" and [Status] = "Rejected" |
| # Add User Recommendations Ignored | #,### | Total Number of User-Queue Change Recommendations for Each Execution Instance with [Change Type] = "Add" and [Status] = "Ignored" |
| # Remove User Recommendations | #,### | Total Number of User-Queue Change Recommendations for Each Execution Instance with [Change Type] = "Remove" |
| # Remove User Recommendations Accepted | #,### | Total Number of User-Queue Change Recommendations for Each Execution Instance with [Change Type] = "Remove" and [Status] = "Accepted" |
| # Remove User Recommendations Rejected | #,### | Total Number of User-Queue Change Recommendations for Each Execution Instance with [Change Type] = "Remove" and [Status] = "Rejected" |
| # Remove User Recommendations Ignored | #,### | Total Number of User-Queue Change Recommendations for Each Execution Instance with [Change Type] = "Remove" and [Status] = "Ignored" |

FIG. 18
(Continued)

| Field | Format | Notes |
|---|---|---|
| User Name | | |
| Login | | |
| Reports to | | |
| Business Unit | | |
| Location | | |
| # Queue Optimizer Recommendations | #,### | Total Number of User-to-Queue Change Recommendations for the Date Range Selected |
| # Queue Optimizer Recommendations Accepted | #,### | Total Number of User-to-Queue Change Recommendations for the Date Range Selected with [Status] = "Accepted" |
| Queue Optimizer Recommendations Accept Rate | #,##% | [# Queue Optimizer Recommendations Accepted] / [# Queue Optimizer Recommendations] |
| # Queue Optimizer Recommendations Rejected | #,### | Total Number of User-to-Queue Change Recommendations for the Date Range Selected with [Status] = "Rejected" |

FIG. 19

| Field | Format | Notes |
|---|---|---|
| Queue Optimizer Recommendations Reject Rate | #,##% | [# Queue Optimizer Recommendations Rejected] / [# Queue Optimizer Recommendations] |
| # Queue Optimizer Recommendations Ignored | #,### | Total Number of User-to-Queue Change Recommendations for the Date Range Selected with [Status] = "Ignored" |
| Queue Optimizer Recommendations Ignore Rate | #,##% | [# Queue Optimizer Recommendations Ignored] / [# Queue Optimizer Recommendations] |
| # Queue Optimizer Add Recommendations | #,### | Total Number of User-to-Queue Change Recommendations for the Date Range Selected with [Change Type] = "Add" |
| # Queue Optimizer Add Recommendations Accepted | #,### | Total Number of User-to-Queue Change Recommendations for the Date Range Selected with [Change Type] = "Add" and [Status] = "Accepted" |
| Queue Optimizer Add Recommendation Accept Rate | #,##% | [# Queue Optimizer Add Recommendations Accepted] / [# Queue Optimizer Add Recommendations] |
| # Queue Optimizer Add Recommendations Rejected | #,### | Total Number of User-to-Queue Change Recommendations for the Date Range Selected with [Change Type] = "Add" and [Status] = "Rejected" |

FIG. 19
(Continued)

| Field | Format | Notes |
|---|---|---|
| Queue Optimizer Add Recommendation Reject Rate | #,##% | [# Queue Optimizer Add Recommendations Rejected] / [# Queue Optimizer Add Recommendations] |
| # Queue Optimizer Add Recommendations Ignored | #,### | Total Number of User-to-Queue Change Recommendations for the Date Range Selected with [Change Type] = "Add" and [Status] = "Ignored" |
| Queue Optimizer Add Recommendation Ignore Rate | #,##% | [# Queue Optimizer Add Recommendations Ignored] / [# Queue Optimizer Add Recommendations] |
| # Queue Optimizer Remove Recommendations | #,### | Total Number of User-to-Queue Change Recommendations for the Date Range Selected with [Change Type] = "Remove" |
| # Queue Optimizer Remove Recommendations Accepted | #,### | Total Number of User-to-Queue Change Recommendations for the Date Range Selected with [Change Type] = "Remove" and [Status] = "Accepted" |
| Queue Optimizer Remove Recommendation Accept Rate | #,##% | [# Queue Optimizer Remove Recommendations Accepted] / [# Queue Optimizer Remove Recommendations] |

FIG. 19
(Continued)

| Field | Format | Notes |
|---|---|---|
| # Queue Optimizer Remove Recommendations Rejected | #,### | Total Number of User-to-Queue Change Recommendations for the Date Range Selected with [Change Type] = "Remove" and [Status] = "Rejected" |
| Queue Optimizer Remove Recommendation Reject Rate | #,###% | [#Queue Optimizer Remove Recommendations Rejected] / [# Queue Optimizer Remove Recommendations] |
| # Queue Optimizer Remove Recommendations Ignored | #,### | Total Number of User-to-Queue Change Recommendations for the Date Range Selected with [Change Type] = "Remove" and [Status] = "Ignored" |
| Queue Optimizer Remove Recommendation Ignore Rate | #,###% | [#Queue Optimizer Remove Recommendations Ignored] / [# Queue Optimizer Remove Recommendations] |

FIG. 19
(Continued)

| Field | Format | Notes |
|---|---|---|
| User Name | String | |
| Login | String | |
| Reports To | String | |
| Business Unit | String | |
| Location | String | |
| Date Time Recommended | YYYY-MM-DD HH:MM | |
| ACD Instance | String | |
| Queue # | String | |
| Change Type | String | |
| Status | String | |
| Processed By | String | |

FIG. 20

SYSTEMS AND METHODS FOR MODIFYING CONTACT CENTER QUEUE ASSIGNMENTS

CROSS-REFERENCE TO RELATED APPLICATIONS

This patent application claims the benefit of and incorporates by reference, for all purposes, U.S. Provisional Application No. 63/704,717, filed Oct. 8, 2024. This application also incorporates by reference, for all purposes, the disclosures of the following: U.S. Patent Application Publication No. 20230308340 and U.S. Pat. Nos. 12,074,754, 11,949,549, 11,665,044, 11,601,322, 11,329,861, 11,228,479, 11,356,316, 11,108,618, 11,075,794, 10,833,917, 10,833,916, and 10,623,233.

BACKGROUND

Contact centers face challenges in managing human and AI resources to meet operational, strategic, and/or contractual needs and/or targets for task completion. For example, contact centers often face difficulties in managing contact center operations, due, in part, to the large numbers of tasks (e.g., customer communications) and resources (e.g., human agents, chat bots, etc.) involved. Current Automated Call Distribution (ACD) technologies, although robust and complex, do not always align with the strategic queue targets of the contact center. While some ACD technologies involve various forms of skills-based routing, they lack the ability to make real-time or near-real-time adjustments to meet long-term business and contractual requirements, such as service-level compliance for a specified time period, such as a day, month, quarter, or year. Typical ACDs are dealing with the real-time need to route a call without having a long-term understanding of how a routing decision will impact strategic queue targets, which are typically measured over a set period of time, such as a day, month, quarter, or year.

In some cases, queue targets are the result of performance guarantees, which are commitments made to clients-typically within B2B sectors such as financial services, insurance, and healthcare—that a certain level of service (such as answering 80% of calls within 30 seconds) will be met over a specified period. These guarantees are often backed by substantial financial penalties for non-compliance, potentially reaching millions of dollars.

In addition to contact centers, other network entities associated with enterprises in a variety of industries face similar challenges. For example, back-office operations in many industries must strategically apportion tasks among back-office workers in a way that aligns with operational, strategic, and/or contractual needs and/or targets. While a back-office case management system can perform basic routing, such a system will typically have no understanding of how a routing decision will impact any strategic task-handling targets, which, as with contact centers, may be measured over a period of time, for example.

Thus, there is a need for improved systems and methods for modifying contact center queue assignments.

SUMMARY

In a first example embodiment, a computer-implemented method for modifying a queue assignment for a contact center is provided. The method includes (a) receiving, at a first time instance, by at least one computing device, first queue data associated with at least two queues including a first queue and a second queue, the first queue data maintained by an automated call distribution (ACD) server, the at least two queues each comprising an ordering of respective tasks to be handled at computing device instances associated with the contact center, and the computing device instances each having a respective queue assignment to one or more of the at least two queues to handle the respective tasks of each of the at least two queues; (b) storing, by the at least one computing device, in a storage device accessible by the at least one computing device, the first queue data; (c) receiving, at a second time instance, by the at least one computing device, second queue data associated with the at least two queues, the second queue data maintained by the ACD server and relating to a time duration spanning between the first time instance and the second time instance; (d) storing, by the at least one computing device, in the storage device accessible by the at least one computing device, the second queue data; (e) determining, by the at least one computing device, from the first queue data and the second queue data, first time-based service metrics associated with the first queue and second time-based service metrics associated with the second queue; (f) determining, by the at least one computing device, from the first time-based service metrics and a first time-based service target associated with the first queue, a first net staffing attribute indicating a first staffing surplus or shortage of the first queue relative to the first time-based service target for a predetermined first service target time period, wherein the first time-based service target is selected from the group consisting of a first average speed of answer (ASA) specifying an average time for one of the computing device instances to initiate handling of a particular task after the particular task has been assigned to the first queue and a first service level specifying a percentage of tasks for which handling is initiated within a specified time frame after the tasks are assigned to the first queue; (g) determining, by the at least one computing device, from the second time-based service metrics and a second time-based service target associated with the second queue, a second net staffing attribute indicating a second staffing surplus or shortage of the second queue relative to the second time-based service target for a predetermined second service target time period, wherein the second time-based service target is selected from the group consisting of a second average speed of answer (ASA) specifying an average time for one of the computing device instances to initiate handling of a particular task after the particular task has been assigned to the second queue and a second service level specifying a percentage of tasks for which handling is initiated within a specified time frame after the tasks are assigned to the second queue; (h) determining, by the at least one computing device, using as inputs the first time-based service metrics, the second time-based service metrics, data describing eligible staffing changes, and at least one predetermined constraint, at least one staffing change for at least one of the first queue or the second queue, wherein the at least one staffing change is a modification to the queue assignment of a subset of the computing device instances that is predicted to improve at least one of the first net staffing attribute or the second net staffing attribute; and (i) implementing, by the at least one computing device, the at least one staffing change by modifying the queue assignment of the subset of the computing device instances.

In a second example embodiment, a system for modifying a queue assignment for a contact center is provided. The system includes one or more hardware processors on one or more computing devices, the processors configured to execute instructions stored on at least one non-transitory computer readable medium to perform tasks that include: (a) receiving, at a first time instance, by at least one computing device, first queue data associated with at least two queues including a first queue and a second queue, the first queue data maintained by an automated call distribution (ACD) server, the at least two queues each comprising an ordering of respective tasks to be handled at computing device instances associated with the contact center, and the computing device instances each having a respective queue assignment to one or more of the at least two queues to handle the respective tasks of each of the at least two queues; (b) storing, by the at least one computing device, in a storage device accessible by the at least one computing device, the first queue data; (c) receiving, at a second time instance, by the at least one computing device, second queue data associated with the at least two queues, the second queue data maintained by the ACD server and relating to a time duration spanning between the first time instance and the second time instance; (d) storing, by the at least one computing device, in the storage device accessible by the at least one computing device, the second queue data; (e) determining, by the at least one computing device, from the first queue data and the second queue data, first time-based service metrics associated with the first queue and second time-based service metrics associated with the second queue; (f) determining, by the at least one computing device, from the first time-based service metrics and a first time-based service target associated with the first queue, a first net staffing attribute indicating a first staffing surplus or shortage of the first queue relative to the first time-based service target for a predetermined first service target time period, wherein the first time-based service target is selected from the group consisting of a first average speed of answer (ASA) specifying an average time for one of the computing device instances to initiate handling of a particular task after the particular task has been assigned to the first queue and a first service level specifying a percentage of tasks for which handling is initiated within a specified time frame after the tasks are assigned to the first queue; (g) determining, by the at least one computing device, from the second time-based service metrics and a second time-based service target associated with the second queue, a second net staffing attribute indicating a second staffing surplus or shortage of the second queue relative to the second time-based service target for a predetermined second service target time period, wherein the second time-based service target is selected from the group consisting of a second average speed of answer (ASA) specifying an average time for one of the computing device instances to initiate handling of a particular task after the particular task has been assigned to the second queue and a second service level specifying a percentage of tasks for which handling is initiated within a specified time frame after the tasks are assigned to the second queue; (h) determining, by the at least one computing device, using as inputs the first time-based service metrics, the second time-based service metrics, data describing eligible staffing changes, and at least one predetermined constraint, at least one staffing change for at least one of the first queue or the second queue, wherein the at least one staffing change is a modification to the queue assignment of a subset of the computing device instances that is predicted to improve at least one of the first net staffing attribute or the second net staffing attribute; and (i) implementing, by the at least one computing device, the at least one staffing change by modifying the queue assignment of the subset of the computing device instances.

In a third example embodiment, an article of manufacture including a non-transitory computer-readable medium is provided. The non-transitory medium has stored thereon program instructions that, upon execution by one or more hardware processors, cause the one or more processors to perform tasks that include: (a) receiving, at a first time instance, by at least one computing device, first queue data associated with at least two queues including a first queue and a second queue, the first queue data maintained by an automated call distribution (ACD) server, the at least two queues each comprising an ordering of respective tasks to be handled at computing device instances associated with the contact center, and the computing device instances each having a respective queue assignment to one or more of the at least two queues to handle the respective tasks of each of the at least two queues; (b) storing, by the at least one computing device, in a storage device accessible by the at least one computing device, the first queue data; (c) receiving, at a second time instance, by the at least one computing device, second queue data associated with the at least two queues, the second queue data maintained by the ACD server and relating to a time duration spanning between the first time instance and the second time instance; (d) storing, by the at least one computing device, in the storage device accessible by the at least one computing device, the second queue data; (e) determining, by the at least one computing device, from the first queue data and the second queue data, first time-based service metrics associated with the first queue and second time-based service metrics associated with the second queue; (f) determining, by the at least one computing device, from the first time-based service metrics and a first time-based service target associated with the first queue, a first net staffing attribute indicating a first staffing surplus or shortage of the first queue relative to the first time-based service target for a predetermined first service target time period, wherein the first time-based service target is selected from the group consisting of a first average speed of answer (ASA) specifying an average time for one of the computing device instances to initiate handling of a particular task after the particular task has been assigned to the first queue and a first service level specifying a percentage of tasks for which handling is initiated within a specified time frame after the tasks are assigned to the first queue; (g) determining, by the at least one computing device, from the second time-based service metrics and a second time-based service target associated with the second queue, a second net staffing attribute indicating a second staffing surplus or shortage of the second queue relative to the second time-based service target for a predetermined second service target time period, wherein the second time-based service target is selected from the group consisting of a second average speed of answer (ASA) specifying an average time for one of the computing device instances to initiate handling of a particular task after the particular task has been assigned to the second queue and a second service level specifying a percentage of tasks for which handling is initiated within a specified time frame after the tasks are assigned to the second queue; (h) determining, by the at least one computing device, using as inputs the first time-based service metrics, the second time-based service metrics, data describing eligible staffing changes, and at least one predetermined constraint, at least one staffing change for at least one of the first queue or the second queue, wherein the at least one staffing change is a modification to the queue assignment of a subset of the computing device instances that is predicted to improve at least one of the first net staffing attribute or the second net staffing attribute; and (i)

implementing, by the at least one computing device, the at least one staffing change by modifying the queue assignment of the subset of the computing device instances.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 5 is a simplified screen shot diagram illustrating a queue targets settings grid, according to an example embodiment.

FIG. 6 is a simplified screen shot diagram illustrating a form for constraint configuration, according to an example embodiment.

FIG. 10 is a simplified screen shot diagram illustrating a grid showing recommendations by queue, according to an example embodiment.

FIG. 11 is a simplified table showing information regarding columns that may be included in the recommendations by queue of FIG. 10, according to an example embodiment.

FIG. 12 is a simplified screen shot diagram illustrating a grid showing recommendations by computing device instance, according to an example embodiment.

FIG. 13 is a simplified table showing information regarding columns that may be included in the recommendations by computing device instance of FIG. 12, according to an example embodiment. according to an example embodiment.

FIG. 14 is a simplified screen shot diagram illustrating a "queues to modify" interface window, according to an example embodiment.

FIG. 15 illustrates information relating to an enterprise queue optimizer activity summary report, according to an example embodiment.

FIG. 16 illustrates information relating to an enterprise queue optimizer activity detail report, according to an example embodiment.

FIG. 17 illustrates information relating to an individual queue recommendation summary report, according to an example embodiment.

FIG. 18 illustrates information relating to an individual queue recommendation detail report, according to an example embodiment.

FIG. 19 illustrates information relating to an individual user recommendation summary report, according to an example embodiment.

FIG. 20 illustrates information relating to an individual user recommendation detail report, according to an example embodiment.

DETAILED DESCRIPTION

Figure 1:
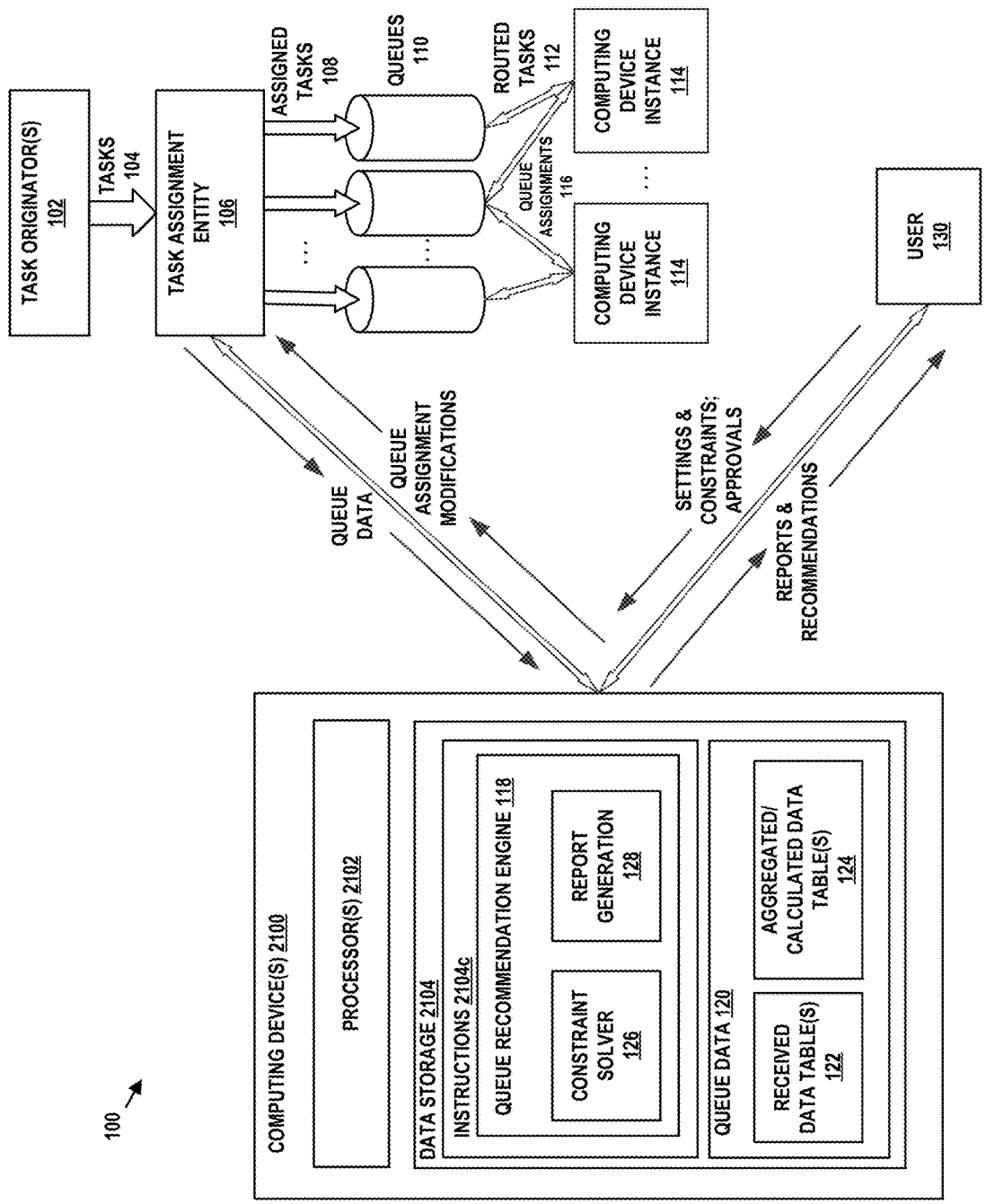
FIG. 1 is a simplified block diagram illustrating a task handling environment in which a system and method for determining queue assignment modifications may be provided, according to an example embodiment.

Example methods, systems, and associated articles of manufacture are described herein. It should be understood that the word "example" is used herein to mean "serving as an example, instance, or illustration." Any embodiment or feature described herein as being an "example" is not necessarily to be construed as preferred or advantageous over other embodiments or features unless stated as such. Thus, other embodiments can be utilized, and other changes can be made, without departing from the scope of the subject matter presented herein. For instance, some example embodiments are implemented entirely at an enterprise network, perhaps using inputs from one or more third-party or in-house (i.e., administered by the enterprise) servers, such as ACD servers, workforce management (WFM) servers, and/or back-office case system servers. However, other example embodiments are implemented as a management network operating in cooperation with or on behalf of an enterprise network, the management network having one or more persistent, periodic, or sporadic communicative connections to one or more servers administered or operated by the management network, the enterprise network, and/or a third party. Moreover, example embodiments may involve one or more entities that are physically co-located or remotely located from one another. Finally, example embodiments may involve one or more entities that are operated and/or administered by a single enterprise or group of related enterprises.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Finally, while many of the examples are described in the context of a content center receiving and handling communications from customers, with examples having quarterly or monthly time periods, the inventive concepts described herein also apply to other contexts involving a multitude of tasks to be handled by a limited (but large number of, such as hundreds or thousands) of resources, with targets measured over a variety of time periods, such as daily, monthly, quarterly, and/or yearly. The entities, data, and calculations can be analogized across various contexts based on the concepts set forth in the accompanying description and drawings to satisfy analogous settings, constraints, and target strategies.

I. Overview

Example embodiments set forth herein include a system having a queue recommendation engine to assist an enterprise in achieving short-term and long-term performance guarantees. The queue recommendation engine determines tactical staffing changes using various metrics and constraints in order to allocate resources (humans and/or bots) in a way that is both grounded and directed by defined queue targets. Example embodiments of the disclosed system may advantageously (a) allow enterprises to define queue-level business objectives (i.e., queue targets), along with queue qualification criteria and user eligibility criteria; (b) describe enhanced data (i.e., relevant queue-level statistics) to be provided by ACD servers; (c) store and leverage this enhanced ACD data to ultimately predict and calculate staffing requirements needed per queue in order to meet defined queue targets; (d) determine staffing changes using a constraint solver such that customers can define different strategies and necessary limitations when generating staffing changes, such as queue change recommendations; and/or (e) provide an insightful graphical user interface (GUI) to enterprise users for reviewing and assessing determined staffing changes, such as queue change recommendations, among others.

II. Contact Centers

Many enterprises utilize contact centers to provide customer service and other front-office functions. Such contact centers frequently have hundreds, thousands, or tens of thousands of contact center agents, in the form of human or AI-based resources (i.e., bots). Enterprises typically utilize one or more software solutions via their associated enterprise networks in order to help manage human and AI-based resources associated with their contact centers. Such software solutions may involve customer communications, resource (e.g., human agent) scheduling and/or updating, and others. Additionally, some enterprises may also utilize a management network (their own management network or one administered by a third party) to assist in managing customer communications, resource scheduling and/or updates, and other related items by interfacing with other software solutions and/or with computing device instances. Such a management network may allow the enterprise to define rules having associated triggers, conditions, and actions. U.S. Pat. No. 10,623,233, assigned to Intradiem, Inc., assignee of the present application, is one of several such patents that describe such a management network and its functions relative to an enterprise and its network, in order to improve operational efficiency and effectiveness of the enterprise in how tasks are handled by contact center resources. While such a management network can be adapted as described herein to perform queue assignment modifications on behalf of an enterprise's contact center, the present technology is not limited to implementation at a management network. Other example embodiments of the system and method set forth herein may be implemented directly in the enterprise (e.g., at a computing device on the enterprise's network), at or by a third-party ACD server, WFM server, back-office case system server, or as part of another computer-implemented product or service offering associated with an entity able to communicate data to and from the enterprise network.

The present description uses the term "computing device instances" to refer to computerized task-handling resources in the form of (1) computing devices utilizing AI (e.g., utilizing one or more AI or machine learning (ML) models, such as large language models (LLMs)) or executing software instructions to serve as bots (e.g., chat bots) and/or (2) computing devices having a logged-in human user (e.g., human agents logged-in to computing devices). In the latter case (a computing device having a logged-in human user), the present description treats the computing device instance as assuming any enterprise-related parameters associated with the logged-in human, such as any biographical information (e.g., IDs), schedules, associations (e.g., queue associations), skills, qualifications, metrics, history, or other information associated with the logged-in human. This allows for staffing changes to be determined and/or implemented via commands, requests, and instructions that are communicated between computing devices as computer-readable instructions and/or data without the need for human involvement, according to some example embodiments. Thus, while a human user might review and/or approve a recommended staffing change, and a logged-in human ultimately might be affected by a computer-implemented staffing change, example embodiments of the system set forth herein provide for more efficient real-time or near-real-time queue assignment determinations and modifications that are not presently feasible with legacy software solutions.

III. Example Queue Recommendation System

Example embodiments set forth herein relate to a system having a queue recommendation engine to modify queue assignments on behalf of a contact center or other task-handling system. The system may include or may be operated, managed, and/or monitored by one or more networked or standalone computing devices or servers or server clusters, examples and details of which are described below with reference to FIGS. 21 and 22. Each such computing device may include one or more hardware processors, each having one or more processing cores, executing computer-readable instructions stored on a local or network-accessible non-transitory data storage medium. For example, the system may include a processor to receive data (e.g., queue data) for use in determining staffing changes, such as recommended modifications to contact center queue assignments. The networked entities described in this section each comprise one or more such computing devices, possibly in combination with other devices, such as storage devices, and others.

Queue Assignment Modifications in a Generic Task Handling Environment

FIG. 1 is a simplified block diagram illustrating a task handling environment 100 in which a system and method for determining queue assignment modifications may be provided, according to an example embodiment. The task handling environment 100 includes one or more task originators 102 that originate tasks 104 to be handled by a multiplicity (e.g., hundreds or thousands) of computing device instances 114. The tasks 104 are assigned by a task assignment entity 106 to one of a plurality of queues 110 in which the tasks 104, now assigned tasks 108, reside (e.g., in a first-in-first-out (FIFO) manner) until acted upon or otherwise handled by one of the computing device instances 114, which are each associated to one or more of the queues 110 via queue assignments 116. The queue assignments 116 are maintained by the task assignment entity 106 to cause each of the assigned tasks 108 to be routed from one of the queues 110 (as a routed task 112) for handling by a respective one of the computing device instances 114 having a corresponding queue assignment 116.

The environment 100 also includes one or more computing devices 2100 (see FIG. 21 and accompanying description) having at least a processor 2102 and data storage 2104 to serve as an example embodiment of a system for determining queue assignment modifications relating to the computing device instances 114 and queues 110. The data storage 2104 includes computer-readable instructions 2104c that, when executed by the processor 2102, cause the computing device 2100 operate as a queue recommendation engine 118. The queue recommendation engine 118, which is essentially a programmed computing device, receives queue data from the task assignment entity 106, as shown, for storage in the data storage 2104 as stored queue data 120. The received and stored queue data 120 may include information such as a number of tasks offered during a most recent time interval, a number of tasks for which handling was initiated and/or completed during a most recent time interval, a service level percentage (e.g., percentage of tasks for which handling was initiated or completed within a specified amount of time) during a most recent time interval, an average time for task handling to be initiated during a most recent time interval, and/or other queue-related data. The stored queue data 120 may include one or more data structures, such as a received data table(s) structure 122 and an aggregated/calculated data table(s) structure 124. The received data table(s) structure 122 may, for example, include raw queue data over a number of recent intervals (e.g., 30-minute intervals) while the aggregated/calculated data table(s) 124 may, for example, include queue data derived from the raw queue data, such as by aggregating queue data over multiple intervals, such as over a day, and/or by calculating more advanced queue data metrics from the raw and/or aggregated queue data.

The queue recommendation engine 118 includes a constraint solver module 126, which may be implemented as one or more software libraries or code consisting of computer-readable instructions stored on the data storage 2104 of the computing device. The constraint solver 126 may include or utilize one or more artificial intelligence optimization algorithms (e.g., Tabu Search, Simulated Annealing, Late Acceptance, and other metaheuristics) with score calculation and other constraint solving techniques for NP-complete or NP-hard problems. OptaPlanner™, available at https://www.optaplanner.org/ (accessed Oct. 7, 2024), is one example of an open source constraint solver. Other constraint solvers may alternatively be used.

According to an example embodiment, the queue recommendation engine 118 coordinates and/or causes (a) receipt of the queue data from the task assignment entity 106, (b) storage and processing of the received data into the received data table(s) 122 and/or aggregated/calculated data table(s) 124, and (c) obtaining settings and constraints relating to the queue assignment modifications, such as from a user 130 associated with the computing device instances 114, queues 110 and/or other device or entity. The received settings and constraints are stored in the data storage 2104 and are used by the queue recommendation engine 118 in conjunction with the constraint solver 126 to determine a recommended staffing change according to the applicable settings and constraints (including the received settings and constraints) and the queue data 120 from the received data table(s) 122 and aggregated/calculated data table(s) 124. If the constraint solver 126 of the queue recommendation engine 118 is able to calculate a valid solution (i.e., a queue assignment modification that satisfies constraints and settings), then the queue recommendation engine 118 can implement the queue assignment modifications by directly or indirectly communicating the queue assignment modifications to the task assignment entity 106, as shown. In some example embodiments, the queue assignment modifications are first provided as recommended queue assignments to the user 130, for review and/or approval, as shown. The queue recommendation engine 118 includes a report generation module 128 for generating reports for viewing by the user 130, for example.

The example embodiment described above in the context of a task handling environment 100 may be applied to a variety of different task handling environments, including but not limited to contact centers, back-office processing entities, parcel delivery entities, patient intake facilities, form intake entities, and other enterprises having a multiplicity of assignable resources (e.g., human or computerized task handling instances) for taking action with respect to a large quantity of tasks (e.g., communications, forms, patients, etc.) originating from one or more task originators, such as customers, patients, clients, and other entities. The queue recommendation engine 118 set forth in FIG. 1 and its applicability to a wide variety of task handling environments will become clearer by analogizing other environments to an enterprise's contact center environment, as described in other figures and accompanying description herein.

Queue Assignment Modifications in a Contact Center Environment

Figure 2:
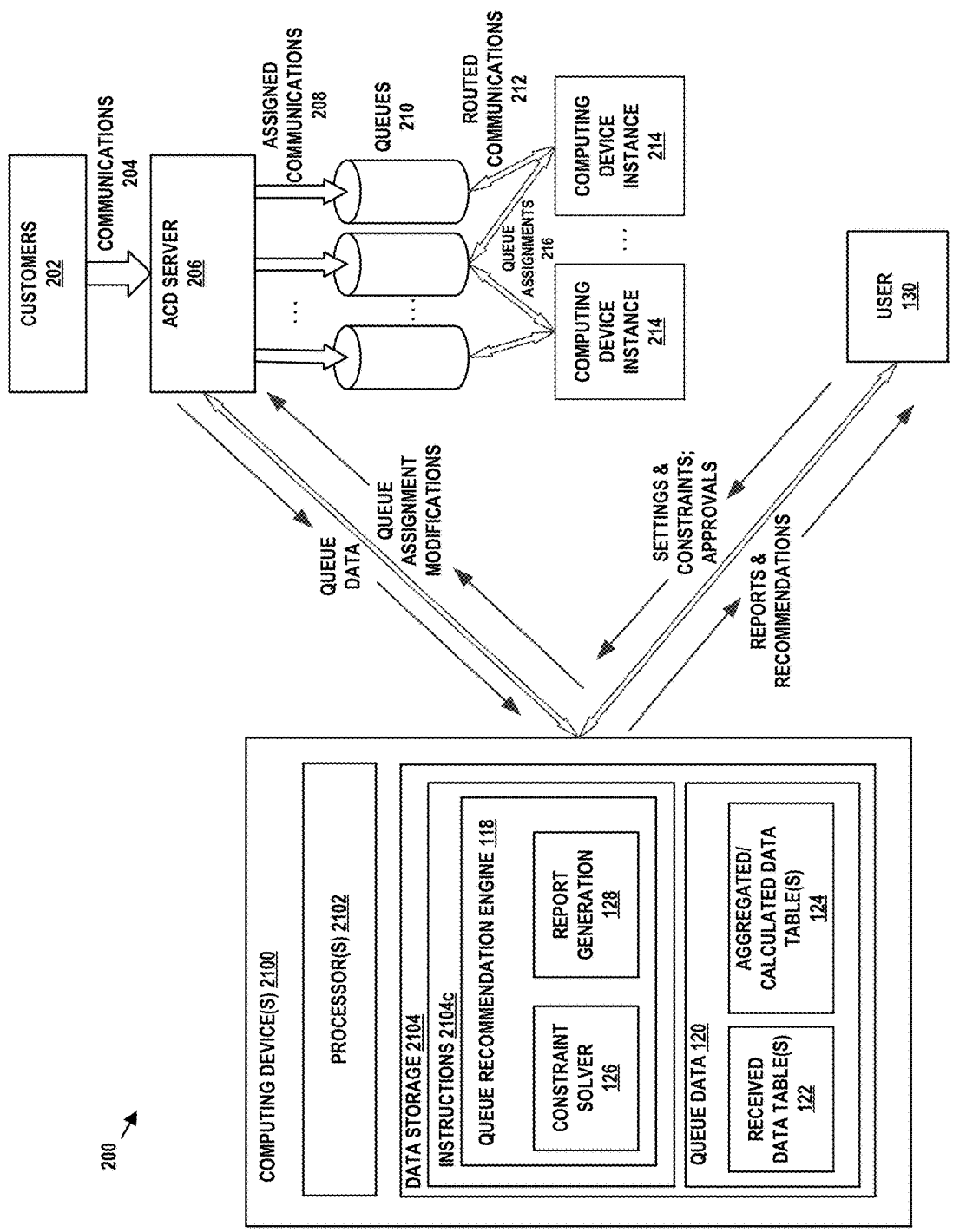
FIG. 2 is a simplified block diagram illustrating a contact center environment in which a system and method for determining queue assignment modifications may be provided, according to an example embodiment.

FIG. 2 is a simplified block diagram illustrating a contact center environment 200 in which a system and method for determining queue assignment modifications may be provided, according to an example embodiment. FIG. 2 generally uses like reference numerals as FIG. 1 for like components. The contact center environment 200 includes a multiplicity (e.g., hundreds, thousands, or more) of customers 202 initiating communications 204, such as by placing customer service calls, into the contact center. The communications 204 are each assigned by an ACD server 206 (or several such ACD servers) to one of a plurality of queues 210 in which the communications 204, now assigned communications 208, reside (e.g., wait, in an on-hold or callback state, in a first-in-first-out (FIFO) manner) until answered or otherwise handled by one of the computing device instances 214 (e.g., human agents logged-into computing devices or bots), which are each associated to one or more of the queues 210 via queue assignments 216. The queue assignments 216 are maintained by the ACD server 206 to cause each of the assigned communications 208 to be routed from one of the queues 210 (as a routed communication 212) to be handled by (i.e., answered and resolved or attempted to be resolved) a respective one of the computing device instances 214 having a corresponding queue assignment 216.

The contact center environment 200 also includes one or more computing devices 2100 like the one described with respect to the environment 100, with the same or similar components, which are numbered identically and provide the same or similar functionality (perhaps in addition to other functionality related to a contact center), according to an example embodiment. In the contact center environment 200, the queue recommendation engine 118 receives queue data from the ACD server 206, as shown, for storage in the data storage 2104 as stored queue data 120. The received and stored queue data may include information such as a number of communications offered to computing device instances during a most recent time interval, a number of tasks for which handling was initiated and/or completed by computing device instances during a most recent time interval, a service level percentage (e.g., percentage of communications 204 answered (e.g., calls answered) within a specified amount of time) during a most recent time interval, an average time for communications 204 to be answered (e.g., calls answered) during a most recent time interval, and other queue-related data.

According to an example embodiment, the queue recommendation engine 118 coordinates and/or causes (a) receipt of the queue data from the ACD server 206, (b) storage and processing of the received queue data into the received data table(s) 122 and/or aggregated/calculated data table(s) 124, and (c) obtaining settings and constraints relating to the queue assignment modifications, such as from the user 130 associated with the computing device instances 214, queues 210, and/or other device or entity. The received settings and constraints (which, as discussed elsewhere, may relate to queue targets, queue eligibility, fairness preferences, and/or others) are stored in the data storage 2104 and are used by the queue recommendation engine 118 in conjunction with the constraint solver 126 to determine a staffing change (e.g., a recommended queue assignment modification) according to the applicable settings and constraints (including the received settings and constraints) and the queue data 120 from the received data table(s) 122 and aggregated/calculated data table(s) 124. If the constraint solver 126 of the queue recommendation engine 118 is able to calculate a valid solution (i.e., a queue assignment modification that satisfies constraints and settings), then the queue recommendation engine 118 can implement the queue assignment modifications by directly or indirectly communicating the queue assignment modifications to the ACD server 206, as shown, such as via an API request. In some example embodiments, the queue assignment modifications are first provided as recommended queue assignments to the user 130, for example, for review and/or approval.

Figure 3A:
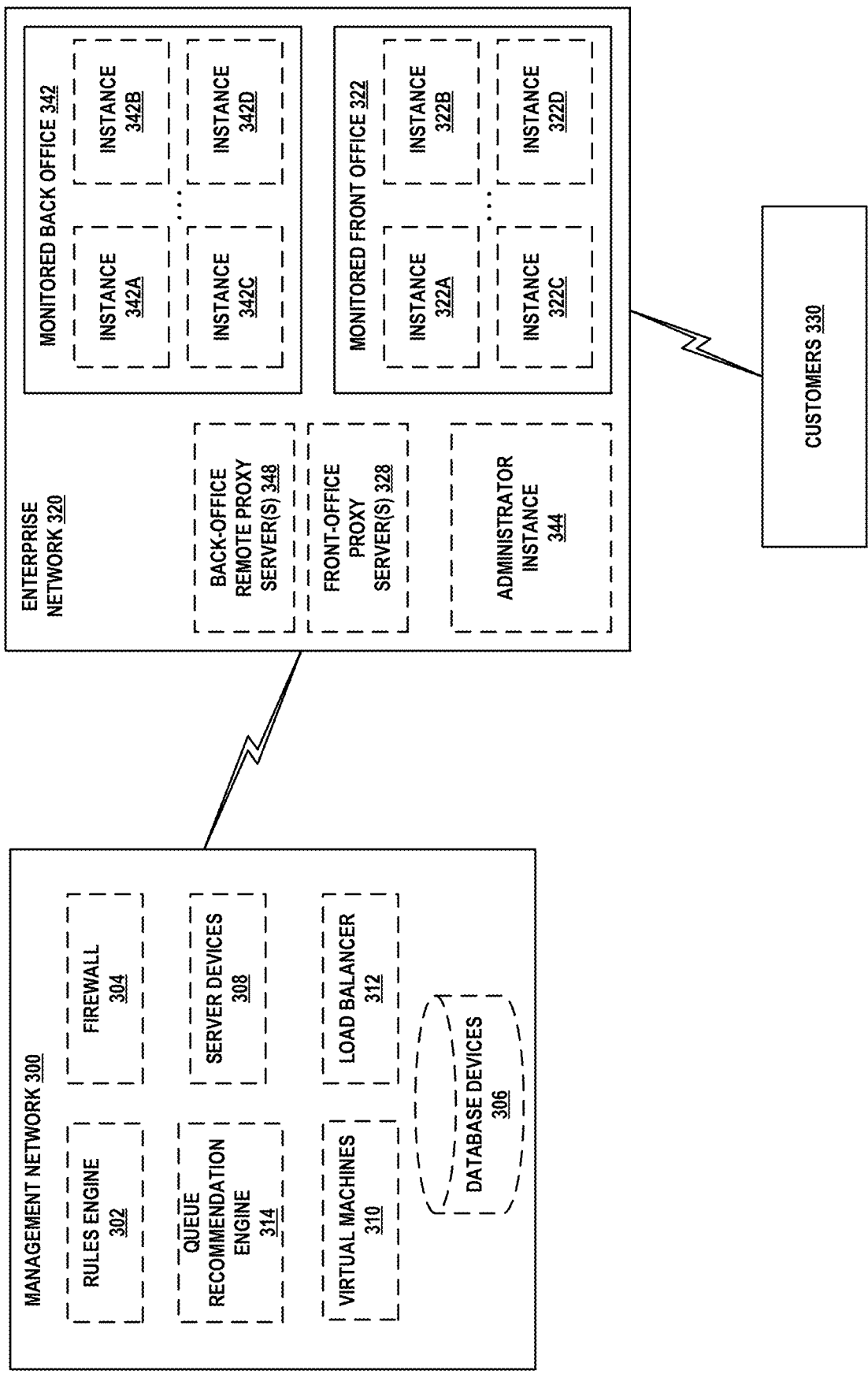
FIG. 3A is a block diagram illustrating a network architecture, according to an example embodiment utilizing a management network.
Figure 3B:
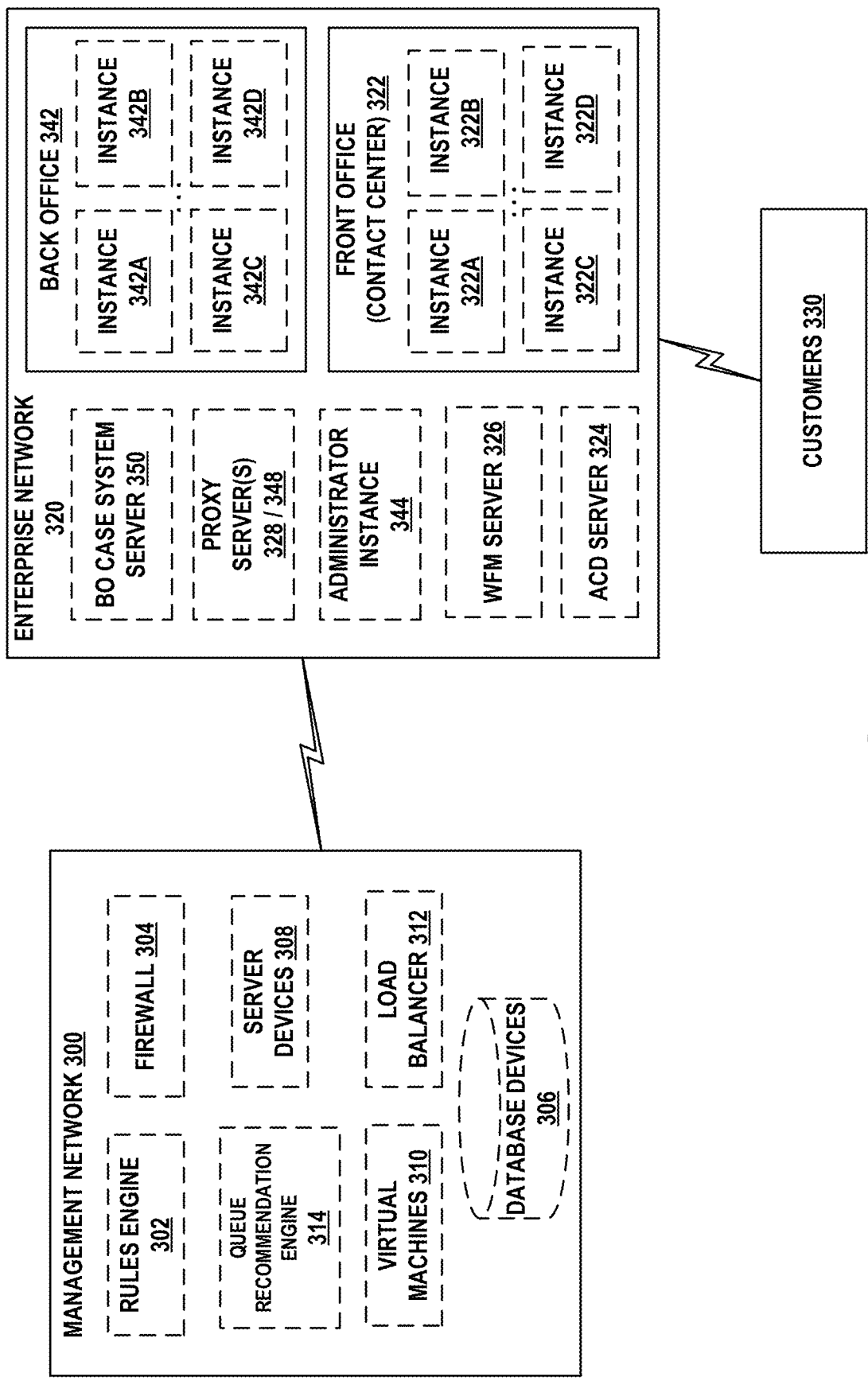
FIG. 3B is a block diagram illustrating a network architecture for a contact center, according to an example embodiment utilizing a management network.
Figure 3C:
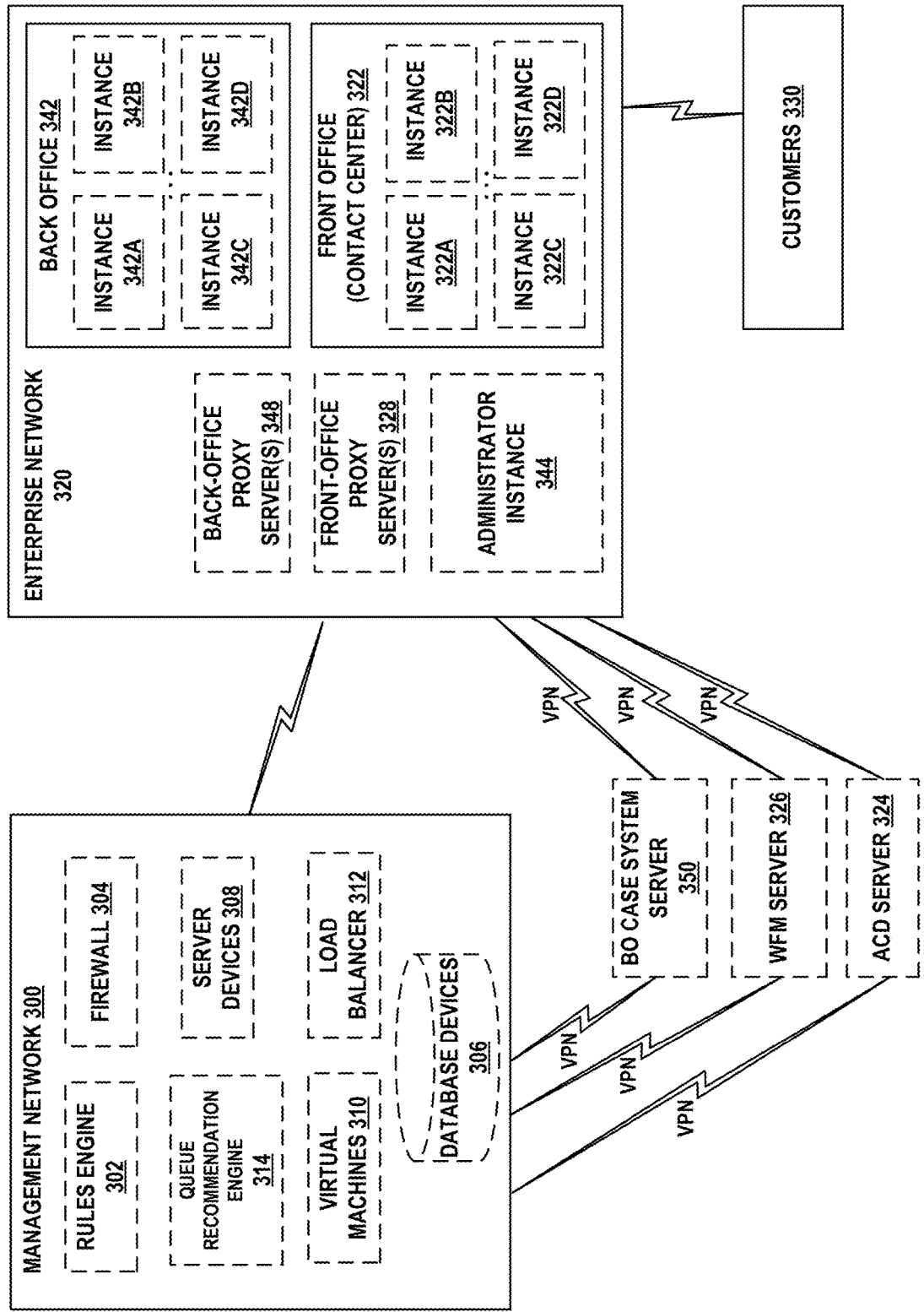
FIG. 3C is a block diagram illustrating a network architecture for a contact center, in accordance with an example embodiment utilizing a management network.

FIGS. 1 and 2 and accompanying descriptions respectively set forth, at a high level, example queue assignment modifications in a generic task handling environment and in a contact center environment. FIGS. 3A, 3B, and 3C relate to additional example embodiments in a contact center. The description accompanying FIGS. 3A, 3B, and 3C is more detailed, but largely applies to the similarly named contact center entities described with respect to FIG. 2.

Example Embodiments Using a Management Network

The following paragraphs describe architectural, functional, and technical aspects of example embodiments utilizing management networks, as well as the features and advantages thereof. Other example embodiments may involve the enterprise network and management network (as well as any of the servers described herein, such as ACD servers, WFM servers, and back-office case system servers) being co-located with and/or administered by a single enterprise or group of related enterprises. Further, the advantages provided by the embodiments herein are not limited to large enterprises and may be applicable to enterprises, or other types of organizations, of any size. Moreover, while a management network is one convenient example embodiment for implementing a system having a queue recommendation engine, other example embodiments might not utilize a management network and might instead incorporate the recited structure and functions in one or more computing devices associated with or part of the enterprise network, an ACD server, a WFM server, a back-office case system server, or other server, computing device, network, or entity.

FIGS. 3A, 3B, and 3C depict example network architectures involving management network implementations of a queue recommendation engine. FIG. 3A illustrates an example generic front-office/back-office network architecture, FIG. 3B illustrates an example front-office/back-office network architecture for a contact center example, and FIG. 3C illustrates a front-office/back-office network architecture for a cloud-supported contact center example.

FIGS. 3A, 3B, and 3C utilize like reference numerals for like components and subcomponents. The illustrated architectures of FIGS. 3A, 3B, and 3C involve three main categories: (a) a management network 300, (b) an enterprise network 320 (which may include cloud-based components/resources/services associated with the enterprise network 320), and (c) customers 330. While not shown, the management network 300 may be a third-party management network 300 having connections with one or many enterprise networks 320, each of which may, in turn, have connections with many different customers 330. Similarly, the cloud-based components/resources/services associated with the enterprise network 320 may be administered by third parties that service many enterprises, each having its own enterprise networks similar to the enterprise network 320. Alternatively, in an "in-house" configuration, either or both of the management network 300 and/or the cloud-based components/resources/services associated with the enterprise network 320 may be administered by and/or owned by the same enterprise (or a related enterprise) that owns or operates the enterprise network 320.

Management network 300 may be a computing network that provides management services to users, particularly to enterprise network 320. Such services may be configured by users from enterprise network 320. For example, by way of web-based portals, users may specify logical directives, generate reports, view analytics, and perhaps perform other tasks. In order to support various capabilities described herein, management network 300 may include rules engine 302, firewall 304, database devices 306, server devices 308, virtual machines 310, load balancer 312, and queue recommendation engine 314, each of which may be embodied by one or more of computing device 100 and/or server cluster 200. For example, management network 300 may provide management services to an enterprise via a cloud-based SaaS system, such as via a multi-tier network architecture connected or linked to the enterprise network 320 and/or one or more vendor networks (e.g., vendor networks hosting the ACD server 324, WFM server 326, and/or back-office case system servers 350 shown in FIG. 3C).

Rules engine 302 may be a configurable program that, contingent on current operating parameters of enterprise network 320, establishes one or more operations that should be performed, such as by management network 300, on behalf of enterprise network 320. In particular, rules engine 302 may be configured by users from enterprise network 320, such as via an SFTP export from the enterprise network 320 to a server device 308 (e.g., an integration server) on the management network 300, to support custom operations. Further details regarding rules engine 302 are discussed below. In some embodiments, as described in further detail below, rules engine 302 interacts with queue recommendation engine 314 to provide at least some level of automation or assistance in setting operational rules. For example, the rules engine 302 may be configured to provide an alert when the queue recommendation 314 determines a staffing change that requires approval before any implementation of the staffing change.

Firewall 304 may be one or more specialized routers or server devices that protect management network 300 from unauthorized attempts to access the devices, applications, and services therein, while allowing authorized communication that is initiated from enterprise network 320. Firewall 304 may also provide intrusion detection, web filtering, virus scanning, application-layer gateways, and other applications or services. Firewalls, such as firewall 304, typically deny all incoming communication sessions, unless such a session was ultimately initiated from behind the firewall (i.e., from a device on management network 300) or the firewall has been explicitly configured to support the session. In some embodiments (such as the example illustrated in FIG. 3C), management network 300 may include one or more virtual private network (VPN) gateways with which it communicates with enterprise network 320. While not illustrated, one or more firewalls may additionally be implemented at the enterprise network 320 and/or at one or more vendor networks.

Database devices 306 may include specialized hardware and/or software used to store data in data structures. For example, database devices 306 may include one or more relational databases (e.g., SQL), graph databases (e.g., neo4j), document databases (e.g., MongoDB), column databases (e.g., Cassandra) and/or other database models. Database devices 306 may take the form of one or more data lakes, having data lake services for persisting data in one or more data file systems (e.g., HDFS) and/or relational databases (e.g., MariaDB). A data lake engine (e.g., Dremio) may be used to assist with data analysis and visualization. As discussed above, the database devices 306 may utilize an ETL process for improved data access efficiency and other benefits. In examples, database devices 306 may contain data related to the operations of management network 300 and/or enterprise network 320. In some embodiments, as described in further detail below, database devices 306 may be utilized by queue recommendation engine 314 to store one or more data structures of queue-related data received from ACD servers and/or as aggregated, calculated, and/or otherwise processed to determine staffing changes.

Server devices 308 can be used for computational, machine learning, data storage, communication, and service hosting operations. These servers may be virtualized (i.e., the servers may be virtual machines). In some cases, the server devices 308 may be physically present on management network 300. In other cases, the server devices 308 may be remote server devices hosted by third-party networks (e.g., AMAZON WEB SERVICES® (AWSR) and MICROSOFT® AZURER). Such cloud-hosted resources may be particularly beneficial for an enterprise's work-from-home scenarios, for example, and in cases in which scalability is desired. In some embodiments, as described in further detail below, server devices 308 may provide web-based portals to allow users from enterprise network 320 to specify and/or approve services that may be configured by users from enterprise network 320. For example, by way of web-based portals, users may specify logical directives, generate reports, view analytics, and view or otherwise interact with staffing changes determined by the queue recommendation engine 314. For example, as described in further detail below, server devices 308 may present recommended staffing changes to users on enterprise network 320 for approval before implementing the recommended staffing changes.

Virtual machines 310 may be emulations of a computing device or system of computing devices, and may mimic the functionality (e.g., processor, memory, and communication resources) of a physical computing device. In some embodiments, virtual machines 310 may be managed by a centralized server device (e.g., one of the server devices 308) or an application that facilitates allocation of physical computing resources to individual virtual machines, as well as performance and error reporting. Virtual machines 310 may be employed in order to allocate computing resources in an efficient, as-needed fashion, such as to associate computing resources to one or more enterprise networks like the enterprise network 320. Providers of virtual machines 310 may include VMWARE™ and MICROSOFT™. Virtual machines 310 may also include cloud-based virtual machines hosted by providers such as AMAZON WEB SERVICES™, for example. In some embodiments, virtual machines 310 may support operating-system-level virtualization that allows for multiple isolated user-space instances, or "containers". This type of virtualization may be supported by providers such as DOCKER® and in turn may be managed by a container orchestration software provider, such as KUBERNETES®.

Load balancer 312 may distribute traffic among one or more physical or virtual devices on management network 300. For instance, if management network 300 includes multiple physical or virtual computing devices, load balancer 312 may distribute network traffic and computational tasks across the multiple devices so that no one device is processing more tasks than the others (or more than its specified capabilities allow). As another example, in a cloud-based system, the load balancer 312 may be implemented at a third-party network.

Queue recommendation engine 314, described in further detail below, may be a configurable program operating on behalf of enterprise network 320 and perhaps other enterprise networks. In particular, queue recommendation engine 314 may apply constraint solving techniques and/or artificial intelligence (AI) algorithms to queue-related data pertaining to enterprise network 320 and/or its contact center to determine staffing changes on behalf of the enterprise network 320. Such AI algorithms may include machine learning, predictive algorithms (linear discriminant algorithms (LDA)), and/or quantitative analysis, among others. The example queue recommendation engine 314 is illustrated as part of management network 300 and operates as such; however, in some embodiments, the queue recommendation engine 314 may include one or more components hosted by third parties and/or by the enterprise network 320, such as by cloud-based AI computing facilities. Further details regarding queue recommendation engine 314, constraint solving, and other machine-learning implementations are discussed below. In some embodiments, queue recommendation engine 314 accesses and analyzes data and/or information from database devices 306 to determine staffing changes on behalf of the enterprise network 320.

Notably, the illustrated configurations of management network 300 are provided as examples. Other configurations and additional devices may exist. For example, management network 300 may contain additional components to those described above (e.g., routers, gateways, etc.). In addition, various client devices, such as personal computers or mobile devices may be connected to management network 300 at any given time. Any component on management network 300 may be replicated across multiple computing devices to provide data duplication and increase capacity of services. Replicated components may be located at various computing locations to ensure high availability in case of a power failure at one computing location. In some cases, management network 300 may consist of a few devices and a small number of components. In other cases, management network 300 may span across multiple physical locations and hundreds of devices and components. For example, one or more components on management network 300 may be physically located at another site, such as one hosted by the management network 300 (e.g., at a third-party network, such as AWS or Microsoft Azure).

Enterprise network 320 may be, for example, a local area network (LAN) or wide area network (WAN) used by an entity for computing and communications tasks, as well as storage of data, either locally or remotely (e.g., in a cloud storage facility). In examples, enterprise network 320 may provide services to customers 330. As one example, these customer services may be in the form of contact center services (e.g., as shown in FIGS. 3B and 3C) for troubleshooting issues that customers 330 may have. To support various capabilities as described herein, enterprise network 320 may include some or all of the following components, as well as others: a monitored front office 322, a monitored back office 342, at least one administrator instance 344, front-office proxy server(s) 328, and/or back-office proxy server(s) 348.

Some enterprise networks 320 might include only a front office 322 or back office 342, perhaps omitting or outsourcing one or the other, while other enterprise networks 320 will include both a front office 322 and back office 342. In some enterprise networks 320, front-office proxy server(s) 328 are combined with back-office proxy server(s) 348, so that one or more proxy server devices provide proxy service functions to both the front office 322 and back office 342. In some examples, such as the example illustrated in FIG. 3C, enterprise network 320 may include, either locally or remotely, such as in a cloud-hosted configuration, server devices, routers (e.g., any type of router, switch, or gateway), firewalls, database devices, load balancers, virtual machines, and/or other additional devices having processors, as described with respect to management network 300. For example, remote cloud-hosted devices, such as the ACD server 324, WFM server 326, and/or back-office case system servers 350, might be associated with the enterprise network 320, but owned and/or managed by a third-party vendor, as shown in FIG. 3C. In other examples (not illustrated), the enterprise network 320 might be commonly owned, controlled, and/or administered by the same enterprise (or group of enterprises) that owns, controls, and/or administers the ACD server 324, WFM server 326, and/or back-office case system servers 350, or even the management network 300. Finally, enterprise network 320 may include additional components beyond the four components described above and shown in FIG. 3A.

Monitored front office 322 may be a subnetwork of resources within enterprise network 320. As shown in FIG. 3A, front office 322 includes four front-office computing device instances 322A, 322B, 322C, and 322D. As described previously, the present description uses the term "computing device instances" to refer to computerized task-handling resources in the form of (1) computing devices utilizing AI (e.g., utilizing one or more AI or machine learning (ML) models, such as large language models (LLMs)) or executing software instructions to serve as bots (e.g., chat bots) and/or (2) computing devices to having a logged-in human user (e.g., human agents logged-in to computing devices). As such, computing device instances 322A, 322B, 322C, and 322D may each represent one or more computing devices through which web portals, services, and applications (e.g., chatbots) can operate. In practice, according to some examples, front-office personnel (e.g., contact center agents) of the entity operating enterprise network 320 may utilize computing device instances 322A, 322B, 322C, and 322D to provide support to customers 330. Such computing device instances 322A, 322B, 322C, and 322D may be co-located at a single physical site (e.g., an office), distributed among several sites (e.g., several offices), or distributed across one or more non-office sites, such as in one or more homes, co-working sites, and/or transient sites (e.g., a moving vehicle). In the case of a front office 322 acting as a contact center, as shown in FIGS. 3B and 3C, such tools and applications may be provided by, supplemented with, or work in cooperation with ACD server 324 and/or WFM server 326, either or both of which may be local to the enterprise network 320 or remote, such as in a cloud-based configuration. Management network 300 may additionally or alternatively provide front-office computing device instances 322A, 322B, 322C, and 322D with tools and applications for customer support functions. For ease of illustration, only four front-office computing device instances are illustrated in FIG. 3A. A typical enterprise's contact center will likely have a multiplicity (many hundreds or thousands or more) of such computing device instances. This multiplicity is represented by the ellipsis (" . . . ") shown in the monitored front office 322.

Like monitored front office 322, monitored back office 342 may be a subnetwork of computing devices within enterprise network 320. As shown in FIG. 3A, back office 342 includes four back-office computing device instances 342A, 342B, 342C, and 342D. As described previously, the present description uses the term "computing device instances" to refer to computerized task-handling resources in the form of (1) computing devices utilizing AI (e.g., utilizing one or more AI or machine learning (ML) models, such as large language models (LLMs)) or executing software instructions to serve as bots (e.g., chat bots) and/or (2) computing devices to having a logged-in human user (e.g., human agents logged-in to computing devices). As such, computing device instances 342A, 342B, 342C, and 342D may represent one or more computing devices through which web portals, services, and applications can operate. In practice, back-office personnel (e.g., back office agents) of the entity operating enterprise network 320 may utilize back-office computing device instances 342A, 342B, 342C, and 342D to provide support to the front office 322. Such computing device instances 342A, 342B, 342C, and 342D may be co-located at a single physical site (e.g., an office), distributed among several sites (e.g., several offices), or distributed across one or more non-office sites, such as in one or more homes, co-working sites, and/or transient sites (e.g., a moving vehicle). For ease of illustration, only four back-office computing device instances are illustrated in FIG. 3A. A typical enterprise will likely have many more than four such computing device instances (i.e., a multiplicity). This multiplicity is represented by the ellipsis (" . . . ") shown in the monitored back office 342.

Administrator instance 344 may include one or more computing devices within or associated with enterprise network 320, such as an administrative user, through which web portals, services, and applications can operate. Management personnel, such as supervisors, administrators, managers (e.g., WFM managers or operations managers), and/or teams of such personnel may utilize administrator instance 344 to oversee agents and/or front-office computing device instances 322A, 322B, 322C, and 322D, and/or back-office computing device instances 342A, 342B, 342C, and 342D, and to perform other functions associated with computing device instances, such as configuring settings and constraints for the queue recommendation engine 314 and/or approving recommended staffing changes determined by the queue recommendation engine 314. In addition, administrator instance 344 may have access to a web portal presented by management network 300 or may be situated directly in or on the management network 300. Such access may be via a GUI that allows the computing device instance 344 to view one or more agent state reports or grids relating to recommended staffing changes, such as recommended changes to queue associations for one or more computing device instances. Such reports may be available to administrator instances on enterprise network 320, in accordance with an example embodiment.

Front-office proxy server(s) 328 and back-office proxy server(s) 348 may be one or more local and/or remote server devices that facilitate secure communication and movement of data between enterprise network 320 and management network 300. In particular, proxy server(s) 328 and 348 may establish and maintain secure communication sessions with one or more computing devices of management network 300, such as rules engine 302, virtual machines 310, queue recommendation engine 314, and/or virtual private network (VPN) gateways of management network 300 (not shown). By way of such a session, management network 300 may be able to obtain data from and manage aspects of enterprise network 320 and its components. In examples, such as where the management network 300 and the enterprise network 320 are not commonly owned or administered, proxy server(s) 328 and 348 may be placed behind a firewall of enterprise network 320 (e.g., within enterprise network 320 and protected by the firewall), such that the firewall might not have to be specifically configured to support incoming sessions from management network 300, thereby avoiding potential security risks to enterprise network 320. As mentioned previously, front-office proxy server(s) 328 and back-office proxy server(s) 348 may be combined into one or more proxy server(s) providing proxy server functionality for both the front office 322 and back office 342.

Proxy server(s) 328 and 348 may include or serve as an adapter service utilizing plugins and/or other components to make various Application Program Interface (API) calls for incoming or outgoing traffic, such as traffic communicated with an ACD server, WFM server, or other local or cloud-based services (see, e.g., FIG. 3C). For example, such API calls could include API calls to one or more third-party providers of conditions, events, and/or actions to the management network 300. As another example, the API calls could be for an external API to communicate user information directly between the enterprise network 320 and the management network 300. As yet another example, the API calls could relate to tenant configuration (e.g., back-office configurations) of the enterprise network 320 by the management network 300.

Customers 330 may represent entities that communicate with the front office 322 or enterprise network 320 to resolve issues. For example, if the front office 322 is part of a contact center, as illustrated in FIGS. 3B and 3C, customers 330 may represent individuals, and/or devices associated with individuals, that communicate or interact with enterprise network 320 to receive technical or non-technical assistance from computing device instances 342A, 342B, 342C, and 342D. An incoming customer communication constitutes one example of a task to be handled by a computing device instance in a contact center context.

FIGS. 3B and 3C are block diagrams illustrating example network architectures for a monitored front-office/back-office contact center. FIGS. 3B and 3C are similar to FIG. 3A, except FIGS. 3B and 3C additionally include an ACD server 324, a WFM server 326, and a back-office case system server 326. As previously mentioned, FIGS. 3A, 3B, and 3C utilize like reference numerals for like components and subcomponents. Further, while FIG. 3C shows each of the ACD server 324, a WFM server 326, and a back-office case system server 326 as being cloud-based components, in other embodiments, one or more of these may be local (physically present) on the enterprise network 320, such as in a hybrid architecture combining features shown in FIGS. 3B and 3C. In addition, some enterprises may omit one or more of the ACD server 324, a WFM server 326, and a back-office case system server 326. Some example embodiments set forth herein utilize only the ACD server 324, perhaps in combination with schedule information from the WFM server 326, to determine staffing changes for a contact center.

WFM server 326 may be local or remote networked hardware and/or software used to manage computing device instances within the enterprise network 320 (including cloud-based, work-from-home computing device instances). Such computing device instances may be in the front office 322 and/or the back office 342. In general, WFM server 326 implements workforce management services with the enterprise network 320 by forecasting labor requirements and creating and managing staff schedules to accomplish tasks according to an acceptable or preferred timeline. In some examples, the WFM server 326 in the enterprise network 320 is a cloud-based system (see FIG. 3C) associated with the enterprise network and configured to allow for secure communications (e.g., via a VPN) between entities on the enterprise network 320 and the WFM server 326. Further details regarding WFM server 326 are set forth below. In some examples, described below, the queue recommendation engine 314 of the management network 300 may utilize data from the WFM server 326 to assist in determining staffing changes. In some examples, the WFM server 326 is administered by the same enterprise that administers the management network 300, the enterprise network 320, and/or or other devices or networks. The enterprise network 320 may utilize more than one WFM server 326, such as by utilizing separate WFM servers from different providers.

ACD server 324 may be networked hardware and/or software used to facilitate interactions between customers 330 and enterprise network 320. In particular, for example, ACD server 324 may receive customer communications or interactions and route the communications/interactions to individual queues (each typically identified by a queue number and instance) based on the communication medium and/or content. In addition, ACD server 324 may associate each of the front-office computing device instances, for example, computing device instances 322A, 322B, 322C, and 322D, to one or more queues (typically more than one) to provide support to each queue. ACD server 324 may compile information pertaining to the customer communications. This information may include, for example, how long communications from customers 330 are postponed until being served by a front-office computing device instance, whether a communication is abandoned, and so on, as well as information pertaining to the front-office computing device instances assigned to queues (e.g., which computing device instances are assigned to which queues). In example embodiments, the queue recommendation engine 314 receives and processes (i.e., aggregates, calculates, and otherwise manipulates) queue data from the ACD server 324 to assist in determining staffing changes for the enterprise network 320. In some examples, the ACD server 324 is administered by the same enterprise that administers the management network 300, the enterprise network 320, and/or other devices or networks. The enterprise network 320 may utilize more than one ACD server 324, such as by utilizing separate ACD servers from different providers. The queue recommendation engine 314 is configured to communicate with one or multiple ACD servers, such as via API requests typically defined by providers of each such ACD server.

In some examples, ACD server 324 may have a software component (e.g., a softphone) disposed on front-office computing device instances within the front office (contact center) 322. The management network 300 may utilize information from ACD server 324 to perform front-office-related operations on behalf of the front office 322 of enterprise network 320. In some examples, the ACD server 324 is a cloud-based system (see FIG. 3C) associated with the enterprise network and configured to allow for secure communications (e.g., via a VPN) between entities on the enterprise network 320 and the ACD server 324.

During operations, WFM server 326 may receive information from ACD server 324 regarding expected communication volumes from customers 330. For cloud-based configurations, such as the one illustrated in FIG. 3C, WFM server 326 may communicate with ACD server 324 using one or more VPN connections, for example. Using this data, WFM server 326 may generate schedules for front-office computing device instances to cover the expected volume. For example, the WFM server 326 may generate a schedule for front-office computing device instance 322A that stipulates: "work on Monday from 8 AM-5 PM," "work on Wednesday from 4 PM-8 PM," and so on. In some example embodiments, the management network 300 may utilize information from the operations of WFM server 326 to perform operations and/or to assist in determining staffing changes on behalf of the front office 322 on enterprise network 320.

Back-office case system server 350 may be networked hardware and/or software used to facilitate processing of back-office cases, such as claims to be processed. In particular, back-office case system server 350 may receive incoming cases from the front office 322 or another entity within or external to the enterprise network 320. The back-office case system server may then route the cases to appropriate back-office channels (e.g., appropriately qualified groups of back-office computing device instances) for processing. In addition, back-office case system server 350 may assign back-office computing device instances, for example, computing device instances 342A, 342B, 324C, and 342D, to provide support to each queue of cases. Alternatively, the back-office case system server 350 may manage cases needing to be processed by the back office 342, such as through a First-In-First-Out (FIFO) queue system, and back-office computing device instances may "pull" new cases to process as they complete processing of other cases. Back-office case system server 350 may, but need not, maintain information including, for example, how long cases are queued before being processed, for example. The back-office case system server 350 may also store information pertaining to which back-office computing device instances are assigned to which case queues, in some implementations. In some examples, back-office case system server 350 is a cloud-based system (see FIG. 3C) associated with the enterprise network 320 and configured to allow for secure communications (e.g., via a VPN) between entities on the enterprise network 320 and the back-office case system server 350. In some examples, the queue recommendation engine 314 of the management network 300 may analyze data from the back-office case system server 350 to perform operations and/or to assist in determining staffing changes on behalf of the back office 342 on enterprise network 320.

With regard to the front office 322, to effectively address communications from customers 330, enterprise network 320, including cloud-based components (e.g., ACD server 324) associated with enterprise network 320, may perform operations to (i) forward incoming communications from customers 330 to channels/queues, and (ii) assign front-office computing device instances from the contact-center front office 322 to service channels/queues. As used herein, the operations of forwarding incoming communications to channels/queues may be referred to as "routing," whereas the operations of assigning computing device instances to service channels/queues may be referred to as "assignment." Computing device instances that have been assigned to a particular queue are "associated to that queue."

Similarly, with regard to the back office 342, to effectively process back-office cases, such as claims or other work originating from the front office 322, enterprise network 320, including cloud-based components (e.g., back office case system server 350) associated with enterprise network 320, may perform operations to (i) forward incoming cases to channels/queues, and (ii) assign back-office computing device instances from the back office 342 to service the channels/queues of cases to be processed. Alternatively, as discussed above, rather than the enterprise network 320 forwarding incoming cases to back-office computing device instances, the back-office computing device instances may instead "pull" or accept or obtain new incoming cases from a new case repository maintained, e.g., by back-office case system servers 350.

Queues: Routing, Assignment, and Associations

Figure 4A:
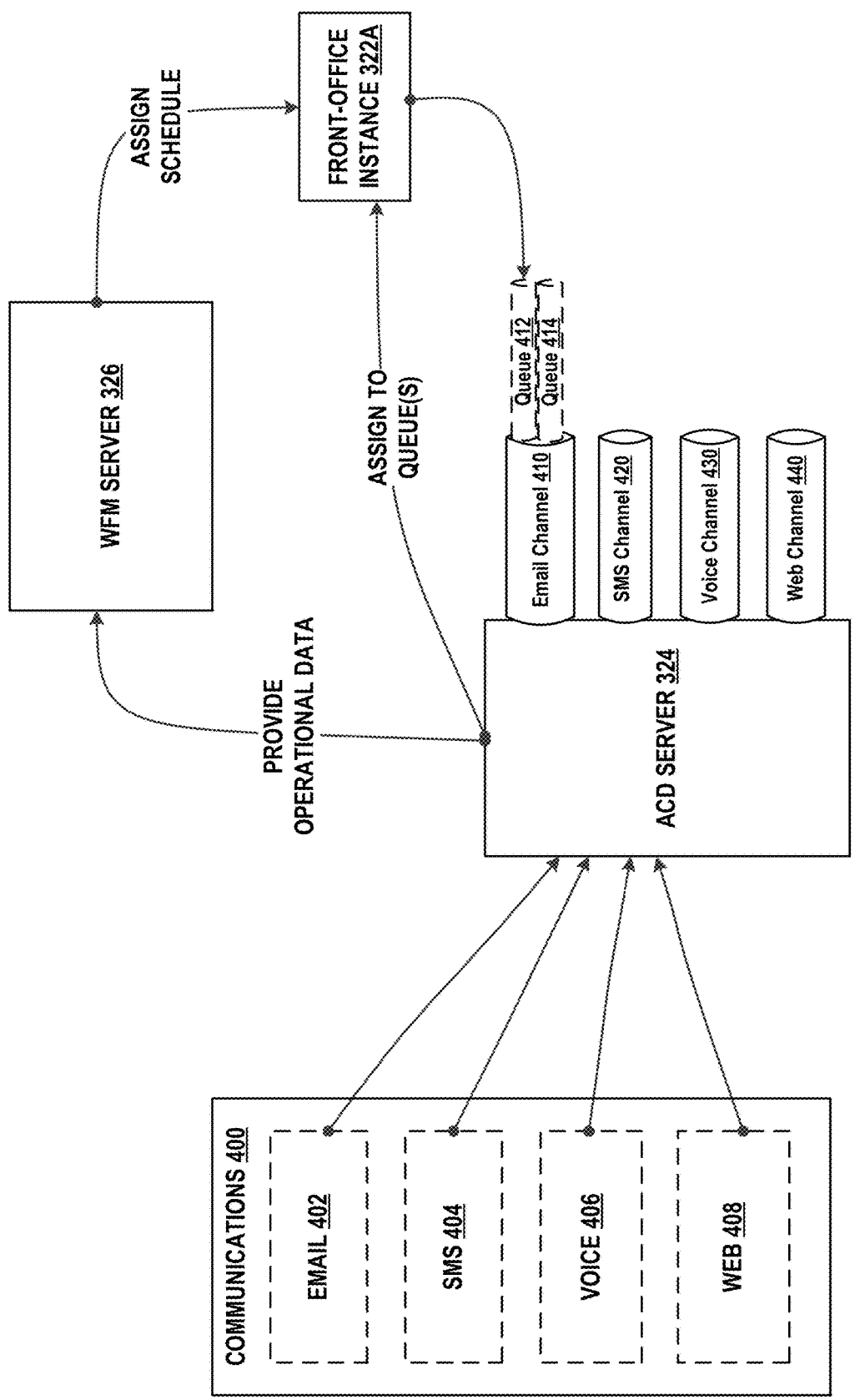
FIG. 4A is a block diagram illustrating routing and assignment for a front office, according to an example embodiment.
Figure 4B:
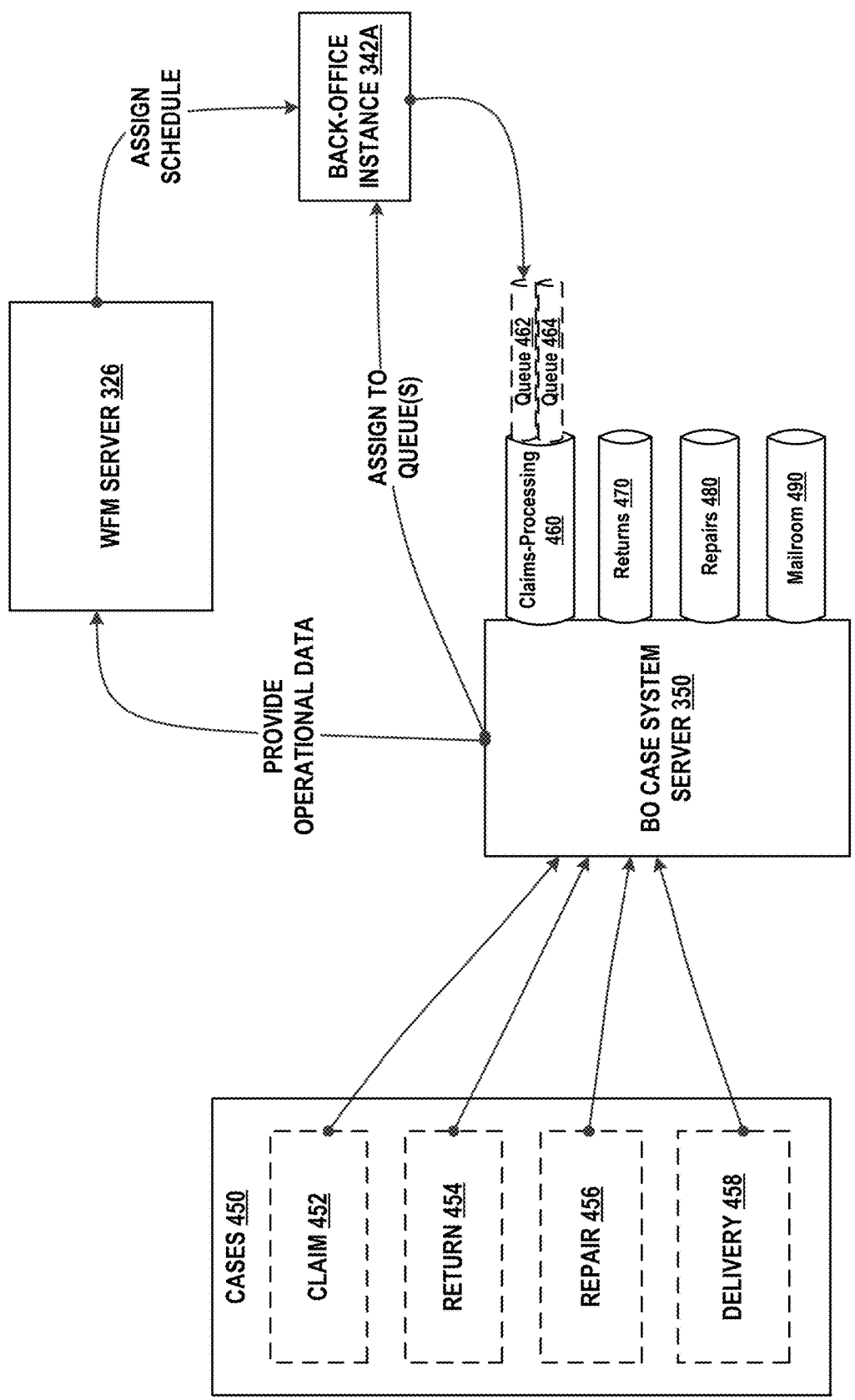
FIG. 4B is a block diagram illustrating routing and assignment for a back office, according to an example embodiment.

FIGS. 4A and 4B are block diagrams illustrating routing and assignment for a front office and a back office, respectively, of a contact center, in accordance with example embodiments. In particular, FIG. 4A shows how the ACD server 324 and WFM server 326 shown in FIGS. 3B and 3C can be used to facilitate routing and assignment of communications from customers 330. As discussed, one or both of the ACD server 324 and the WFM server 326 may be physically located on the enterprise network 320 or may instead be accessible as cloud-based services, such as those provided by third-party vendors. Such a cloud-based service might include a relatively small client software component (i.e., a thin client) on the enterprise network 320 or may utilize an API to allow for data communications.

For purpose of the embodiments herein, in the context of a front office, a "communication" may refer to any form of contact (i.e., interaction) between customers 330 (including devices and/or software associated with customers 330) and the front office 322 of the enterprise network 320. For example, a communication may be in the form of a call, a chat session or portion thereof, a text, an instant message, a web page form, an email, and so on. Example communications 400 are shown in FIG. 4A. In particular, communications 400 include email communication 402, which may take the form of an email from customers 330, short message service (SMS) communication 404, which may take the form of a text message from customers 330, voice communication 406, which may take the form of a voice call placed from a telephonic device of customers 330, and web communication 408, which may take the form of a chat message from customers 330. Notably, communications 400 are presented for the purpose of example. In practice, other types of communications may exist, serving as tasks to be handled by computing device instances (e.g., chat bots or logged-in human agents).

As communications 400 are received by ACD server 324, each incoming communication may be received by a particular communication channel based on the medium of the incoming communication. As used herein, a "communication channel" (or colloquially, just "channel") may refer to an interface within (or otherwise associated with) ACD server 324 that is designed to receive communications over a specific medium. For example, to facilitate email communication 402, ACD server 324 may include email channel 410 (which may involve a simple mail transfer protocol (SMTP) server configured to receive emails sent to a designated email address). To facilitate SMS communication 404, ACD server 324 may include SMS channel 420 (which may involve an SMS gateway configured to receive SMS messages sent over a telecommunications network to a designated phone address). To facilitate voice communication 406, ACD server 324 may include voice channel 430 (which may involve an automated call distributor (ACD) service configured to receive calls sent over a telecommunications network to a designated phone address). And to facilitate web communication 408, ACD server 324 may include web channel 440 (which may involve an Internet Relay Chat (IRC) server configured to receive chat messages sent over a network). Notably, other types of devices to facilitate communication channels may exist.

As shown in FIG. 4A, each channel in ACD server 324 may include one or more queues. As used herein, in the context of a front office, a "queue" may refer to a backlog of communications waiting to be serviced by a front-office computing device instance. During operations, ACD server 324 may route communications 400 to queues based on the content of each respective communication, for example. The ACD server 324 will typically administer many such queues, each identified by a queue number and instance, for example.

To clarify the concept of routing, FIG. 4A illustrates queue 412 and queue 414. In an example scenario, if ACD server 324 is used to resolve mobile device issues, then queue 412 and queue 414 may each represent different mobile device models. For instance, communications regarding Model X issues may be routed to queue 412, while communications regarding Model Y issues may be routed to queue 414. ACD server 324 may assign front-office computing device instances to service the communications on queue 412 and queue 414. For example, front-office computing device instance 322A is depicted as assigned to queue 412. ACD server 324 may assign front-office computing device instances to queues based on the skill sets of computing device instances, the volume of calls within a certain queue, and/or other agent attributes. According to example embodiments set forth herein, the queue recommendation engine 314 may determine staffing changes that result in computing device instances being added to or removed from particular queues, to assist in meeting specified queue targets (discussed below). While only two queues 412 and 414 and only a single front-office computing device instance 322A is illustrated in FIG. 4A, this is merely for purposes of illustration. In operation, there will likely be many more queues (e.g., tens, hundreds, or thousands) and a multiplicity of front-office computing device instances (e.g., hundreds, thousands, or tens of thousands) assigned across the queues.

Several techniques may be used to garner the content of a communication in order to route the communication to an appropriate queue. In some cases, the content of the communication may be provided by customers 330. For instance, during a voice communication, customers 330, via an interface on a telephonic device, may enter an input (such as pressing a key or speaking a word, phrase, or number) to indicate the content of the voice communication (also known as an interactive voice response (IVR) system). Or, in the case of an email communication, ACD server 324 may include different email addresses directed to different issues. In further examples, ACD server 324 may include one or more algorithms to parse incoming communications to deduce content. For instance, text and voice analysis algorithms, such as those utilizing AI, may be used.

Once within a queue, a communication will remain in abeyance until being served by one or more front-office computing device instances assigned to the queue. Alternatively, the communication may drop out of the queue or become abandoned. Because many front-office computing device instances may service a given queue, ACD server 324 may utilize several techniques for distributing calls among computing device instances assigned to the given queue. For instance, linear call distribution, circular call distribution, uniform call distribution, simultaneous call distribution, and/or weighted call distribution algorithms may be used. Other techniques may also exist.

In addition to routing and assignment, ACD server 324 may provide data to WFM server 326. Such data may include operational data, in the form of information regarding incoming communications, the number of communications per channel, the number of communications per queue, average queue length, and so on. WFM server 326 may utilize the received data to inform decisions regarding the scheduling of front-office computing device instances. For example, if ACD server 324 reports to WFM server 326 that an influx of calls occurs every day around noon, WFM server 326 may assign schedules for front-office computing device instances that are able to satisfy such demand. Communications between the ACD server 324 and WFM server 326 may be via a VPN connection, for example, in embodiments utilizing one or more cloud-based services and/or where the ACD server 324 and WFM server 326 are not co-located and/or administered by the same enterprise. ACD server 324 may additionally provide data (including queue data, possibly enhanced, as described below) to queue recommendation engine 314 for use in determining staffing changes on behalf of the enterprise network 320.

FIG. 4B is a block diagram illustrating routing and assignment for a back office, such as the back office 342 of FIGS. 3B and 3C. In particular, FIG. 4B shows an example in which the back-office case system server 350 and WFM server 326 shown in FIGS. 3B and 3C can be used to facilitate routing and assignment of cases to be processed. Many back offices do not utilize a WFM server 326 like the one illustrated in FIG. 4B. Moreover, while FIG. 4B illustrates the back-office case system server 350 assigning back-office computing device instances to process case queues (i.e., a "push" workflow), a more typical scenario might be for a back-office computing device instance to "pull" new cases out of an appropriate queue, based on skill set, required tools or facilities, or other factors. One or both of the back-office case system server 350 and the WFM server 326 may be physically located on the enterprise network 320 or may instead be accessible as cloud-based services, such as those provided by third-party vendors. Such a cloud-based service might include a relatively small client software component (i.e., a thin client) on the enterprise network 320 or may utilize an API to allow for data communications.

For purpose of the embodiments set forth herein, in the context of a back office, a "case" may refer to any unit of work that needs to be processed by a back-office agent 342 of the enterprise network 320. For example, a case may be in the form of a claim, returned item, a repair, a delivery to be initiated, and so on. Example cases 450 are shown in FIG. 4B. In particular, cases 450 include claim 452, return 454, repair 456, and delivery 458, each of which may require a different back-office channel (e.g., group of computing device instances), based on skill set, required tools or facilities, or other factors. Notably, cases 450 are presented for the purpose of example. In practice, other types of cases may exist.

As cases 450 are being received by back-office case system server 350, such as from the front office 322 or elsewhere within or outside of enterprise network 320, each incoming case may be received by a particular case channel based on the type of the incoming case. For example, to facilitate claim 452, back-office case system server 350 may route to a claims-processing channel 460, which may, for example, include computing device instances having suitable applications for processing claims. To facilitate return 454, back-office case system server 350 may route to a returns channel 470, which may, for example, including computing device instances suited for facilitating inspection and documentation of returned items for completeness and suitability for resale. To facilitate repair 456, back-office case system server 350 may route to a repairs channel 480, which may, for example include computing device instances having appropriate service manuals and/or tools for effecting repairs. And to facilitate delivery 458, back-office case system server 350 may route to a mailroom channel 490, which may include computing device instances having suitable applications for addressing outgoing deliveries, computing and paying delivery charges, and so on. Notably, other types of case channels may also exist, and will likely depend on the particular business of enterprise network 320. Moreover, some back-office case system server 350 may only manage cases destined to a single channel, so that no routing need occur.

As shown in FIG. 4B, each channel in back-office case system server 350 may include one or more queues. As used herein, in the context of a back office, a "queue" may refer to a backlog of cases waiting to be serviced by a back-office computing device instance. During operations, back-office case system server 350 may route cases 450 to queues based on instance skill set, required tools or facilities, or other factors, for example.

To clarify the concept of back-office routing, FIG. 4B illustrates queue 462 and queue 464. In an example scenario, if back-office case system server 350 is used to process insurance claims, then queue 462 and queue 464 may each represent different types of insurance. For instance, health-insurance claims may be routed to queue 462, while automobile-insurance claims may be routed to queue 464. Then, back-office case system server 350 may assign back-office computing device instances to process the cases on queue 462 and queue 464. For example, back-office computing device instance 342A is depicted as assigned to queue 462. While only two queues are illustrated in the example of FIG. 4B, a back-office case system server 350 might administer many such queues, such as hundreds or more. Similarly, while only a single back-office computing device instance 342A is shown, during operation, the illustrated system would likely have many such back-office computing device instances, such as tens, hundreds, or thousands, for example.

Several techniques may be used to garner the content of a case in order to route the case into an appropriate queue. In some cases, the type of the case may be provided by a communication or other data from the front office 322. As another example, a document or file associated with a case may have a case identifier (e.g., a tag or an alphanumeric code/sequence) that identifies a particular case as being of a certain case type. In further examples, back-office case system servers 350 may include one or more algorithms to parse content (e.g., textual content) of incoming cases to deduce a case type. For instance, text analysis algorithms may be used.

Once within a queue, according to example embodiments, a case will remain in abeyance until being processed by one or more back-office computing device instances assigned to the queue. Because more than one back-office computing device instance may process a given queue, back-office case system server 350 may utilize several techniques for distributing cases among computing device instances assigned to the given queue. For instance, linear case distribution, circular case distribution, uniform case distribution, simultaneous case distribution, and/or weighted case distribution algorithms may be used. Other techniques may also exist. And, as mentioned, rather than the back-office case system server 350 assigning, back-office computing device instances may retrieve or otherwise "pull" cases from the back-office case system server 350.

In addition to routing and assignment, back-office case system servers 350 may provide data to WFM server 326, if such functionality is provided for the back office in question. Such data may include operational data in the form of information regarding incoming cases, the number of cases per channel, the number of cases per queue, average queue length, and so on. WFM server 326 may utilize the received data to inform decisions regarding the scheduling of back-office computing device instances. For example, if back-office case system server 350 reports to WFM server 326 that an influx of returns occurs every year just after Christmas, WFM server 326 may assign schedules for back-office computing device instances that are able to satisfy such demand. Communications between the ACD server 324 and back-office case system server 350 may be via a VPN connection, for example, in embodiments utilizing one or more cloud-based services. Back-office case system server 350 may additionally provide data to queue recommendation engine 314 for use in determining staffing changes, for example.

IV. Queue Recommendation Engine: System Settings

The queue recommendation engine according to example embodiments utilizes a number of settings that define the different queues (including any queue groups) that are included/eligible for staffing changes (including any recommended staffing changes). The settings may also include information such as a target ASA/SL goal for each queue, whether or not a queue has a paid penalty if a corresponding target were to be missed, whether a particular target is measured on a daily, monthly, quarterly, or annual basis, and more. The settings may also include different types of constraints, including a number of user-specified configurable constraints, to be met when the queue recommendation engine determines staffing changes. The settings may further specify how to determine whether or not a computing device instance is qualified on a certain queue or which computing device instances are even eligible to be considered for staffing change determinations (e.g., recommendations). The settings include at least the following two types of settings, according to an example embodiment: (1) settings relating to queue targets and (2) settings relating to system configuration, including constraints.

Queue Targets Settings

First, with regard to queue targets settings, one goal is to help enterprises better react to changing conditions whenever adjustments to associations between computing device instances and queues are needed. Such adjustments might be necessary in order to meet a queue's target ASA or SL goal, for example. The presently described system helps with such adjustments by determining staffing changes in the form of recommended computing-device-instance-to-queue changes based on each queue's net staffing on a given day as compared to its run rate, according to an example embodiment. In order to do this effectively and accurately, the system utilizes a variety of information related to each queue. In the following discussion, references to individual or particular queues are also generally applicable to queue groups comprising two or more individual/particular queues, as context allows. For example, settings (e.g., target types, penalties, etc.) may be specified on a per-queue-group basis, in addition to on a per-queue basis, which is what the following description assumes for purposes of explanation.

Figure 5:
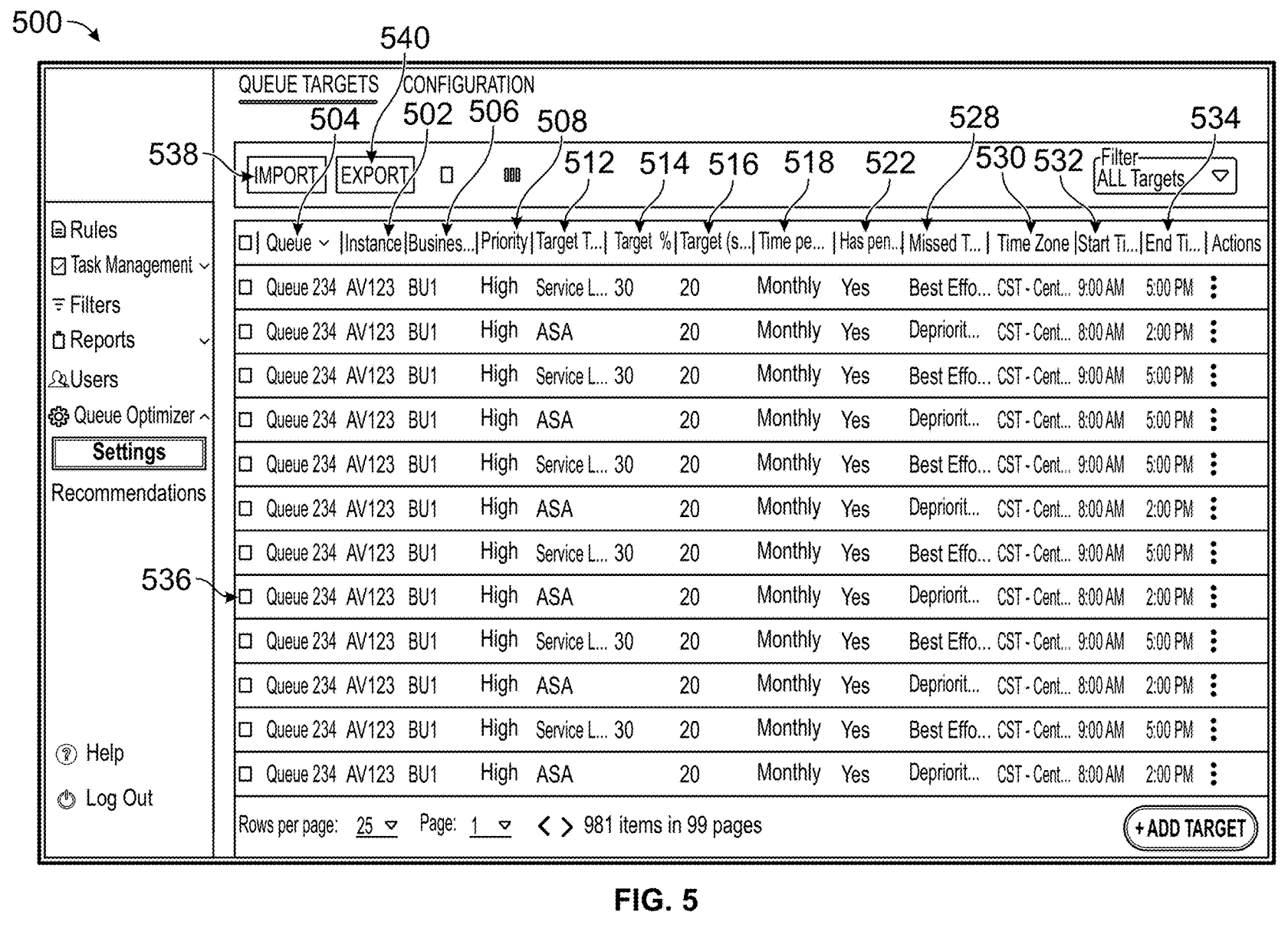

FIG. 5 illustrates a queue targets settings grid 500, according to an example embodiment. The grid 500 is shown as a GUI that may be displayed on a computing device, for example. Such a grid 500 represents examples of the type of queue targets setting data that may be stored in a storage device, for reference by a computing device implementing the queue recommendation engine. The grid 500 may also be utilized by a user associated with the enterprise or contact center to configure one or more of the settings, as applicable. The following are example fields that may be included in the queue targets settings grid 500: an "Instance" field 502, a "Queue #" field 504, a "Business Unit" field 506, a "Priority" field 508, a "Status" field 510, a "Target Type" field 512, a Target %" field 514, a "Target Seconds" field 516, a "Time Period" field 518, a "Created By" field 520, a "Has Penalty" field 522, a "Last Modified By" field 524, a "Last Modified Date Time" field 526, a "Missed Target Strategy" field 528, a "Time Zone" field 530, a "Start Time" field 532, and an "End Time" field 534, each of which are illustrated as column headings for the columns of the grid 500, where each row (e.g., row 536) corresponds to a different queue instances or queue group instances. In some examples, additional fields may be included and/or one or more of the aforementioned fields may be omitted or hidden from view. The user may be able to select columns (e.g., for sorting, repositioning, or other purposes) and/or apply filters using one or more user interface elements, as shown along the upper and left sides of the grid 500 in FIG. 5. Example filters include filtering by the following: business unit, whether a penalty applies, instance, missed target strategy, priority, queue #, status, target type, time period, or time zone. In addition, by selecting one or more rows (corresponding to particular queue instance(s), the user may specify one or more actions to take with respect to the selected row(s). Such actions may include, but are not limited to the following: editing, deleting, or making the particular queue instance(s) active or inactive. For example, multiple rows may be selected to allow for bulk editing of one or more of the following for each selected queue instance: target type, target seconds, target %, priority, whether a penalty applies, missed target strategy, time period, time zone, hours of operation start time, hours of operation end time, and status.

Moreover, targets (i.e., queue instances) can be added or edited via a bulk import (e.g., an uploaded.csv file listing fields and respective values for each target), such as by using the "import" and "export" buttons 538 and 540. As another example, a graphical interactive form editor (not illustrated) may be displayed at a computing device to receiving user inputs specifying values for each pertinent field. The graphical interactive form editor may include one or more text entry fields, radio buttons, drop-down menus, selection boxes, or other elements to receive the user inputs via the user interacting with an input component of the computing device displaying the graphical interactive form editor. Example fields that may be included in the graphical interactive form editor or via a bulk import include the following: instance, queue #, associated skill ID (e.g., if supported by the ACD-a skill that a computing device instance (or associated user) must have in order to receive calls for the selected queue), minimum skill proficiency (e.g., if supported by the ACD-a minimum proficiency score a computing device instance must have for the associated skill in order to be eligible to receive calls for the selected queue), target type (e.g., whether a queue has a service level or ASA target), target seconds (e.g., target ASA goal (in seconds) for a queue), target % (e.g., target service level percentage goal for a queue; used in combination with target seconds), time period (e.g., daily, monthly, quarterly, or annually-specifies over what period the service level or ASA is measured), business unit, priority (e.g., by category (critical, high, medium, or low) or scale (increasing priority from 1 to 10), whether a penalty, such as a paid penalty, applies ("Has Penalty") (e.g., yes or no-queues having a paid penalty for a missed service level or ASA target can be configured to always have a higher priority over queues having no paid penalty), missed target strategy (e.g., best effort (continue to prioritize based on defined "priority" and "has penalty" settings) or deprioritize (treat as lowest priority for remainder of the time period)-strategy to be taken if a queue cannot meet its target by the end of the applicable time period (e.g., day, month, quarter, year, etc.)), hours of operation start time, hours of operation end time, and time zone.

Configuration Settings (Constraints)

The paragraphs immediately above set forth example settings relating to queue targets. A second type of settings relates to configuration settings, which define a limited set of initial constraints and other settings to be adhered to by the recommendation engine in determining staffing changes (i.e., modifications to queue assignments). The queue recommendation engine determines staffing changes (including recommended staffing changes) using one or more constraints, which may include a mix of hard and soft constraints. For example, one example hard constraint might specify that a computing device interface cannot be assigned to a queue for which it is not qualified. Similarly, an example soft constraint might specify that computing device instances should be assigned first to the queue having the highest priority or a relative higher priority. According to example embodiments, some constraints may be non-configurable or inherent to the queue recommendation engine itself, while other constraints are user configurable. Non-configurable constraints will first be described, followed by configurable constraints.

Non-configurable constraints may include, but are not limited to, the following, according to example embodiments: (a) a computing device instance (e.g., a logged-in agent) can only be added to queues for which it is qualified (e.g., as defined by queue qualification criteria, described elsewhere herein); (b) a computing device instance can only be added to queues that are on the same ACD instance that the computing device instance is currently logged into; (c) when removing a queue from a computing device instance, the queue with the greatest positive net staffing attribute should be removed first; (d) a queue cannot be removed from a computing device instance if doing so would cause that queue's net staffing attribute to drop below a defined net staffing cushion value (e.g., default value set to "2"); (e) only determine staffing changes (e.g., make recommendations) that add computing device instances to queues where a net staffing attribute is less than a defined net staffing attribute baseline value (e.g., default value set to "0"; net staffing attribute baseline value must be less than or equal to net staffing cushion value); (f) stop adding users to a queue once [Net Staff]=[Net Staff Cushion]; (g) where a "queue fill strategy" constraint specifies a "fill higher priority first" value or when using priority as a tie-breaker, queues having a penalty (i.e., queues configured with Has Penalty="TRUE" will always have a higher priority compared to queues not having a penalty (i.e., queues configured with Has Penalty="FALSE")—this means that a "low" priority queue having a penalty would still have a higher priority than a "critical" priority queue without a penalty; (h) a queue having an ASA target type and a missed target strategy of "deprioritize" which also has an ASA period run rate or ASA daily run rate that is less than or equal to a specified ASA cushion value (e.g., default value of "−5") has the lowest overall priority (regardless of specified priority or penalty) for an instance of determining a staffing change; (i) a queue having an ASA target type and a "best efforts" missed target strategy that also has an ASA period run rate or ASA daily run rate less than or equal to a specified ASA cushion value should continue being considered for determined staffing changes (e.g., recommendations) for additional computing device instances; (j) a queue having a service level target type and a "deprioritize" missed target strategy and which has a SL period run rate or SL daily run rate greater than or equal to a defined SL cushion value (e.g., default value of 105% or "1.05") has the lowest overall priority (regardless of specified priority or penalty) for an instance of determining a staffing change; and (k) a queue having a service level target type and a "best effort" missed target strategy and which has a SL period run rate or SL daily run rate greater than or equal to a defined SL cushion value (e.g., default value of 105% or "1.05") should continue being considered for determined staffing changes (e.g., recommendations) for additional computing device instances. The preceding example non-configurable constraints are merely representative examples according to possible example embodiments and variations of the above are intended to be within the scope of the presently described technology.

In addition to non-configurable constraints, the configuration settings may also include one or more configurable constraints, for which a user can specify and/or select options. FIG. 6 illustrates a form 600, showing how constraints can be configured by a user via an interactive GUI displayed at a display associated with a computing device. In some examples, additional configurable constraint types besides those illustrated in FIG. 6 may be included and/or one or more fields may be omitted or hidden from view. The user may be able to specify configurable constraint values using one or more user interface elements, such as dropdown menus, text entry blanks, checkboxes, and others, as shown in FIG. 6. As shown, example configurable constraints include constraints falling into the following two categories: a recommendation strategy constraint category 602 and a per user fairness preferences constraint category 604. Example constraints falling within these two categories will now be described, in turn, in the following paragraphs.

A first example category of configurable constraints relates to recommendation strategy. Configurable constraints relating to recommendation strategy may be used by the recommendation engine to specify how staffing change determinations are made (i.e., which queue gaps to solve for first and how to calculate those gaps). One example recommendation strategy constraint illustrated in FIG. 6 is an "allowed recommendation type" constraint, which may have two user-selectable options: "add queues only" or "add and remove queues." Another example recommendation strategy constraint illustrated in FIG. 6 is a "queue fill strategy" constraint. Since there are likely to be times when the demand for users will exceed the supply and multiple queues will often be competing for the same population of computing device instances (e.g., logged-in agents), the "queue fill strategy" constraint can advantageously specify which queue should be filled first. That is, if the system can only choose one queue to save (i.e., meet a specified queue target, such as a required ASA or service level) while potentially disadvantaging other queues, the "queue fill strategy" constraint will assist in making that decision. Two example user-selectable options for the "queue fill strategy" constraint are "fill greatest need first" (where greatest need is defined as the queue with the greatest negative net staffing) and "fill highest priority first" (where highest priority is defined by the priority assigned to each queue when configuring the queue targets, as discussed in the immediately preceding section).

Yet another example recommendation strategy constraint illustrated in FIG. 6 is a "requirements model" constraint. One part of determining staffing changes (e.g., user-to-queue change recommendations) includes determining how many computing device instances (e.g., logged-in agents) each queue requires in order to achieve a specified ASA or SL target. For example, this determination may be based on its forecasted call volume and Average Handle Time (AHT). In example embodiments, one method for making such a determination involves utilizing an Erlang-C model (developed by the Danish mathematician A. K. Erlang) or a variant of the Erlang-C model. Other mathematical models may be used in alternative example embodiments. As yet another example, one or more machine learning models may be trained and utilized to determine how many computing device instances (e.g., logged-in agents) each queue requires in order to achieve a specified ASA or SL target. For example, a machine learning model (or multiple machine learning models) may be selected from a library of models based on particular ACDs, type of computing device instance (e.g., chat bot versus logged-in human agent), industry, business unit, etc., in use. The "requirements model" constraint allows a user to select between different requirements models in embodiments offering more than one requirements model choice. In embodiments utilizing only a single requirements model, this constraint might not be present or might not be user-selectable.

Still yet another example recommendation strategy constraint that may be included is a "requirements buffer percentage" constraint, also illustrated in FIG. 6, which allows a user to "pad" a determined staffing change in order to account for multi-queue environments and/or simply provide a cushion of additional computing device instances (e.g., logged-in agents). The "requirements buffer percentage" constraint specifies a buffer, in terms of an additional number of computing device instances (e.g., as a percentage compared to the number in the determined staffing change), to include in a staffing change determined by the queue recommendation engine. The particular model (or models) used to determine how many computing device instances (e.g., logged-in agents) each queue requires in order to achieve a specified ASA or SL might tend to over-determine or under-determine a number of required computing device instances. Whether the model is an Erlang-C model or a machine learning model, no model is perfect and, as a result, applying an adjustment (in the form of a buffer specified in the "requirements buffer percentage" (Requirements Buffer %) constraint) may advantageously help account for limitations in the model itself or just any unforeseen event. For example, in the context of a contact center having logged-in human agents, the Erlang-C model assumes that agents are assigned only to a single queue at any one time and thus calculates requirements based on that assumption. However, in modern contact centers, agents are typically associated to many different queues at once. Thus, when the Erlang-C model is used to determine that a queue needs an additional four agents, that really means that the queue needs an additional four dedicated agents. But since any additional agents a customer may add to a queue is going to be associated to other queues as well, it is beneficial (or even necessary) to add more than just the four agents in order to account for the limitation in the Erlang-C model (or whatever model is being used). According to example embodiments, the "requirements buffer percentage" constraint allows a user to specify an additional number of computing device instances, to include in a staffing change determined by the queue recommendation engine. For example, a "requirements buffer percentage" constraint value of 50 would specify that 50% more computing device instances should be added to a determined staffing change, according to an example. The "requirements buffer percentage" constraint may be utilized in conjunction with the requirements model described elsewhere herein, according to example embodiments.

In addition to the first example category (recommendation strategy) of configurable constraints, a second example category of configurable constraints relates to per user fairness preference constraints. Configurable constraints relating to per user fairness preference may be used by the recommendation engine to, for example, assist in preventing burnout of computing device instances (e.g., logged-in human agents) in terms of having too many queues or having those queues change too frequently. Example per user fairness preference constraints, all illustrated in FIG. 6 in the per user fairness preferences constraint category 604, include a "maximum number of queues per user" constraint, a "maximum number of recommendations per week per user" constraint, and a "maximum number of queue changes per recommendation per user" constraint. Each of these three example per user fairness preference constraints will now be described, in turn.

The "maximum number of queues per user" constraint is an example per user fairness preference constraint that specifies a maximum number of queues that a computing device instance can be associated to at any given time. For example, if the "maximum number of queues per user" constraint specifies a value of 4 as a hard limit (see below, regarding soft limits and hard limits) and a computing device instance is currently associated to three queues (e.g., as determined from a user-to-queue association service provided by an ACD at the time the recommend engine executes), then the constraint solver can add one additional queue as a determined staffing change without breaking the hard limit specified in the "maximum number of queues per user" constraint. Conversely, if adding a queue to a computing device instance (e.g., a logged-in agent) would cause that computing device instance to exceed the hard limit specified in the "maximum number of queues per user" constraint, then an existing queue to which the computing device instance is already associated must first be removed (assuming that doing so does not break any other constraint) and that the "allowed recommendation type" constraint specifies a value of "add and remove queues" rather than "add queues only." In example embodiments, existing queues can only be removed on a one-to-one basis; that is, the system can only recommend removing one queue for every one queue being added (i.e., system cannot recommend removing two queues in order to add one queue). Thus, in accordance with the aforementioned example embodiments, if a particular computing device instance is already exceeding the specified hard limit of the "maximum number of queues per user" constraint prior to any determined staffing change (e.g., recommendation), then no additional queues can be added to that particular computing device instance since this would require removing multiple queues in order to add one queue.

The "maximum number of recommendations per week per user" constraint is an example per user fairness preference constraint that is intended to limit how often the same computing device instance (e.g., logged-in agent) is being selected for a staffing change (e.g., a queue change recommendation), regardless of the queues being changed or the number of queues changing per determined staffing change or recommendation. Each time a computing device instance is included in a determined staffing change, this counts as "1" for the purpose of comparing to the value specified in the "maximum number of recommendations per week per user" constraint. It does not matter if that particular instance of a determined staffing change recommends that the user be added to three queues and removed from two queues, for example; the recorded value of determined staffing changes for that computing device instance is still only incremented by one. In an example embodiment, a week is defined as a calendar week, Sunday through Sunday, UTC.

The "maximum number of queue changes per recommendation per user" constraint is an example per user fairness preference constraint that is intended to limit how many different queues can be changed in a single determined staffing change (e.g., a single recommendation) for a particular computing device instance. Adding or removing a single queue each counts as one change for the purpose of comparing to the value specified in the "maximum number of queue changes per recommendation per user" constraint. For example, a computing device instance with a determined staffing change (e.g., recommendation) to add three queues and remove two queues would have a count of five "queue changes per recommendation per user" for that determined staffing change, to be compared with the value specified in the "maximum number of queue changes per recommendation per user" constraint. Each computing device instance's "queue changes per recommendation per user" count resets with each execution of the queue recommendation engine (i.e., each time a staffing change is determined).

In addition to the above, some example embodiments may include interval occupancy ([Occupancy %]) as a fairness preference constraint, in order to prevent burnout and/or to contribute to the strategy in how computing device instances are selected. This could involve aggregating time spent in various states (e.g., talk time, hold time, after-call-work (ACW) time, and ready time) per computing device instance for the current day, for example, and storing that information (e.g., in 30-minute intervals). Occupancy could be calculated as [Occ]=([Total Talk]+[Total Hold]+[Total ACW])/([Total Talk]+[Total Hold]+[Total ACW]+[Total Ready]), for example. A user could then set an upper hard limit on occupancy, serving as a fairness preference constraint. State information of the types referenced above is described in further detail immediately below and may be available through software from a variety of providers, such as Intradiem, Inc., of Marietta, Georgia, USA (https://intradiem.com/, last accessed Oct. 7, 2024).

Figure 7:
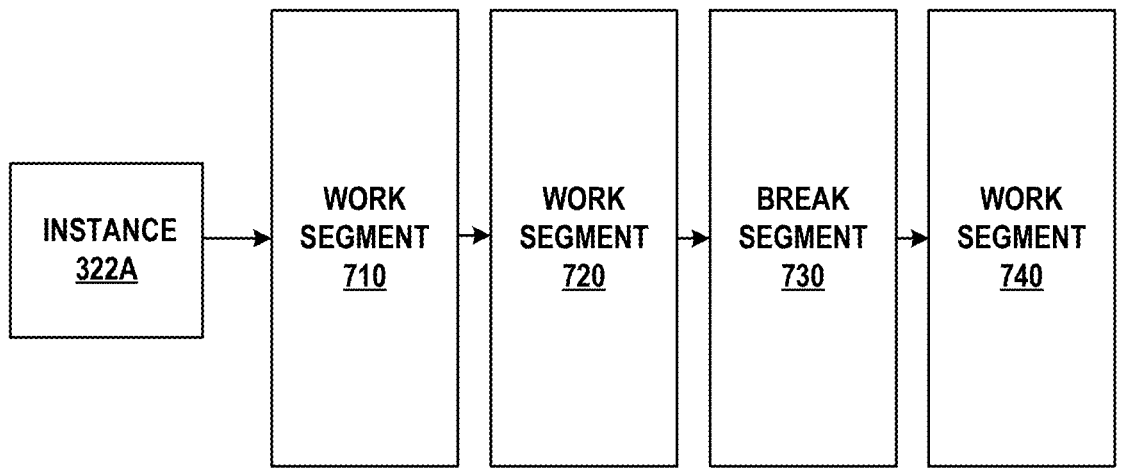
FIG. 7 is a block diagram illustrating a schedule assignment, according to an example embodiment.
Figure 8:
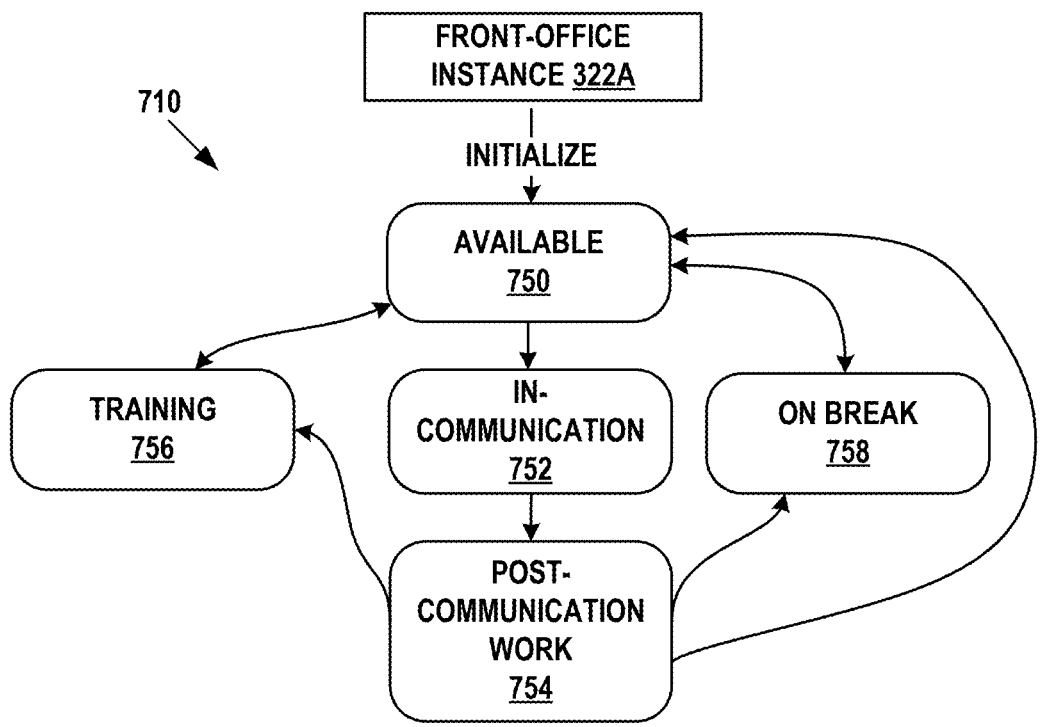
FIG. 8 is a block diagram illustrating operative states within a work segment, according to an example embodiment.

FIGS. 7 and 8 together illustrate example scheduling and operative states for a computing device instance. As discussed immediately above, some example embodiments may utilize state information as a fairness preference constraint, to assist in determining staffing changes. FIG. 7 illustrates a schedule assignment for a computing device instance 322A, in accordance with example embodiments. In particular, as an example, FIG. 7 conceptually demonstrates how a computing device instance (in this case, front-office computing device instance 322A) may be assigned to different work segments by WFM server 326. As used herein, a "work segment" (or colloquially, just "segment") may refer to a block of time in which a computing device instance is assigned to a specific task. For example, work segment 710 may be a segment in which front-office computing device instance 322A is assigned to work, work segment 720 may be a segment in which front-office computing device instance 322A is also assigned to work, work segment 730 may be a segment in which front-office computing device instance 322A is assigned to break, and work segment 740 may be a segment in which front-office computing device instance 322A is assigned to work. Work segments 710-740 are presented for the purpose of example.

In practice, many different work segments or orders of work segments may be assigned to computing device instances to satisfy the needs of enterprise network 320. Notably, within a given work segment, a computing device instance may perform various functions, each of which may be captured by a respective "operative state." While the aforementioned examples are directed to assignments of time blocks for front-office computing device instance 322A, the WFM server 326 (or another entity within or outside of enterprise network 320) may similarly assign blocks of time to back-office computing device instances, such as back-office computing device instance 342A. In other cases, schedules are assigned to front-office computing device instances, but not to back-office computing device instances, or vice-versa. In some example embodiments, the queue recommendation engine 314 may utilize operative state information from the WFM server to calculate an occupation percentage for each computing device instance, for use as a fairness preference constraint in determining staffing changes, as described below.

FIG. 8 illustrates operative states within work segment 710, in accordance with example embodiments. In particular, FIG. 8 conceptually demonstrates a front-office example, in which front-office computing device instance 322A may move between various operative states during the course of an assigned work segment. Back-office computing device instances, like back-office computing device instance 342A, may similarly move between various operative states, such as one or more of the following states: logged-in state, logged-out state, idle state, active state, unapproved application state, unapproved website state, locked-state, and/or shut-down state. As used herein, operative state (or colloquially, just "state") may refer to a current status of or function being performed by a computing device instance. Some operative states may be visited zero times or more than one time. Also, operative states may have more than one possible next state, thus representing a decision to be made by ACD server 324, for example.

When beginning a work segment, front-office computing device instance 322A may initialize into available state 750. Available state 750 may represent a state in which computing device instance 322A is capable of taking on any function. From available state 750, computing device instance 322A may transition to training state 756, in-communication state 752, or on-break state 758. In particular, training state 756 may represent a state in which computing device instance 322A is performing a training module, in-communication state 752 may represent a state in which computing device instance 322A is performing a communication with customers 330, and on-break state 758 may represent a state in which the computing device instance 322A is in a period of respite. In examples, ACD server 324 may assign computing device instance 322A to any of states 752, 756, or 758 based on current needs and communication demands.

FIG. 8 also depicts post-communication work state 754. This state may represent a state in which front-office computing device instance 322A is performing survey and/or evaluation work about a recent communication. Transitions to post-communication work state 754 may occur from in-communication state 752. From post-communication work state 754, ACD server 324 may assign computing device instance 322A to any of states 750, 756, or 758 based on current needs and communication demands.

It should be noted that the descriptions of FIGS. 7 and 8 are used for the purpose of example and are not intended to be limiting with respect to the embodiments herein. In practice, many different work segments or operative states may exist. Moreover, while the example of FIG. 8 was presented in the context of ACD server 324 assigning front-office computing device instance 322A to various states, back-office case system servers 350 (or another entity) could similarly assign back-office computing device instances, such as computing device instance 342A, to various states pertaining to case processing. For example, such states could include states pertaining to processing a return, post-return documentation, training, receiving a software update, and a break or powering-down, for example. In addition, instead of temporal work segments, back-office computing device instances might additionally or alternatively have non-temporal work "units" to be processed, such as a prescribed number of cases to be processed.

Returning to the discussion of per user fairness preference constraints, in example embodiments, each fairness preference constraint has a soft limit and a hard limit. In some examples, soft limits are optional, while hard limits are required. With respect to soft limits in per user fairness preference constraints, if the constraint solver can avoid breaking any of the soft limits when creating optimal solutions, then it will avoid breaking those soft limits. However, if the only way to create a valid solution is to break one or more soft constraints for one or more computing device instances, then it will break them when necessary. Breaking soft constraints in order to create a valid solution will typically happen when demand exceeds supply. In example embodiments, soft limits are specified as an integer value, such as one between 1 and 10, or between 1 and 99, or in another range of integers. With respect to hard limits in per user fairness preference constraints, in attempting to create a valid solution, the constraint solver cannot break hard limits under any circumstances. In example embodiments, as with soft limits, hard limits are specified as an integer value, such as one between 1 and 10, or between 1 and 99, or in another range of integers. In example embodiments, where both a soft limit and a hard limit is specified for a fairness preference constraint, the hard limit cannot be less than or equal to the soft limit.

In addition to the constraint-related settings discussed above, an additional type of configuration settings relates to queue qualification criteria, shown as criteria 606 in FIG. 6. A computing device instance (e.g., a logged-in agent) can only be added to queues for which it is qualified. For example, an enterprise might be able to provide, such as via a .csv upload, a matrix of all computing device instances and all respective queues those computing device instances are capable of handling. However, this requires a high level of on-going administration to ensure that this matrix remains valid and current. For many enterprises, such administration would be unrealistic due to the multitude of computing device instances involved. For example, some enterprise's contact centers can have upwards of more than 10,000 agents supporting more than 3,000 queues. For those enterprises, it may not be feasible to maintain an up-to-date matrix reflecting queue qualification criteria, due to constant agent turnover, new agent qualifications due to training and/or coaching, and/or addition or removal of queues over time in the contact center.

Therefore, while receiving a queue qualification matrix is one method for obtaining queue qualification criteria, some example embodiments provide for another way of tracking and assessing what queues a computing device instance can support. In particular, a historical user-to-queue association can be maintained and stored in a storage device such that an enterprise can configure a minimum number of hours, within a certain span of time, that a computing device instance (e.g., a logged-in agent) must have been previously associated to that queue in order for a user to be qualified on that queue. The pertinent user-configurable setting is a "minimum # of hours assigned within last # days" setting, where values for the number of hours and number of days may be entered or selected integers (or non-integers) provided by a user via an interactive graphical display screen. Note that this method assumes that computing device instances that are trained to handle a particular queue would have already been associated to that queue at some point in the past 90 days (or other specified time period). As such, according to example embodiments, there may be instances in which a computing device instance is indeed able and qualified to handle a particular queue, but because it either has not been assigned to that queue within the past 90 days (or other specified time period) or has not met prescribed thresholds, the system does not consider that particular computing device instance to be qualified for the purposes of the queue recommendation engine.

In addition to the constraint-related settings and queue qualification criteria settings discussed above, yet another type of configuration settings relates to run frequency for the queue recommendation engine, shown as setting 608 in FIG. 6. This is where an enterprise can specify at what time of day the system should determine a staffing change (e.g., generate a first round of recommendations) along with how many days into the current reporting period the system should wait before determining staffing changes (e.g., before generating recommendations for a given queue), according to example embodiments. Run frequency settings may be configured by a user via an interactive graphical form displayed on a display device, for example. Example configurable fields for the run frequency settings may include some or all of the following, some of which are illustrated in FIG. 6, each of which is stored in a storage device: (a) first daily run time, (b) last daily run time, (c) time zone, (d) run interval (e.g., in hours), (e) number of days before a first monthly recommendation, (f) number of days before a first quarterly (or other period) recommendation, and (f) days of the week. Some of these examples will now be described in further detail in the following paragraphs.

The "first daily run time" and "last daily run time" fields define the time of day (based on the selected time zone) for the first and last executions of the queue recommendation engine. The queue recommendation engine runs at the first daily run time and repeats based on the run interval until the last daily run time is reached. For example, if the specified first daily run time is 09:00, the specified last daily run time is 16:00, the time zone is "EST—Eastern Standard Time-UTC—05:00," and the run interval is 2 hours, then the queue recommendation engine initiates its staffing change determination process each day beginning at 09:00 Eastern Time, and will repeat the process at 11:00, 13:00, and 15:00. There would be no further executions until the next day since the next run time after that would be at 17:00, which is greater than the specified last daily run time of 16:00. The "run interval" field sets the frequency (e.g., in hours, such as an integer selection ranging from 1 to 4 hours) at which queue recommendation engine runs after the first daily execution, until the last daily run time is reached.

The "number of days before a first monthly recommendation" and "number of days before a first quarterly recommendation" fields relate to queues having a monthly/quarterly ASA or SL target. These fields may be used to cause the queue recommendation engine to not determine a staffing change (e.g., generate recommendations) f until a number of days specified by the pertinent one of these fields has passed. For example, enterprises might not typically react to a currently missed monthly/quarterly ASA/SL target if it has only been 2 or 3 days (or even 10 or 15 days) into the month or quarter. For some industries, it is expected that the beginning of the month is always busier but tapers off toward the end of the month and will ultimately average out to still be within target. For example, if the specified number of days before a first monthly recommendation is 8, then the queue recommendation engine would not determine any staffing changes (e.g., generate any recommendations) for queues having a monthly time period (i.e., "time period" set to monthly) until the 9th day of the calendar month. Similarly, if the specified number of days before a first quarterly recommendation is 45, then the queue recommendation engine would not determine any staffing changes (e.g., generate any recommendations) for queues having a quarterly time period (i.e., "time period" set to quarterly) until the 46th day of the calendar quarter. Example acceptable values for the "number of days before a first monthly recommendation" field may include integers ranging from 1 to 20, while example acceptable values for the "number of days before a first quarterly recommendation" field may include integers ranging from 1 to 70.

The "days of the week" field may be included to ensure that the queue recommendation engine only determines staffing changes (e.g., generates recommendations) on the specified days, which may be input by a user via a multi-select dropdown menu in an interactive graphical display screen, for example. The staffing changes should only be generated on the days selected. Using the immediately preceding example for quarterly queues, if the 46th day is not one of the days of the week selected, then the queue recommendation engine would wait until the next selected day of the week to determine staffing changes.

V. Determining Net Staffing

In example embodiments, the queue recommendation engine determines staffing changes based on relative net staffing across queues, in the form of net staffing attributes calculated from (1) service metrics (queue-related data) and (2) service level targets associated with queues. The determined net staffing attributes (i.e., one net staffing attribute respectively calculated for each queue or queue group maintained by a particular ACD server, for example) indicate staffing surpluses or staffing shortages of queues relative to one another. As such, determining net staffing by queue provides an indication of which queues need additional computing device instances (e.g., logged-in agents) versus which queues have an adequate or excess number of computer device instances. In addition to net staffing, the queue recommendation engine also utilizes information relating to what queues each computing device instance is qualified for. This second item, relating to queue qualifications, will be discussed in a subsequent section.

ACD servers typically provide real-time queue-related data (i.e., metrics) that include the following: calls in queue, longest call waiting, ASA (for calls in queue at a given point in time), number of calls being handled at a given point in time, and others. These legacy queue-related metrics may be retrieved from ACD servers via Application Program Interfaces (API), for example.

While useful, the above-mentioned real-time queue-related metrics do not allow for the accurate calculation or storage of cumulative totals by instance-queue by date for the purposes of historical analysis and future trending/predictions. Thus, in order to accurately calculate net staffing attributes (i.e., net staffing by queue) or which queues a user is qualified on (described in the next section), example embodiments set forth herein contemplate receiving and storing additional queue-related data beyond the legacy queue-related metrics set forth above. In particular, example embodiments include receiving from an ACD server and storing some or all of the following as queue-related data: (a) interval totals by queue, (b) daily totals by queue, (c) interval average calls by queue for each day of week, (d) current day totals by queue, and (e) historical user-to-queue associations. One of more of these may include receiving intermediate data from the ACD server (e.g., pulled from an API request from each ACD server for all queues (or a subset of queues) being monitored by that ACD server), to be used in further calculations to arrive at the above-listed example queue-related data.

Interval Totals By Queue

One example of queue-related data that can be used to help determine staffing changes is data relating to interval totals by queue, such as intermediate per-queue metrics from which interval totals by queue can be calculated. For example, the queue recommendation engine can calculate (e.g., via subtraction, division, or other mathematical manipulation, with rounding and/or time-zone compensation, as appropriate) interval totals by queue from intermediate per-queue metrics received and stored over two or more of the most recent intervals. Example intermediate per-queue metrics that can be received at each interval and utilized to calculate interval totals by queue include the following: (a) number of calls offered (e.g., for SL and ASA calculations), (b) number of calls answered (e.g., for ASA calculations), (c) SL percentage (e.g., for service level calculations), (d) ASA (e.g., for ASA calculations), and (e) AHT (e.g., for net staffing calculations). One or more of these intermediate per-queue metrics (e.g., SL percentage, ASA, and/or AHT) may itself be calculated from component metrics received from the ACD server. In example embodiments, the above example queue-related data (including any intermediate per-queue metrics and/or subcomponent metrics) are periodically received from the ACD server(s), such as via API requests made every 30 minutes for the most recently completed 30-minute interval. The queue-related data is then stored in a data structure in a computer readable storage device accessible by the queue recommendation engine, for example.

Daily Totals by Queue (Previous Day)

Another example of queue-related data that can be used to help determine staffing changes is data relating to daily totals by queue, which may include or constitute calculations (e.g., addition or averaging of interval data over an entire previous day) involving interval totals by queue (discussed above) and/or receiving from an ACD server other queue-related data (including relevant intermediate per-queue metrics) from which daily totals by queue can be calculated. In general, each type of daily per-queue data (e.g., daily total ASA per queue) will have a corresponding (e.g., aggregated) type of interval per-queue data (e.g., interval total ASA per queue). In the case of a target queue time period other than monthly or quarterly, some or all of the example specified metrics might accordingly switch as well (e.g., for a daily period, per-hour or per-4-hour metrics might be informative, while for a yearly period, a weekly granularity might be utilized, at least in part). The above-described queue-related daily total data is stored in a data structure in a computer readable storage device accessible by the queue recommendation engine, for example. The daily total data is stored for each instance of each queue #.

Determining net staffing by queue may include assessing how a particular queue is performing so far for a specified period, in terms of its target ASA or SL, as configured in its queue targets setting. Doing so helps in determining whether a queue has been (1) underperforming, to the extent that it will now need to exceed its original ASA/SL target in order to bring the overall average back in line by the end of the period, or (2) overperforming, such that it can run well below the original target and still meet its goal (i.e., target).

The first scenario (a queue determined to be underperforming) will likely contribute to a negative net staffing for upcoming days, while the second scenario (overperforming) will likely result in a positive net staffing. By utilizing this trend assessment, the queue recommendation engine may be able to make improved staffing changes (e.g., recommendations to add/remove queues from computing device instances), compared to if no such trend assessment were to be used.

In addition to the initial aggregated queue-related data described above, the following are additional example calculated metrics and/or subcomponent metrics that may serve as queue-related data for determining service level attributes: forecasted number of calls remaining, ASA Period, ASA Period Run Rate, SL Period, and SL Period Run Rate, which will now be described in further detail in the following paragraphs.

The forecasted number of calls remaining for a month or quarter (or other period specified in queue targets settings) can be used to calculate run rate data (e.g., ASA Period Run Rate and SL Period Run Rate). Ideally, and in accordance with an example embodiment, the forecasted number of calls remaining for a particular queue for that queue's period would be retrievable directly from an intraday data source, such as from a WFM server, an enterprise server, or an ACD server. However, typical WFM servers do not presently provide (or even determine) queue-level forecasting (which is the level of granularity used in example embodiments set forth herein). To the extent intraday WFM server data is utilized (e.g., in one or more machine learning models in the queue recommendation engine), the following types of data could be stored in a storage device: date, interval, instance, staffing group, queue #, forecast # of calls offered, forecast average handle time (AHT), forecast required computing device instances, and forecast scheduled computing device instances, according to an example embodiment. While in some example embodiments, a queue-level forecast could be extracted from data received from the WFM, other example embodiments forecast a number of calls remaining by utilizing queue-related data corresponding to the average number of calls per day so far in the month/quarter (or other period), and then multiply that average by the number of days remaining.

The ASA Period metric is the overall running ASA so far for the period (depending on the specified time period configured in the queue targets settings). According to example embodiments, the ASA Period metric is calculated using a weighted average ASA across all days within the period. The ASA Period Run Rate is the updated run rate for a queue in order to stay on track with the target ASA as defined in queue targets for the period. As with the ASA Period metric, the ASA Period Run Rate metric is calculated based on the specified time period configured in the queue targets settings. The ASA Period and ASA Period Run Rate metrics may include rounding to the nearest whole number, in example embodiments. Note that ASA Period Run Rate is only calculated for queues which are configured for Target Type="ASA" in queue targets.

The SL Period metric is the overall running service level percentage (SL) (e.g., rounded to the nearest whole percent) so far for the period (depending on the specified time period configured in the queue targets settings). According to example embodiments, the SL Period metric is calculated using a weighted average SL across all days within the period. The SL Period Run Rate is the updated run rate for a queue in order to stay on track with the target SL as defined in queue targets for the period. As with the SL Period metric, the SL Period Run Rate metric is calculated based on the specified time period configured in the queue targets settings. Note that SL Period Run Rate is only calculated for queues which are configured for Target Type="SL" in queue targets.

Some example embodiments may also track how many calls a computing device instance receives per queue, along with the average handle time (AHT) for each of those queues. For example, in addition to tracking time spent in each state (see above discussion with regarding fairness preference constraints), the system could additionally track the particular queues corresponding to the spent time. This resulting data (number of calls answered, total handle time (the sum of total talk time, total hold time, and total after-call-work (ACW) time), etc.) could be stored by date by computing device instance per queue, to assist in enabling strategies for selecting computing device instances to be involved in determined staffing changes.

Interval Average Calls by Queue Per Day of the Week

In order to accurately calculate net staffing requirements at a given point during a particular day, according to example embodiments, the system forecasts how many calls a particular queue is expected to receive for the remainder of that day. For example, a running average of the number of calls offered per interval per each day of the week may be stored in a data structure on a storage device accessible by a computing device, to be used by the system (e.g., by the queue recommendation engine) in determining staffing changes for any particular day of the week, such as recommended modifications to queue assignments for one or more computing device instances.

Current Day Totals by Queue

The above discussion related to a first part of determining a net staffing attribute, which included assessing how a queue has been performing so far for the period compared to its target ASA/SL and then calculating the new period run rate (i.e., the new ASA/SL target it will need to hit for the rest of the period in order to stay on track with meeting its overall goal by the end of the month/quarter. A second part of determining the net staffing attribute for a particular queue relates to evaluating whether or not that particular queue is actually hitting that run rate for the current day so far at a given point in time.

For example, assume that the Target Seconds=30 for a given queue with an ASA Target Type and an ASA Period Run Rate of 25 (which means that this queue needs to average ASA<=25 for the rest of the period). But also assume that so far for the current day, that queue has an ASA=32. Based on this scenario, that queue is not likely to hit the necessary ASA value in order to stay on track for where it needs to be by the end of the period. At that point, that given queue has a negative net staffing attribute for the day and additional computing device instances (e.g., logged-in agents) should be added to that queue. Likewise, the opposite could be true. A queue could be exceeding its target ASA/SL and/or could be exceeding its run rate for the day, at which point that queue would have a positive net staffing attribute and could potentially have excess computing device instances (e.g., logged-in users) removed in order to support other queues, if necessary.

Similar to the previous-day daily totals by queue data discussed above, current-day daily totals by queue can be aggregated and stored across all intervals of the current day (relative to the queue's time zone) instead of across all intervals of the previous day. In addition to this aggregated data, additional example calculated metrics for use in determining staffing changes (e.g., recommended modifications to queue assignments) could include the following: forecasted number of calls that a particular queue is expected to receive for the remainder of the current day, (g) ASA Daily Run Rate, (h) SL daily run rate, and (i) average number of calls offered/answered per interval, each of which are described in the following paragraph.

The forecasted number of calls that a particular queue is expected to receive for the remainder of the day may based on a stored running average of the number of calls offered per interval per each day of the week, accounting for time zones. Note that this metric only uses the running average to create an initial estimate for how many calls could be remaining for the current day. However, this does not take into account actual trending for the current day itself. For example, it could be that so far for the day, a particular queue is actually receiving 20% more calls than typical (or vice versa). If this is the case, then example embodiments can include calculating an enhanced estimate for the number of calls remaining for the current day that factors in any such trending, as desired. The ASA Daily Run Rate metric indicates what ASA needs to be run for the remainder of the day in order to hit that revised ASA target by the end of the day (or as close to it as possible). It is calculated similarly to how the ASA Period Run Rate (described above) was calculated and is only calculated for queues that are configured for Target Type="ASA" in the queue targets settings. The SL Daily Run Rate metric indicates what SL needs to be run for the remainder of the day in order to hit that revised SL target by the end of the day (or as close to it as possible). It is calculated similarly to how the SL Period Run Rate (described above) was calculated and is only calculated for queues that are configured for Target Type="Service Level" in the queue targets settings. The average number of calls offered/answered per interval metric specifies how many intervals (e.g., 30-minute intervals) are within a particular queue's total hours of operation.

Use of the Erlang-C Model in Calculating Net Staffing

As previously described, to determine net staffing per queue, the queue recommendation engine may utilize one or more models, such as one or more machine learning models or the Erlang-C Model (or variations thereof). Additional information regarding the Erlang-C formula (see Equation 1, below), created in 1917 by A. K. Erlang, may be found in numerous sources, including at Pearce, "Erlang C Formula-Made Simple with an Easy Worked Example," https://www.callcentrehelper.com/erlang-c-formula-example-121281.htm, accessed on Oct. 7, 2024, which is hereby incorporated by reference. The following discussion provides additional context surrounding the Erlang-C model and its use in example embodiments.

The preceding sections described receiving, aggregating, and/or calculating queue-related data, including historical queue-related data, that characterizes how a queue has been performing so far in a specified period (e.g., monthly or quarterly) and how that queue needs to perform for the remainder of that period in order to stay on track with its overall target ASA/SL as defined in queue targets (i.e., the run rate). The preceding sections additionally described calculating current-day data to evaluate how a queue is actually performing compared to the calculated run rate. In a general sense, if a particular queue is underperforming so far for the day compared to its run rate, then that queue is understaffed and needs to have additional computing device instances (e.g., logged-in agents) added to it. Likewise, if a particular queue is over-performing compared to its run rate, then it could potentially afford to have computing device instances removed from it (in order for those users to support another queue instead). The following discussion details an example process of calculating exactly how many computing device instances a queue has (at the most recent update) versus how many it actually needs in order to stay on track with its period run rate for the rest of the day. The difference between these two numbers is the net staffing for that queue, also referred to herein as the net staffing attribute.

However, it is not enough to simply count the number of computing device instances that are associated to any given queue and use that as the number of computing device instances a queue currently has. Instead, it is necessary to account for the fact that every computing device instance is likely to be associated with multiple queues (and thus any particular computing device instance's time will be spread across multiple queues). In addition, at least in the case of computing device instances constituting human logged-in agents, it may be unrealistic that calls are handled, one after another repeatedly, with no breaks in-between. A more likely scenario is that a human logged-in agent will take a call from one queue, then potentially take a call from a different queue, then go on break, or a multitude of other scenarios. In addition, each queue will likely have different call arrival patterns (thus requiring more or fewer computing device instances at different points in time compared to other queues), different average handle times, and are set at different priorities within a particular computing device instance's queue association profile. These are complex problems that require complex solutions. Fortunately, however, there are some standard mathematical equations, including the Erlang-C equation set forth below as Equation 1, that may be utilized by example embodiments to address the potential complexities set forth immediately above.

$$P_w = \frac{\frac{A^N}{N!}\frac{N}{N-A}}{\left(\sum_{i=0}^{N-1}\frac{A^i}{i!}\right)+\frac{A^N}{N!}\frac{N}{N-a}} \qquad \text{Equation 1.(Erlang-C)}$$

As described in Equation 1, Erlang-C essentially allows for calculating a probability that a call waits (Pw) given the Traffic Intensity (A) and the Number (N) of available computing device instances (e.g., logged-in agents). According to example embodiments, the resulting probability can be used as an input to a subsequent set of equations as part of calculating how many computing device instances are needed in order to achieve a specific ASA or SL target. Note that while the following process is illustrated via a set of numbered steps, various embodiments may utilize additional or alternative steps (or fewer steps), perhaps ordered differently from as described below.

Step 1—The first step in performing this calculation is to work out the average Traffic Intensity (A) for a given 30-minute interval:

[A]=([# Off]*[AHT])/1800

So, for example, if [# Off]=100 and [AHT]=180, then [A]=10

Step 2—The second step is to create an initial value for Number of Users (N) required:

[N]=Round([A])+1

For the present example, [N]=11.

Step 3—The third step in Erlang-C is to plug the values for [A] and [N] into the equation in order to calculate the probability that a call waits, which in this case is [Pw]=0.6821 (or 68.21% probability that a call will wait).

According to example embodiments, the calculated probability that a call waits [Pw], along with values for [A] and [N], can then be used to estimate the ASA or SL that would result given those three variables, using either Equation 2 or Equation 3, both of which are set forth below:

$$Est\ ASA = \frac{P_w * AHT}{N - A}.$$

Equation 2

$$Est\ SL = 1 - [P_w * e^{-[(N-A)*(Target\ Seconds/AHT)]}],$$

Equation 3 where "e" refers to Euler's number, having a value of approximately 2.71828.

Step 4a—For example, assuming that a particular queue has Target Type="ASA" and Target Seconds=30 (as defined in queue targets settings). In order for the queue to meet this target, it needs to have an [Est ASA]<=Target Seconds.

Using Equation 2, above (since the specified Target Type is "ASA"), the estimated ASA that that queue would achieve, given [Pw]=6821, [A]=10 and [N]=11, is 122.78 (EST ASA=122.78). Since 122.78 is not less than or equal to the target of 30, additional computing device instances would need to be added to the queue to hit the ASA target of 30 seconds or less. The number of additional computing device instances that would need to be added can be calculated by going back to Equation 1, the Erlang-C equation, and incrementing [N] by 1 (or [N]=[N]+1) and calculating a new value for [Pw] given [A]=10 and [N]=12. Then, the new values for [Pw] and [N] (along with the same value for [AHT]) can be used as inputs into Equation 2, to determine whether the new value for [Est ASA]<=Target Seconds.

Thus, continuing the example, if [N]=12 and [A]=10, then [Pw]=0.4494. Likewise, if [N]=12, [Pw]=. 4494 and [AHT]=180, then [Est ASA]=44.44, which is still not less than or equal to the target of 30. However, if the iteration were continued one more time, such that [N]=13, then Equation 2 would calculate as [Est ASA]=17.12, which is indeed less than or equal to 30. Therefore, in order to achieve Target Seconds=30 (or less), given [# Off]=100 and [AHT]=180 in a given interval, a queue would need at least 13 computing device instances, assuming that all 13 of those computing device instances are dedicated to that one queue and not supporting any other queues. Example embodiments account for this likely-false assumption by including a padding factor or cushion.

Step 4b—Likewise, a similar calculation can be used with Equation 3 to estimate how many computing device instances would be required in order to achieve a specified service level percentage (SL). For example, assume that a particular queue has Target Type="Service Level," Target %=80% and Target Seconds=30. In order for that queue to meet its specified SL target, it would need to have [Est SL]>=Target %.

Using Equation 3, above, (since the specified Target Type is "SL"), the estimated service level that that queue would achieve given [Pw]=6821, [A]=10, [N]=11, [AHT]=180 and Target Seconds=30, is 0.4226 ([Est SL]=4226). Since 0.4226 is not greater than or equal to the specified target of 0.80 (or 80%), additional computing device instances would need to be added to the queue to hit the specified SL target.

Thus, example embodiments include performing a similar iteration as described for the previous example, by incrementing [N] by 1 and then solving for [Pw] and Equation 3 again until [Est SL]>=Target %. When [N]=12, the resulting [Est SL] is 0.6780, which is still not greater than or equal to 80% (i.e., 0.80). However, when [N]=13, Equation 3 calculates [Est SL] as 0.8270, which is greater than the specified 80% SL target. So, similar to the previous example, this queue would need at least 13 computing device instances to achieve Target %=80% at Target Seconds=30, given [# Off]=100 and [AHT]=180 for a given interval. Note that while the number of computing device instances required was calculated as 13 in both of the above examples, this was merely a coincidence.

Example embodiments set forth herein utilize Equations 1, 2, and 3, in combination with queue-related data described above in order to both estimate how many computing device instances a particular queue has had staffed to it so far and how many computing device instances it will need (e.g., for the next few hours) in order to get back on track toward meeting its service target (e.g., ASA or SL target). These estimates are described in the following sections.

Example Erlang-C Second Step Calculations

The preceding section described the Erlang-C equation and its use with respect to example embodiments. For example embodiments utilizing Erlang-C instead of alternative models, such as one or more machine learning models, the next step in ultimately calculating net staffing by queue is to calculate the current estimated number of computing device instances (e.g., logged-in agents) staffed by queue. The following discussion describes an example method for doing so, using the approach described in the previous section as applied to the queue-related data discussed above, namely the data describing "current day totals by queue." As mentioned above, one technique would be to simply take a count of all computing device instances that are currently associated to a given queue (i.e., queue # and instance) and use that as the number of computing device instances currently staffed. However, in many contact centers, computing device instances are typically assigned to multiple queues such that none of those computing device instances are going to be dedicated to that one queue. Therefore, simply counting the number of computing device instances associated to a queue will assume more computing device instances than are actually staffed.

Example embodiments utilize a similar approach to that described in the previous section (i.e., relying, in part, on the Erlang-C equation to calculate the number of required computing device instances) in order to calculate the number of staffed computing device instances. Accordingly, example embodiments can derive how many computing device instances a given queue would have had, in order to achieve the ASA/SL it did, if all computing device instances had indeed been dedicated to that queue. This results in an apples-to-apples comparison when we use the method involving Erlang-C to derive how many computing device instances a queue will require, which by nature of the method assumes that all of those computing device instances will be dedicated to that queue.

The number of staffed computing device instances ("[# Users Staffed]" in the following discussion) queue-related data can be calculated by a computing device executing the following steps, with reference to the Erlang-C approach described above, using received, aggregated, and/or calculated queue-related data, according to example embodiments (assuming a 30-minute (1800 second) interval):

Step 1
    For queues with Target Type="ASA", then [A]=([# Ans Avg Interval]*[AHT Today])/1800.
    For queues with Target Type="Service Level", then [A]=([# Off Avg Interval]*[AHT Today])/1800
Step 2
    Calculate initial value of [N]=Round ([A])+1
Step 3
    Calculate initial value of [Pw]
Step 4a (For queues with Target Type="ASA")
    Use [A] and [AHT Today] along with the initial values for [N] and [Pw] to calculate the initial value of [Est ASA].
    If the initial [Est ASA]<=[ASA Today], then set [# Users Staffed]=initial value of [N].
    Else if the initial [Est ASA]>[ASA Today]
        Continue to iterate [Pw] and [Est ASA] by setting [N]=[N]+1 until [Est ASA]<=[ASA Today].
        Once the lowest possible value for [N] has been found such that [Est ASA]<=[ASA Today], then set [# Users Staffed]=[N].
    Step 4b (For queues with Target Type="Service Level")
        Use [A], [AHT] and Target Seconds along with the initial values for [N] and [Pw] to calculate the initial value of [Est SL].
        If initial [Est SL]>=[SL Today], then set [# Users Staffed]=initial value of [N].
        Else if initial [Est SL]< [SL Today]
        Continue to iterate [Pw] and [Est SL] by setting [N]= [N]+1 until [Est SL]>=[SL Today].
        Once the lowest possible value for [N] has been found such that [Est SL]>=[SL Today], then set [# Users Staffed]=[N].

Note that, for intervals other than 30 minutes (1800 seconds), any instances of "1800" in the above steps would be replaced by the number of seconds in the applicable interval. The above method is one example of how [# Users Staffed] queue-related data can be calculated, for use in an Erlang-C model to determine net staffing. Other methods, including variations (e.g., alternative orderings, additional/alternative/removed steps or portions of steps) of the method set forth above, may alternatively be used.

The number of required computing device instances ("[# Users Required]" in the following discussion) queue-related data can be calculated by a computing device executing the following steps, with reference to the Erlang-C approach described above, using received, aggregated, and/or calculated queue-related data, according to example embodiments (assuming a 30-minute (1800 second) interval):
Step 1
    For queues with Target Type="ASA", then [A]=([# Ans Avg Interval]*[AHT Today])/1800
    For queues with Target Type="Service Level", then [A]=([# Off Avg Interval]*[AHT Today])/1800
Step 2
    Calculate initial value of [N]=Round ([A])+1
Step 3
    Calculate initial value of [Pw]
Step 4a (For queues with Target Type="ASA")
    Set [ASA RR] as a temporary variable.
        If [ASA Daily Run Rate]<1, then [ASA RR]=1
        Else [ASA RR]=[ASA Daily Run Rate]
    Use [A] and [AHT] along with the initial values for [N] and [Pw] to calculate the initial value of [Est ASA].
    If the initial [Est ASA]<=[ASA RR], then set [# Users Required]=initial value of [N.
    Else the if initial [Est ASA]>[ASA RR]
        Continue to iterate [Pw] and [Est ASA] by setting [N]=[N]+1 until [Est ASA]<=[ASA RR].
        Once the lowest possible value for [N] has been found such that [Est ASA] <=[ASA RR], then set [# Users Required]=[N].
    Step 4b (For queues with Target Type="Service Level")
    Set [SL RR] as a temporary variable.
        If [SL Daily Run Rate]>99%, then [SL RR]=99%.
        Else [SL RR]=[SL Daily Run Rate]
    Use [A], [AHT] and Target Seconds along with the initial values for [N] and [Pw] to calculate the initial value of [Est SL].
    If the initial [Est SL]>=[SL RR], then set [# Users Required]=initial value of [N] Else if the Initial [Est SL]< [SL RR]
        Continue to iterate [Pw] and [Est SL] by setting [N]=[N]+1 until [Est SL] >=[SL RR].
        Once the lowest possible value for [N] has been found such that [Est SL] >=[SL RR], then set [# Users Required]=[N].

Note that, for intervals other than 30 minutes (1800 seconds), any instances of "1800" in the above steps would be replaced by the number of seconds in the applicable interval. The above method is one example of how [# Users Required] queue-related data can be calculated, for use in an Erlang-C model to determine net staffing. Other methods, including variations (e.g., alternative orderings, additional/alternative/removed steps or portions of steps) of the method set forth above, may alternatively be used.

Once the number of staffed computing device instances ([# Users Staffed]) and the number of required computing device instances ([# Users Required]) have been calculated, such as by using the two example methods set forth immediately above, example embodiments then utilize a computing device to make the following determinations of net staffing attribute ("[Net Staff]" in the following discussion) for each queue:

For queues with Target Type="ASA" and Time Period="Daily", determine the net staffing attribute [Net Staff] with reference to Table 1, below:

TABLE 1

| If [ASA Daily Run Rate] | Then [Net Staff] = |
| --- | --- |
| >[ASA Period Run Rate] | [# Users Staffed] − [# Users Required] |
| =<[ASA Period Run Rate] | [# Users Staffed] − ([# Users Required] * (1 + Requirements Buffer %)) |

For queues with Target Type="ASA" and Time Period < > "Daily", determine the net staffing attribute [Net Staff] with reference to Table 2, below:

TABLE 2

| If [ASA Period Run Rate] | AND [ASA Daily Run Rate] | Then [Net Staff] = |
| --- | --- | --- |
| >Target Seconds | >[ASA Period Run Rate] | [# Users Staffed] − [# Users Required] |
| >Target Seconds | =<[ASA Period Run Rate] | 0 |
| =<Target Seconds | >[ASA Period Run Rate] | 0 |
| =<Target Seconds | =<[ASA Period Run Rate] | [# Users Staffed] − ([# Users Required] * (1 + Requirements Buffer %)) |

For queues with Target Type="Service Level" and Time Period="Daily", determine the net staffing attribute [Net Staff] with reference to Table 3, below:

TABLE 3

| If [SL Daily Run Rate] | Then [Net Staff] = |
|---|---|
| <[SL Period Run Rate] | # Users Staffed] – [# Users Required] |
| =>[SL Period Run Rate] | [# Users Staffed] – ([# Users Required] * (1 + Requirements Buffer %)) |

For queues with Target Type="Service Level" and Time Period < > "Daily", determine the net staffing attribute [Net Staff] with reference to Table 4, below:

TABLE 4

| If [SL Period Run Rate] | AND [SL Daily Run Rate] | Then [Net Staff] = |
|---|---|---|
| <Target % | <[SL Period Run Rate] | [# Users Staffed] – [# Users Required] |
| <Target % | =>[SL Period Run Rate] | 0 |
| =>Target % | <[SL Period Run Rate] | 0 |
| =>Target % | =>[SL Period Run Rate] | [# Users Staffed] – ([# Users Required] * (1 + Requirements Buffer %)) |

Note that the above is just one example method of determining a net staffing attribute. Alternative methods could also be used, with the resulting net staffing attribute utilized by example embodiments in determining a staffing change (e.g., a recommended modification to a queue assignment).

VI. Determining Queue Qualifications

According to example embodiments, the queue recommendation engine system embodiments described herein determine staffing changes (e.g., recommended modifications to queue assignments) based on two main determinations: (1) net staffing by queue and (2) which queues a computing device instance is qualified on, along with relevant metrics related to those queues. Determining net staffing has been described immediately above. To determine what queues a computing device instance is qualified on, example embodiments utilize an ACD server's queue association service (e.g., an agent-to-queue association service) to receive and store computing-device-instance-to-queue associations as they change over time, in addition to tracking the amount of time a particular computing device instance has been associated to a particular queue on a given day. For example, at the beginning of each day, the system could determine and store (in a computer readable storage device) the duration of time (e.g., in hours, rounded to one-tenth of an hour) that a computing device instance spends associated to a given queue while logged into to the pertinent ACD server. Then at the beginning of each subsequent new day, the system could aggregate the total duration spent in the given queue for the previous day and store it, such as in a data structure on a computer readable storage device. Other techniques for determining what queues a computing device instance is qualified on could involve using a technique other than the "historical queue associations" example described above. For example, an enterprise or other entity (e.g., an ACD server, WFM server, or other in-house or third-party computing device) could simply provide queue-qualification data (e.g., as a spreadsheet or other data table upload) for each computing device periodically or as the data changes.

VII. Recommendation Engine: Determining Staffing Changes

The above sections described (1) settings and configurations, including constraints, (2) determining net staffing using queue-related data/metrics, and (3) determining queue qualifications. The following discussion relates to how those items are used in example embodiments to determine staffing changes. In particular, an example queue recommendation engine is shown and described. While the example will be provided with specific implementation details, such as specific orderings, inputs, outputs, steps and functions, and data sources, this is not intended to foreclose alternative implementations of queue recommendation engines, which are intended to fall within the scope of the presently described and/or claimed technology.

Figure 9:
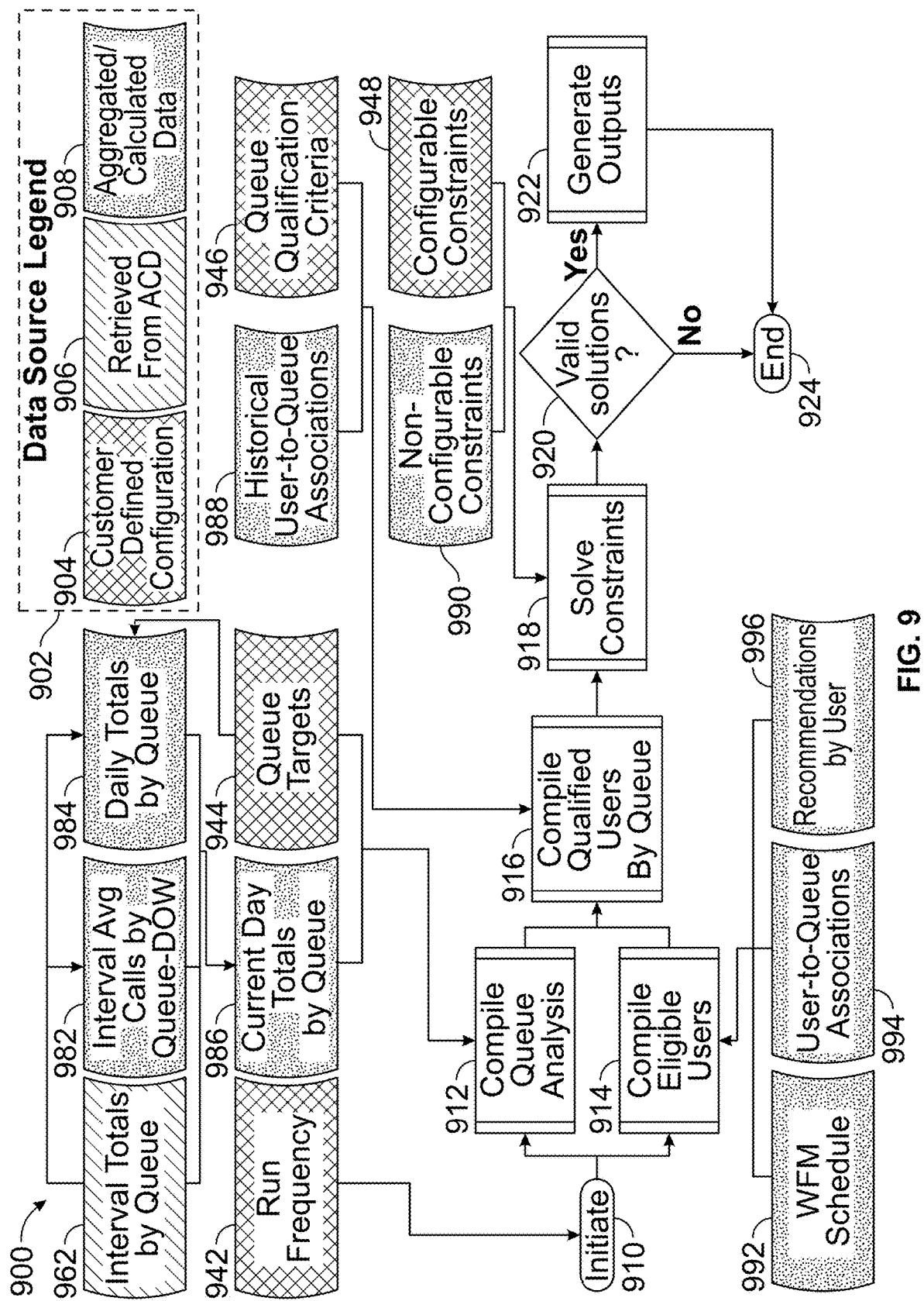
FIG. 9 is a high-level flow diagram illustrating example process steps in a method for determining staffing changes, according to an example embodiment.

FIG. 9 is a high-level flow diagram illustrating example process steps to be executed by one or more computing devices operating as a queue recommendation engine in a method 900 for determining staffing changes. As shown in the data source legend 902, the process steps utilize inputs retrieved from and/or stored in relation to one or more data sources, including configurations/settings defined by the enterprise/customer ("Customer Defined Configuration") 904, queue-related data received from and/or derived from one or more ACD servers ("Received from ACD") 906, additional queue-related data aggregated and/or calculated based on the data received from the one or more ACD servers ("Aggregated/Calculated Data") 908. From those compiled inputs, as will be described, a constraint solver determines an optimal solution that does not violate any hard constraints. Finally, the output (e.g., a staffing change, such as a recommended modification to one or more queue assignments) is generated, which may include implementing the staffing change, with or without user approval.

Compiling Inputs for the Queue Recommendation Engine

For the example embodiment illustrated in FIG. 12, the queue recommendation engine receives inputs sourced from configurations/settings defined by the enterprise/customer ("Customer Defined Configuration") 904 that include the following (using terminology as described elsewhere herein): Run Frequency 942, queue targets 944, Queue Qualification Criteria 946, and Configurable Constraints 948. Inputs sourced from queue-related data received from and/or derived from one or more ACD servers ("Received from ACD") 906 include Interval Totals by Queue 962 (see, e.g., FIG. 9 and accompanying description). Inputs sourced from additional queue-related data aggregated and/or calculated based on the data received from the one or more ACD servers ("Aggregated/Calculated Data") 908 include Interval Avg Calls by Queue-DOW 982, Daily Totals by Queue 984, Current Day Totals by Queue 986, Historical User-to-Queue Associations 988, Non-Configurable Constraints 990, WFM Schedule information 992, User-to-Queue Associations 994, and Recommendations by User 996.

Upon initiating 910, at periodic frequencies defined by the specified Run Frequency setting 942, in an example embodiment, the method 900 compiles three different files or tables (i.e. data structures stored on a computer-readable storage device) that will be used as inputs to a constraint solver, described below, to generate recommendations. These include the following: (1) Queue Analysis input 912—this includes "Current Day Totals by Queue" metrics, for example; (2) Eligible Computing Device Instances input

914—a list of computing device instances that are eligible to be used for the current execution of the illustrated method 900 (e.g., based only on whether or not the computing device instance is logged into an ACD and has sufficient time remaining on the current shift); and (3) Qualified Computing Device Instances by Queue input 916—this includes all queues that each of the eligible computing device instances are qualified for, based on the Queue Qualification Criteria (see the above section on "configuration settings (constraints)"). Each of these three inputs will now be described in further detail.

A first input to the queue recommendation engine is the Queue Analysis input 912. In addition to any other metadata that may be utilized by the constraint solver, according to example embodiments, the Queue Analysis input 912 includes per-queue (i.e., instance-queue) data characterized as follows: (a) only those queues which are configured in queue targets, with Status="Active"; (b) those queues with Time Period="Daily" will always be included assuming they meet other defined conditions; (c) those queues with Time Period="Monthly" will only be included once the defined number of days has passed as per # Days Before First Monthly Recommendation parameter; (d) those queues with Time Period="Quarterly" will only be included once the defined number of days has passed as per # Days Before First Quarterly Recommendation parameter; (e) only those queues open (as determined from the Hours of Operation and Time Zone configured in queue targets for that queue) at the time of execution should be included; and (f) a queue must also have been open for at least [Start Time Cushion] hours prior to the time of execution and have at least [End Time Cushion] hours of time remaining before it closes, where [Start Time Cushion] and [End Time Cushion] are configurable or non-configurable constraints (e.g., having a default value="2"). Stored data relating to this first input 912 could include some or all of the following, according to example embodiments: Instance, Queue #, ASA Today, SL Today, ASA Daily Run Rate, SL Daily Run Rate, ASA Period Run Rate, SL Period Run Rate, Net Staff, Business Unit, Target Type, Target, Priority, Has Penalty, and Missed Target Strategy, for example.

A second input to the queue recommendation engine is the Eligible Computing Device Instances input 914. In addition to any other metadata that may be utilized by the constraint solver, according to example embodiments, the Eligible Computing Device Instances input 914 includes per-computing-device-instance data characterized as follows: (a) only those computing device instances that are currently logged into an ACD; and (b) only those computing device instances that have at least [Shift Cushion] minutes remaining on their current shift (e.g., based on their schedule imported from an applicable WFM server), where [Shift Cushion] is a configurable or non-configurable constraint (e.g., having a default value of "60"). Stored data relating to this second input 914 could include some or all of the following, according to example embodiments: Current Instance (ACD server identification), computing device instance ID, a number of queue associations (count of queues each computing device instance is currently associated to based on an ACD server's queue association service (e.g., an agent-to-queue association service)), and a respective number of implemented staffing changes (e.g., recommendations), if any, directly involving each computing device instance for the current calendar week (or other specified time period), for example.

A third input to the queue recommendation engine is the Qualified Users by Queue input 916. In addition to any other metadata that may be utilized by the constraint solver, according to example embodiments, the Qualified Users by Queue input 916 includes per-computing-device-instance/per-queue data characterized as follows: (a) only those computing device instances that are included on the Eligible Users input; and (b) all queues that the included computing device instances are currently associated to, based on the an ACD server's queue association service (e.g., an agent-to-queue association service), for the ACD server instance they are logged into, in addition to any other queues for which the user satisfies the Queue Qualification Criteria (using the Historical User-to-Queue Associations table) and are for the same instance that the user is currently logged into, for example. Note that, according to example embodiments, any queue that the computing device instance is currently associated to should be included whether or not the computing device instance technically meets the Queue Qualification Criteria for that queue. Furthermore, if a computing device instance has not met any of the Queue Qualification Criteria for any other queues beyond the ones they are already associated to, then only the queues that they are currently associated to are included. Stored data relating to this third input 916 could include some or all of the following, according to example embodiments: ACD server instance, queue #, computing device instance ID (for the ACD server instance they are currently logged into as well as the instance the corresponding queue is configured for), and whether the computing device instance is currently associated to a particular queue or not, for example.

Solving for the Constraints (Constraint Solver)

According to example embodiments, once the three input sets 912, 914, and 916 described immediately above have been compiled, those input sets are provided to constraint solver. The constraint solver may be implemented as one or more software libraries or code consisting of instructions stored on a computer readable medium, and may include artificial intelligence optimization algorithms (e.g., Tabu Search, Simulated Annealing, Late Acceptance, and other metaheuristics) with score calculation and other constraint solving techniques for NP-complete or NP-hard problems. OptaPlanner™, available at https://www.optaplanner.org/ (accessed Oct. 7, 2024), is one example of an open source constraint solver. Other constraint solvers may alternatively be used.

The constraint solver utilizes the three input sets 912, 914, and 916 to solve 918 for the constraints 990 and 948. The constraint solver first evaluates whether there are any queues that have a negative [Net Staff]. If so, the constraint solver will then attempt to solve for the deficit by adding qualified computing device instances to that queue while solving for the various specified hard and soft constraints 990 and 948 described above. If no valid solutions exist (determined at 920), then no staffing changes will be determined (e.g., no recommendations for modifications to queue assignments will be generated) and the method ends 924; otherwise, whatever valid staffing changes are determined will be generated 922 as outputs to be stored in a computer-readable storage device for further processing (e.g., implementing the staffing changes, such as by transmitting a queue-change request to an ACD server or by providing recommendations to a user, such as via a graphical display).

Example embodiments include storing determined staffing changes in data structures having the following transactional level data for each staffing change: (a) an ID for each staffing change (each individual staffing change should be stored as a separate record, such that if the system recommends for a single computing device instance that one queue should be added and one queue should be removed, then that would result in two records stored for that computing device instance for that execution instance); (b) date/time created; (c) data/time processed (e.g., if the staffing change is a recommendation requiring approval prior to actioning); (d) by whom processed (e.g., a system login ID, if the staffing change is a recommendation requiring approval prior to actioning), (d) computing device instance ID, (e) instance and queue #, (f) change type (e.g., add queue, remove queue), and (g) status (e.g., accepted, rejected, pending, ignored, if the staffing change is a recommendation requiring approval prior to actioning).

Generating Staffing Change Outputs

Some example embodiments implement determined staffing changes without any approval (e.g., administrative entity approval). For example, determined staffing changes could be implemented without any human or other administrative involvement to cause near-instantaneous implementation of determined staffing changes after those determined staffing changes are determined. As another example, determined staffing changes could be implemented without any real-time human or other administrative involvement, but in response to a pre-configured setting that effects a real-time approval of any determined staffing changes, such as all determined staffing changes or those determined staffing changes meeting pre-defined conditions set in advance by any administrative entity. As yet another example, whether approval is required or not before implementing determined staffing changes could be a switchable setting based on current operational conditions in the contact center or other factors. In any of the above automated or semi-automated examples, the determined staffing changes could be displayed to an administrative entity (see FIGS. 10-13, for example display information), even if no approval is sought or required.

Other example embodiments include first displaying recommendations to an administrative user, such as an administrative user (e.g., a supervisory entity) associated with the contact center or an enterprise associated with the contact center. The system may then require that the administrative user approve any recommendations before those recommendations are actually implemented, such as by the system sending a queue assignment change request to an ACD server via an API message. Where approval of recommendations is required or allowed, an interactive display screen like the ones shown in FIGS. 10 and 12 may be utilized, possibly in combination with a rules-based system that issues an alert to one or more entities (e.g., administrative users or computing device instances) or takes some other action when a recommendation is generated. FIG. 10 illustrates a first grid 1000 showing Recommendations by Queue while FIG. 12 illustrates a second grid 1200 showing Recommendations by Computing Device Instance.

FIG. 11 illustrates a table 1100 that provides additional information regarding columns that may be included in the Recommendations by Queue grid 1000 of FIG. 10, according to example embodiments. Similarly, FIG. 13 illustrates a table 1300 that provides additional information regarding columns that may be included in the Recommendations by Computing Device Instance grid 1200 of FIG. 12, according to example embodiments. The word "User" in FIGS. 9-20 refers to "computing device instance" (including a human user logged-in to a computing device, in some examples) as used elsewhere herein, rather than to an administrative user viewing the user interface information shown in these figures. As illustrated and described, the various columns in the grids 1000 and 1200 of FIGS. 10 and 12 correspond directly or are readily derived from similarly named items (e.g., calculated metrics) described herein. Also illustrated in the grids 1000 and 1200 are various interface elements, such as column selectors, filter selectors, arrangeable columns, sorting, pagination, item counts, and time stamps to provide the administrative user with context and flexibility in how the grid information in grids 1000 and 1200 is displayed. In addition to simply viewing the information displayed in the columns shown in the grids 1000 and 1200 themselves, administrative users are also to view the list of actual computing device instances being counted under the "Users to Add" and "Users to Remove" columns of the first grid 1000 of FIG. 10 and the actual queues recommended for addition or removal under the "# Queues Add" and "# Queues Remove" columns of the second grid 1200 of FIG. 12. For example, by clicking on a value (i.e., cell in the grid 1000 or 1200) listed in one of those respective columns, the list of actual computing device instances (e.g., by name and/or device identifier) or actual queues (e.g., by queue number and instance) will be displayed to the administrative user, such as in a pop-up window or other interface.

For example, with regard to the second grid 1200 ("Recommendations by Computing Device Instance") shown in FIG. 12, the administrative user may click on a name or login or be presented with and select an "Actions" interface item (not shown, but perhaps displayed as the user hovers over a particular displayed name/login) to cause a "Queues to Modify" window to be displayed. FIG. 14 illustrates an example "Queues to Modify" window 1400. The "Queues to Modify" window 1400 allows the administrative user to review the specifics (Queue # and name, priority level, etc.) of each recommendation (e.g., "add" or "remove") and accept or reject (or ignore) the recommendation for a single computing device instance. As shown, one or more interface elements, such as checkboxes and/or buttons may be displayed to the administrative user to allow the administrative user to select recommendations to be accepted and/or rejected. Upon accepting or rejecting one or more recommendations, example embodiments of the system display a confirmation prompt and the administrative user's actions (e.g., accepting, rejecting, and/or ignoring specific recommendations) are logged by the system. In addition, any accepted recommendations are then immediately sent to the ACD server for processing, such as via an API message to the ACD server, described in further detail below.

VIII. Implementing a Staffing Change

According to various example embodiments and as previously discussed, implementing a staffing change determined by the queue recommendation engine could involve any of a number of configurable or non-configurable possibilities along a spectrum ranging from (a) full approval required before implementation/execution of the determined staffing change, to (b) approval offered, but not required, before implementation/execution of the determined staffing change, to (c) pre-approval conditions specified, to (d) notification of the determined staffing change to be made in the near future (e.g., in 10 minutes), with or without an option to cancel or edit, to (e) automatic implementation of the determined staffing change without any approval or notification sought or required or even allowed. In some example embodiments, the approval settings (if any) could be switched or configured during operation and/or during setup. The approval and/or notification of a determined staffing change may involve the system (e.g., the queue recommendation engine) communicating with a user, such as an administrator instance 344, via a GUI presented via a web portal/dashboard, with any recommendation approval/notification details.

In the case of a determined staffing change for which no approval is required or no approval is sought (auto-implemented staffing changes), or for which the determined staffing change has been presented as a recommendation and has been approved, the system implements the staffing change by sending it to the respective ACD server instance for processing. For some ACD providers, such as Avaya™, Five9™, and others, an API request to add or remove a queue to a computing device instance (e.g., a logged-in user) requires at least variations of the following items: a computing device instance's cross-reference ID for that instance, the Queue #/ID to be added or removed, and, for added queues, the priority level. For other ACD providers, such as Genesys™ and others, an API request to add or remove a queue to a computing device instance (e.g., a logged-in user) requires at least variations of the following items: a computing device instance's cross-reference ID for that instance, an associated Skill ID, as configured for the queue in the queue targets settings (described elsewhere herein), and, for added queues, a Minimum Skill Proficiency, as configured for the queue in the queue targets settings. Other ACD providers may require other information to effect a determined staffing change; such information is generally made available by ACD providers in their detailed API requirements.

IX. Reporting and Dashboards

A variety of reports and dashboards may be populated and displayed using data utilized by and output from the system. FIGS. 15, 16, 17, 18, 19, and 20 illustrate example report data, in the form of data fields, data formats, and notes regarding each data field, that may be prepared by one or more computing devices executing computer-readable instructions using data (described above) stored on one or more storage devices. The example reports include the following: enterprise queue optimizer activity summary (FIG. 15), enterprise queue optimizer activity detail (FIG. 16), individual queue recommendation summary (FIG. 17), individual queue recommendation detail (FIG. 18), individual user recommendation summary (FIG. 19), and individual user recommendation detail (FIG. 20). The reports may be accessible to one or more users via a display associated with a computing device. While the illustrated reports are in tabular form (shown with data fields, data formats, and notes, rather than actual example data), other presentation types, such as graphs and other visualizations, may be included or substituted, as appropriate for the information being displayed and/or for the particular display device(s) being utilized.

X. Example Computing Device and Server Cluster

Figure 21:
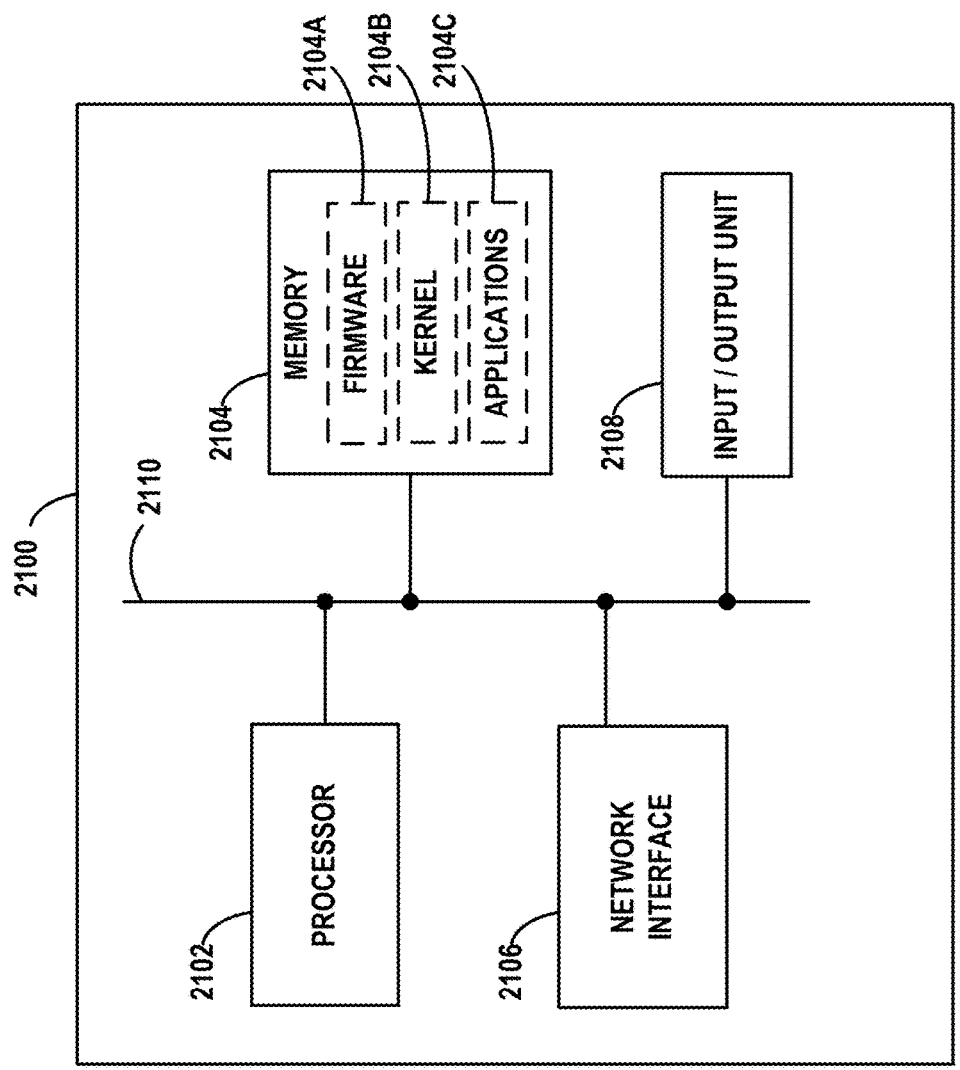
FIG. 21 is a block diagram illustrating a computing device, according to an example embodiment.

FIG. 21 is a simplified block diagram showing a computing device 2100, illustrating some of the components that could be included in a computing device arranged to operate in accordance with the embodiments herein. Computing device 2100 could be a client device (e.g., a computing device instance or a device actively logged-in to and operated by a user, such an administrative user or a contact center agent), a server device (e.g., a device that provides computational services to client devices), a chatbot (or portion of a chatbot or multiple chatbots), a management network (or management network computing entity or portion of a management network or multiple management networks), or some other type of computational platform. Some server devices may operate as client devices from time to time in order to perform particular operations, and some client devices may incorporate server features.

In this example, computing device 2100 includes processor 2102, memory 2104, network interface 2106, and an input/output unit 2108, all of which may be coupled or otherwise connected, via wires or wirelessly, by a system bus 2110 or a similar mechanism. In some embodiments, computing device 2100 may include other components and/or peripheral devices (e.g., detachable storage, printers, and so on) any or all of which may be co-located in a single housing or distributed across or among more than one housing and/or at more than one location.

Processor 2102 may be one or more of any type of computer processing element, such as a central processing unit (CPU), a co-processor (e.g., a mathematics, graphics, or encryption co-processor), a digital signal processor (DSP), a network processor, a quantum processor, a form of integrated circuit or controller that performs processor operations, and/or other hardware processor, for example. In some cases, processor 2102 may be one or more single-core processors. In other cases, processor 2102 may be one or more multi-core processors with multiple independent processing units. Processor 2102 may also include register memory for temporarily storing instructions being executed and related data, as well as cache memory for temporarily storing recently used instructions and data.

Memory 2104 may be any form of computer-usable storage, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory or other devices or entities able to persist data for short or long time periods, for example.

Memory 2104 may store program instructions and/or data on which program instructions may operate. By way of example, memory 2104 may store these program instructions on a non-transitory, computer-readable medium, such that the instructions are executable by processor 2102 to carry out any of the methods, processes, or operations disclosed in this specification or the accompanying drawings. Such a non-transitory, computer-readable medium may comprise part of an article of manufacture, for example.

As shown in FIG. 21, memory 2104 may include firmware 2104A, kernel 2104B, and/or applications 2104C. Firmware 2104A may be program code used to boot or otherwise initiate some or all of computing device 2100. Kernel 2104B may be an operating system, including modules for memory management, scheduling and management of processes, input/output, and communication. Kernel 2104B may also include device drivers that allow the operating system to communicate with any hardware modules (e.g., memory units, networking interfaces, ports, and buses) of computing device 2100. Applications 2104C may be one or more user-space software programs, such as web browsers, desktop applications (i.e., apps), and email clients, as well as any software libraries used by these programs. For example, Applications 2104C may include a queue recommendation engine and/or a constraint solver application, along with any other supporting applications. Memory 2104 may also store data used by these and other programs and applications.

Network interface 2106 may take the form of one or more wireline interfaces, such as Ethernet (e.g., Fast Ethernet, Gigabit Ethernet, and so on). Network interface 2106 may also support communication over one or more non-Ethernet media, such as coaxial cables or power lines, or over wide-area media, such as Synchronous Optical Networking (SONET) or digital subscriber line (DSL) technologies. Network interface 2106 may additionally take the form of one or more wireless interfaces, such as IEEE 802.11 (Wifi), BLUETOOTH®, global positioning system (GPS), or a wide-area wireless interface. Other forms of physical layer interfaces and other types of standard or proprietary communication protocols may be used over network interface 2106. Furthermore, network interface 2106 may comprise multiple physical interfaces. For instance, some embodiments of computing device 2100 may include Ethernet, BLUETOOTH®, and Wifi interfaces.

Input/output unit 2108 may facilitate user and peripheral device interaction with computing device 2100. Input/output unit 2108 may include one or more types of input devices and/or one or more types of output devices. Input devices may include user input devices, network input devices (see above), sensors, and/or other types of input devices. For example, input devices may include user input devices such as one or more of a remote control, touch screen, keyboard, keypad, computer mouse, trackball, joystick, camera, voice recognition module, and/or other similar device. Example output devices may include user display devices, audible output devices, network output devices (see above), and/or other types of output devices. User display devices may include one or more printing components, liquid crystal displays (LCD), light emitting diodes (LEDs), lasers, displays using digital light processing (DLP) technology, cathode ray tubes (CRT), light bulbs, and/or other similar devices. Audible output devices may include a speaker, speaker jack, audio output port, audio output device, headphones, earphones, and/or other similar devices.

In some embodiments, one or more computing devices like computing device 2100 may be deployed to support various network architectures. The exact physical location, connectivity, and configuration of these computing devices may be unknown and/or unimportant. Accordingly, in some cases, the computing devices may be referred to as "cloud-based" devices that may be housed at various remote data center locations.

Figure 22:
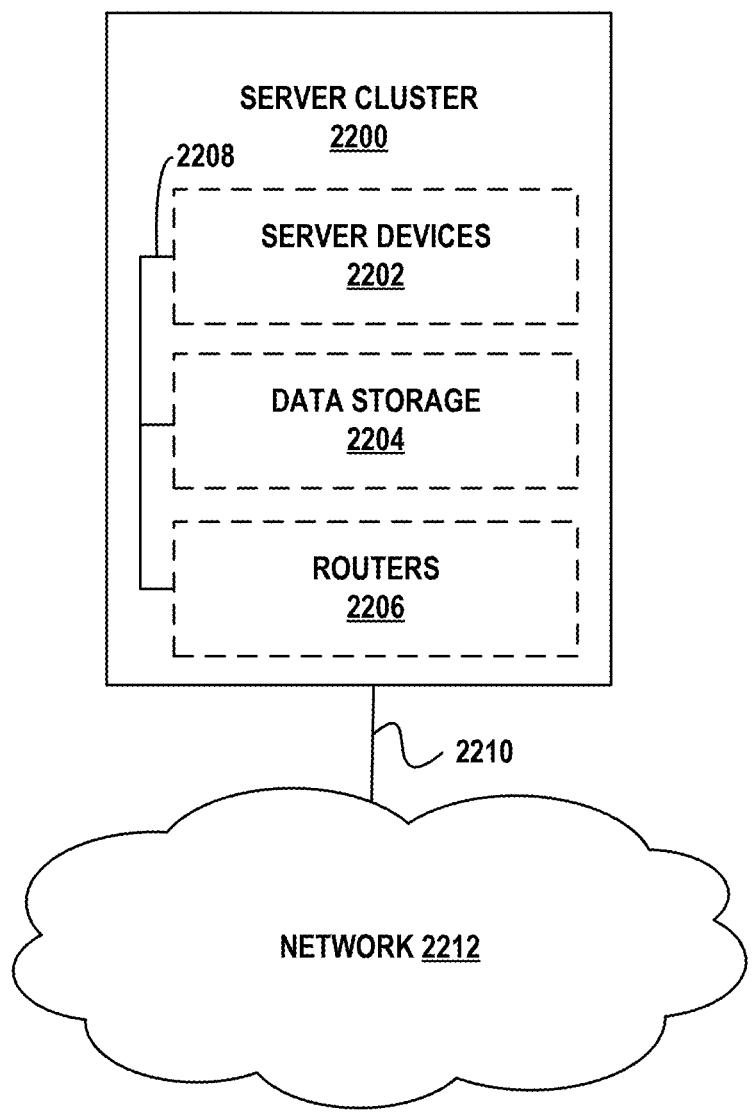
FIG. 22 is a block diagram illustrating a server cluster, according to an example embodiment.

FIG. 22 depicts a cloud-based server cluster 2200 in accordance with example embodiments. In FIG. 22, operations of a computing device (e.g., computing device 2100) may be distributed between server devices 2202, data storage 2204, and routers 2206, all of which may be connected by local cluster network 2208. The number of server devices 2202, data storages 2204, and routers 2206 in server cluster 2200 may depend on the computing task(s) and/or applications assigned to server cluster 2200. Additionally, multiple servers or server clusters, such as from distinct third parties (e.g., enterprise(s), vendor(s), and/or management networks) or affiliated/co-owned parties may be in communication with one another via secure business-to-business (B2B or BTB) VPN connection(s), for example.

For example, server devices 2202 can be configured to perform various computing tasks of computing device 2100. Thus, computing tasks can be distributed among one or more of server devices 2202. To the extent that these computing tasks can be performed in parallel, such a distribution of tasks may reduce the total time to complete these tasks and return a result. Moreover, servers may be organized in a tiered network architecture, such as a two-tier or three-tier network architecture, with tiers being organized as one or more of a web tier (or client tier), an application server tier, and a database server tier. For purpose of simplicity, both server cluster 2200 and individual server devices 2202 may be referred to as a "server device" or, simply, "server." This nomenclature should be understood to imply that one or more distinct server devices, data storage devices, and cluster routers may be involved in server device operations.

Data storage 2204 may be data storage arrays that include drive array controllers configured to manage read and write access to groups of hard disk drives and/or solid state drives, for example. The drive array controllers, alone or in conjunction with server devices 2202, may also be configured to manage backup or redundant copies of the data stored in data storage 2204 to protect against drive failures or other types of failures that prevent one or more of server devices 2202 from accessing units of data storage 2204. Other types of memory aside from drives may be used. Moreover, data may be accessed using Extract, Transform and Load (ETL) data warehousing techniques, for example, to allow for efficient access to data compiled from different sources. The data storage 2204 may store computer-readable instructions and/or data (e.g., in logical data structures, such as tables or arrays), as described elsewhere herein.

Routers 2206 may include networking equipment configured to provide internal and external communications for server cluster 2200. For example, routers 2206 may include one or more packet-switching and/or routing devices (including switches and/or gateways) configured to provide (i) network communications between server devices 2202 and data storage 2204 via local cluster network 2208, and/or (ii) network communications between the server cluster 2200 and other devices, such as other servers or server clusters, via communication link 2210 to network 2212.

Additionally, the configuration of routers 2206 can be based at least in part on the data communication requirements of server devices 2202 and data storage 2204, the latency and throughput of the local cluster network 2208, the latency, throughput, and cost of communication link 2210, and/or other factors that may contribute to the cost, speed, fault-tolerance, resilience, efficiency, security, and/or other design goals of the system architecture.

As one example, data storage 2204 may include any form of database, such as a structured query language (SQL) database. Various types of data structures may store the information in such a database, including but not limited to tables, arrays, lists, trees, and tuples. Furthermore, any databases in data storage 2204 may be monolithic or distributed across multiple physical devices, such as using an ETL process between an application SQL server and a data warehouse SQL server.

Server devices 2202 may be configured to transmit data to and receive data from data storage 2204. This transmission and retrieval may take the form of SQL queries or other types of database queries, and the output of such queries, respectively. Additional text, images, video, and/or audio may be included as well. Furthermore, server devices 2202 may organize the received data into web page representations. Such a representation may take the form of a markup language, such as the hypertext markup language (HTML), the extensible markup language (XML), or some other standardized or proprietary format. Moreover, server devices 2202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Finally, server devices 2202 may provide Application Program Interfaces (APIs) to allow for and respond to requests for data, in accordance with API definitions.

XI. Example Embodiment Clauses

The following clauses describe some, but not all, of the example embodiments within the scope of the present disclosure:

Clause 1. A method for modifying a queue assignment for a contact center, the method comprising:

receiving, at a first time instance, by at least one computing device, first queue data associated with at least two queues including a first queue and a second queue, the first queue data maintained by an automated call distribution (ACD) server, the at least two queues each comprising an ordering of respective tasks to be handled at computing device instances associated with the contact center, and the computing device instances each having a respective queue assignment to one or more of the at least two queues to handle the respective tasks of each of the at least two queues;

storing, by the at least one computing device, in a storage device accessible by the at least one computing device, the first queue data;

receiving, at a second time instance, by the at least one computing device, second queue data associated with the at least two queues, the second queue data maintained by the ACD server and relating to a time duration spanning between the first time instance and the second time instance;

storing, by the at least one computing device, in the storage device accessible by the at least one computing device, the second queue data;

determining, by the at least one computing device, from the first queue data and the second queue data, first time-based service metrics associated with the first queue and second time-based service metrics associated with the second queue;

determining, by the at least one computing device, from the first time-based service metrics and a first time-based service target associated with the first queue, a first net staffing attribute indicating a first staffing surplus or shortage of the first queue relative to the first time-based service target for a predetermined first service target time period, wherein the first time-based service target is selected from the group consisting of (a) a first average speed of answer (ASA) specifying an average time for one of the computing device instances to initiate handling of a particular task after the particular task has been assigned to the first queue and (b) a first service level specifying a percentage of tasks for which handling is initiated within a specified time frame after the tasks are assigned to the first queue;

determining, by the at least one computing device, from the second time-based service metrics and a second time-based service target associated with the second queue, a second net staffing attribute indicating a second staffing surplus or shortage of the second queue relative to the second time-based service target for a predetermined second service target time period, wherein the first time-based service target is selected from the group consisting of (a) a second average speed of answer (ASA) specifying an average time for one of the computing device instances to initiate handling of a particular task after the particular task has been assigned to the second queue and (b) a second service level specifying a percentage of tasks for which handling is initiated within a specified time frame after the tasks are assigned to the second queue;

determining, by the at least one computing device, using as inputs (a) the first time-based service metrics, (b) the second time-based service metrics, (c) data describing eligible staffing changes, and (d) at least one predetermined constraint, at least one staffing change for at least one of the first queue or the second queue, wherein the at least one staffing change is a modification to the queue assignment of a subset of the computing device instances that is predicted to improve at least one of the first net staffing attribute or the second net staffing attribute; and implementing, by the at least one computing device, the at least one staffing change by modifying the queue assignment of the subset of the computing device instances.

Clause 1a. The method of clause 1, wherein the computing device instances associated with the contact center comprise chat bots.

Clause 1b. The method of clause 1, wherein the computing device instances associated with the contact center comprise computing devices each having a logged-in handling instance. ("handling instance" will be defined in the specification as a human contact center agent).

Clause 2. The method of clause 1, wherein the computing device instances associated with the contact center comprise chat bots and/or computing devices each having a logged-in handling instance.

Clause 3. The method of clause 1, wherein the respective tasks to be handled at the computing device instances associated with the contact center relate to customer communications selected from the following: telephonic communications, chat sessions, email communications, or text message communications.

Clause 4. The method of clause 3, wherein each of the customer communications is assigned by the ACD server to a respective queue of the at least two queues to await handling by one of the computing device instances having a queue assignment that includes the respective queue.

Clause 4a. The method of clause 1, wherein the first time instance and the second time instance define an interval spanning less than a single day.

Clause 4b. The method of clause 1, wherein the interval between the first time instance and the second time instance spans 30 minutes.

Clause 4c. The method of clause 1, wherein the at least two queues include at least one queue having an associated skill, and wherein a computing device instance of the computing device instances can only be assigned to that at least one queue if that computing device instance comprises the associated skill.

Clause 4d. The method of clause 4c, wherein the data describing eligible staffing changes includes the associated skill.

Clause 4e. The method of clause 1, wherein the first queue data and the second queue data include data selected from the following: number of calls offered in last interval, number of calls answered in last interval, service level percentage in last interval, average speed of answer (ASA) in last interval, and average handle time (AHT) in last interval.

Clause 4f. The method of clause 4e, wherein the first queue data and the second queue data include a first subset of data received from the ACD server and a second subset of data aggregated and/or calculated from the first subset of data.

Clause 5. The method of clause 1, wherein the first time-based service target and the second time-based service target relate to contractual obligations of the contact center to maintain specified service levels over respective predetermined service time periods.

Clause 6. The method of clause 5, wherein the respective predetermined service time periods are selected from daily, monthly, quarterly or annually.

Clause 7. The method of clause 1, wherein the first time-based service target and the second time-based service target are selected from the group consisting of (a) an average speed of answer (ASA) specifying an average time for one of the computing device instances to initiate handling of a particular task after the particular task has been assigned to one of the at least two queues and (b) a service level specifying a percentage of tasks for which handling is initiated within a specified time frame after the tasks are assigned to one of the at least two queues.

Clause 7a. The method of clause 1, wherein the first time-based service target and the second time-based service target are selected from the group consisting of (a) an average speed of answer (ASA) specifying an average time for an incoming communication to be answered by one of the computing device instances and (b) a service level specifying a percentage of incoming communications that are answered by one of the computing device instances within a specified time frame.

Clause 7b. The method of clause 1, further comprising, prior to implementing the at least one staffing change:
  providing, by the at least one computing device, the at least one staffing change as a graphical representation of at least one recommended staffing change, for display on a display device; and
  receiving, by the at least one computing device, an approval of the at least one recommended staffing change displayed on the display device.

Clause 8. The method of clause 1, wherein the at least one predetermined constraint includes a user-defined constraint selected from the group consisting of constraints relating to (a) queue priority or (b) fairness preferences involving computing device instances.

Clause 9. The method of clause 8, wherein the constraints relating to queue priority are selected from (a) an allowed staffing change type, (b) a queue fill strategy, (c) a requirements model, or (d) a requirements buffer percentage.

Clause 10. The method of clause 8, wherein the constraints relating to fairness preferences involving computing device instances are selected from (a) a maximum number of queue assignments for each of the computing device instances, (b) a maximum number of staffing changes over a predetermined time period for each of the computing device instances, (c) a maximum number of changes in queue assignment per staffing change for each of the computing device instances, or (d) a maximum occupancy percentage for each of the computing device instances.

Clause 10a. The method of clause 1, wherein the at least one predetermined constraint includes a non-user-defined constraint requiring that computing device instances be qualified for any queue assignments resulting from the staffing change.

Clause 10b. The method of clause 10a, wherein the non-user-defined constraint is based on information selected from historical queue associations or a listing of the computing device instances and associated queues for which each of the computing device instances is eligible to receive a queue assignment.

Clause 10c. The method of clause 1, wherein the at least one predetermined constraint includes a user-defined constraint and a non-user-defined constraint, wherein the user-defined constraint and the non-user-defined constraint differ from one another.

Clause 10d. The method of clause 1, wherein the at least one predetermined constraint includes a hard constraint that cannot be violated by the determined at least one staffing change.

Clause 10e. The method of clause 1, wherein the at least one predetermined constraint includes a soft constraint that can be violated by the determined at least one staffing change only if necessary in order to determine the at least one staffing change.

Clause 10f. The method of clause 1, wherein implementing the at least one staffing change comprises the at least one computing device communicating the at least one staffing change to the ACD server.

Clause 10g. The method of clause 1, wherein implementing the at least one staffing change comprises:
  providing, by the at least one computing device, the at least one staffing change as a staffing change recommendation; and
  communicating, by the at least one computing device and to the ACD server, the at least one staffing change only upon receiving an approval of the staffing change recommendation.

Clause 10 h. The method of clause 1, wherein implementing the at least one staffing change comprises the at least one computing device communicating the at least one staffing change to the ACD server immediately upon determining the at least one staffing change, without awaiting any approval.

Clause 10i. The method of clause 1, wherein determining the at least one staffing change comprises:
  determining whether either the first net staffing attribute associated with the first queue or the second net staffing attribute associated with the second queue has a negative value relative to the other;
  upon determining that the first net staffing attribute or the second network staffing attribute has a negative value relative to the other, iteratively calculating predicted first net staffing attributes for the first queue and predicted second net staffing attributes for the second queue in response to respective candidate staffing increments to the respective first queue or second queue for which the first net staffing attribute or the second network staffing attribute has the negative value to the other, wherein the candidate staffing increments are only iterated to the extent that the candidate staffing increments would not violate the at least one predetermined hard constraint; and selecting one of the respective candidate staffing increments that results in the predicted first net staffing attribute or the predicted second net staffing attribute having a reduced negative value relative to the other compared to the negative value of the first net staffing attribute and the second network staffing attribute relative to one another.

Clause 10j. The method of clause 1, wherein determining the at least one staffing change comprises the at least one computing device solving a constraint optimization problem having as inputs the at least one predetermined constraint, the first net staffing attribute, the second net staffing attribute.

Clause 10k. The method of clause 1, wherein the at least one computing device is part of a management network, wherein the computing device instances are part of an enterprise network associated with the contact center, and wherein the management network performs operations relating to modifying queue assignments on behalf of the enterprise network.

Clause 10l. The method of clause 1, wherein the at least one computing device and the computing device instances are part of an enterprise network associated with the contact center.

Clause 10m. The method of clause 1, further comprising accessing schedule information for the computing device instances for use in relation to the data describing eligible staffing changes.

Clause 10n. The method of clause 1, wherein determining the at least one staffing change further comprises utilizing a competency score associated with each of the computing device instances, the competency score indicating past performance relative to other computing device instances.

Clause 10o. The method of clause 10m, wherein the at least one computing device utilizes the competency score to assist in prioritizing computing device instances relative to one another for the at least one staffing change.

Clause 11. A system for modifying a queue assignment for a contact center, the system comprising:
  one or more hardware processors on one or more computing devices, the processors configured to execute instructions stored on at least one non-transitory computer readable medium to perform tasks including:
    receiving, at a first time instance, by the at least one computing device, first queue data associated with at least two queues including a first queue and a second queue, the first queue data maintained by an automated call distribution (ACD) server, the at least two queues each comprising an ordering of respective tasks to be handled at computing device instances associated with the contact center, and the computing device instances each having a respective queue assignment to one or more of the at least two queues to handle the respective tasks of each of the at least two queues;
    storing, by the at least one computing device, in a storage device accessible by the at least one computing device, the first queue data;
    receiving, at a second time instance, by the at least one computing device, second queue data associated with the at least two queues, the second queue data maintained by the ACD server and relating to a time duration spanning between the first time instance and the second time instance;
    storing, by the at least one computing device, in the storage device accessible by the at least one computing device, the second queue data;
    determining, by the at least one computing device, from the first queue data and the second queue data, first time-based service metrics associated with the first queue and second time-based service metrics associated with the second queue;
    determining, by the at least one computing device, from the first time-based service metrics and a first time-based service target associated with the first queue, a first net staffing attribute indicating a first staffing surplus or shortage of the first queue relative to the first time-based service target for a predetermined first service target time period;
    determining, by the at least one computing device, from the second time-based service metrics and a second time-based service target associated with the second queue, a second net staffing attribute indicating a second staffing surplus or shortage of the second queue relative to the second time-based service target for a predetermined second service target time period;
    determining, by the at least one computing device, using as inputs (a) the first time-based service metrics, (b) the second time-based service metrics, (c) data describing eligible staffing changes, and (d) at least one predetermined constraint, at least one staffing change for at least one of the first queue or the second queue, wherein the at least one staffing change is a modification to the queue assignment of a subset of the computing device instances that is predicted to improve at least one of the first net staffing attribute or the second net staffing attribute; and
    implementing, by the at least one computing device, the at least one staffing change by modifying the queue assignment of the subset of the computing device instances.

Clause 12. The system of clause 11, wherein the computing device instances associated with the contact center comprise chat bots and/or computing devices each having a logged-in handling instance.

Clause 13. The system of clause 11, wherein the respective tasks to be handled at the computing device instances associated with the contact center relate to customer communications selected from the following: telephonic communications, chat sessions, email communications, or text message communications.

Clause 14. The system of clause 13, wherein each of the customer communications is assigned by the ACD server to a respective queue of the at least two queues to await handling by one of the computing device instances having a queue assignment that includes the respective queue.

Clause 15. The system of clause 11, wherein the first time-based service target and the second time-based service target relate to contractual obligations of the contact center to maintain specified service levels over respective predetermined service time periods.

Clause 16. The system of clause 15, wherein the respective predetermined service time periods are selected from daily, monthly, quarterly, or annually.

Clause 17. The system of clause 11, wherein the first time-based service target and the second time-based service target are selected from the group consisting of (a) an average speed of answer (ASA) specifying an average time for one of the computing device instances to initiate handling of a particular task after the particular task has been assigned to one of the at least two queues and (b) a service level specifying a percentage of tasks for which handling is initiated within a specified time frame after the tasks are assigned to one of the at least two queues.

Clause 18. The system of clause 11, wherein the at least one predetermined constraint includes a user-defined constraint selected from the group consisting of constraints relating to (a) queue priority or (b) fairness preferences involving computing device instances.

Clause 19. The system of clause 18, wherein the constraints relating to queue priority are selected from (a) an allowed staffing change type, (b) a queue fill strategy, (c) a requirements model, or (d) a requirements buffer percentage.

Clause 20. The system of clause 18, wherein the constraints relating to fairness preferences involving computing device instances are selected from (a) a maximum number of queue assignments for each of the computing device instances, (b) a maximum number of staffing changes over a predetermined time period for each of the computing device instances, (c) a maximum number of changes in queue assignment per staffing change for each of the computing device instances, or (d) a maximum occupancy percentage for each of the computing device instances.

Clause 21. An article of manufacture including a non-transitory computer-readable medium, having stored thereon program instructions that, upon execution by one or more hardware processors in at least one computing device, cause the one or more processors to perform tasks comprising:
  receiving, at a first time instance, by at least one computing device, first queue data associated with at least two queues including a first queue and a second queue, the first queue data maintained by an automated call distribution (ACD) server, the at least two queues each comprising an ordering of respective tasks to be handled at computing device instances associated with the contact center, and the computing device instances each having a respective queue assignment to one or more of the at least two queues to handle the respective tasks of each of the at least two queues;
  storing, by the at least one computing device, in a storage device accessible by the at least one computing device, the first queue data;
  receiving, at a second time instance, by the at least one computing device, second queue data associated with the at least two queues, the second queue data maintained by the ACD server and relating to a time duration spanning between the first time instance and the second time instance;
  storing, by the at least one computing device, in the storage device accessible by the at least one computing device, the second queue data;
  determining, by the at least one computing device, from the first queue data and the second queue data, first time-based service metrics associated with the first queue and second time-based service metrics associated with the second queue;
  determining, by the at least one computing device, from the first time-based service metrics and a first time-based service target associated with the first queue, a first net staffing attribute indicating a first staffing surplus or shortage of the first queue relative to the first time-based service target for a predetermined first service target time period;
  determining, by the at least one computing device, from the second time-based service metrics and a second time-based service target associated with the second queue, a second net staffing attribute indicating a second staffing surplus or shortage of the second queue relative to the second time-based service target for a predetermined second service target time period;
  determining, by the at least one computing device, using as inputs (a) the first time-based service metrics, (b) the second time-based service metrics, (c) data describing eligible staffing changes, and (d) at least one predetermined constraint, at least one staffing change for at least one of the first queue or the second queue, wherein the at least one staffing change is a modification to the queue assignment of a subset of the computing device instances that is predicted to improve at least one of the first net staffing attribute or the second net staffing attribute; and
  implementing, by the at least one computing device, the at least one staffing change by modifying the queue assignment of the subset of the computing device instances.

Clause 22. The article of manufacture of clause 21, wherein the computing device instances associated with the contact center comprise chat bots and/or computing devices each having a logged-in handling instance.

Clause 23. The article of manufacture of clause 21, wherein the respective tasks to be handled at the computing device instances associated with the contact center relate to customer communications selected from the following: telephonic communications, chat sessions, email communications, or text message communications.

Clause 24. The article of manufacture of clause 23, wherein each of the customer communications is assigned by the ACD server to a respective queue of the at least two queues to await handling by one of the computing device instances having a queue assignment that includes the respective queue.

Clause 25. The article of manufacture of clause 21, wherein the first time-based service target and the second time-based service target relate to contractual obligations of the contact center to maintain specified service levels over respective predetermined service time periods.

Clause 26. The article of manufacture of clause 15, wherein the respective predetermined service time periods are selected from daily, monthly, quarterly, or annually.

Clause 27. The article of manufacture of clause 21, wherein the first time-based service target and the second time-based service target are selected from the group consisting of (a) an average speed of answer (ASA) specifying an average time for one of the computing device instances to initiate handling of a particular task after the particular task has been assigned to one of the at least two queues and (b) a service level specifying a percentage of tasks for which handling is initiated within a specified time frame after the tasks are assigned to one of the at least two queues.

Clause 28. The article of manufacture of clause 21, wherein the at least one predetermined constraint includes a user-defined constraint selected from the group consisting of constraints relating to (a) queue priority or (b) fairness preferences involving computing device instances.

Clause 29. The article of manufacture of clause 28, wherein the constraints relating to queue priority are selected from (a) an allowed staffing change type, (b) a queue fill strategy, (c) a requirements model, or (d) a requirements buffer percentage.

Clause 30. The article of manufacture of clause 28, wherein the constraints relating to fairness preferences involving computing device instances are selected from (a) a maximum number of queue assignments for each of the computing device instances, (b) a maximum number of staffing changes over a predetermined time period for each of the computing device instances, (c) a maximum number of changes in queue assignment per staffing change for each of the computing device instances, or (d) a maximum occupancy percentage for each of the computing device instances.

Clause 31. A system for optimizing agent queue assignments in a contact center, the system comprising:
  a contact center network having a plurality of agents each assigned to a respective subset of a plurality of queues of incoming customer communications to be handled on behalf of the contact center, wherein the contact center network utilizes at least one automated call distribution (ACD) server that maintains a listing of agents in the plurality of agents that are assigned to each of the plurality of queues, assigns the incoming customer communications to the plurality of queues, and routes the incoming customer communications to the plurality of agents via the plurality of queues; and a management network configured to:
- receive, at pre-defined intervals over a prescribed time period, queue statistics and agent-to-queue associations for each pre-defined interval;
- calculate cumulative and historical queue statistics and historical agent-to-queue associations from the received queue statistics and agent-to-queue associations;
- determine a net staffing characterization for each of the plurality of queues for the prescribed time period;
- maintaining a database of constraints on agent queue changes, wherein the constraints include configurable constraints defined by the contact center network and non-configurable constraints defined by the management network;
- feeding as inputs into a constraint solver module (a) queue analysis statistics, (b) a listing of eligible agents, (c) a listing of qualified agents by queue, and (d) at least one service target;
- receiving as outputs from the constraint solver module, at least one recommended queue assignment change selected from a recommendation by queue or a recommendation by agent, wherein the recommended queue assignment change is predicted to improve the net staffing characterization for at least one of the plurality of queues thereby increasing a probability that the at least one service target is realized;
- transmitting the at least one recommended queue assignment change to the contact center network; and
- transmitting a command to the ACD server to effect the at least one recommended queue assignment change.

Clause 32. The system of clause 31, wherein the contact center network is configured to automatically approve recommended queue assignment changes without any human interaction, thereby causing the management network to implement the at least one recommended queue assignment change without awaiting approval.

Clause 33. The system of clause 31, wherein, after transmitting the at least one recommended queue assignment change to the contact center, the management network only transmits the command to the ACD server awaits approval upon receiving approval of the at least one recommended queue assignment change.

XII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium. Moreover, a step or block that represents one or more information transmissions can correspond to information transmissions between software and/or hardware modules in the same physical device. However, other information transmissions can be between software modules and/or hardware modules in different physical devices.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device. One example of a computer readable medium includes cloud-based data storage.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

The various aspects and embodiments disclosed herein are for purpose of illustration and are not intended to be limiting, with the true scope being indicated by the following claims.

The invention claimed is:

1. A method for modifying a queue assignment for a contact center, the method comprising:
   receiving, at a first time instance, by at least one computing device, first queue data associated with at least two queues including a first queue and a second queue, the first queue data maintained by an automated call distribution (ACD) server, the at least two queues each comprising an ordering of respective tasks to be handled at computing device instances associated with the contact center, and the computing device instances each having a respective queue assignment to one or more of the at least two queues to handle the respective tasks of each of the at least two queues;
   storing, by the at least one computing device, in a storage device accessible by the at least one computing device, the first queue data;
   receiving, at a second time instance, by the at least one computing device, second queue data associated with the at least two queues, the second queue data maintained by the ACD server and relating to a time duration spanning between the first time instance and the second time instance;
   storing, by the at least one computing device, in the storage device accessible by the at least one computing device, the second queue data;
   determining, by the at least one computing device, from the first queue data and the second queue data, first time-based service metrics associated with the first queue and second time-based service metrics associated with the second queue;
   determining, by the at least one computing device, from the first time-based service metrics and a first time-based service target associated with the first queue, a first net staffing attribute indicating a first staffing surplus or shortage of the first queue relative to the first time-based service target for a predetermined first service target time period, wherein the first time-based service target is selected from the group consisting of (a) a first average speed of answer (ASA) specifying an average time for one of the computing device instances to initiate handling of a particular task after the particular task has been assigned to the first queue and (b) a first service level specifying a percentage of tasks for which handling is initiated within a specified time frame after the tasks are assigned to the first queue;
   determining, by the at least one computing device, from the second time-based service metrics and a second time-based service target associated with the second queue, a second net staffing attribute indicating a second staffing surplus or shortage of the second queue relative to the second time-based service target for a predetermined second service target time period, wherein the second time-based service target is selected from the group consisting of (a) a second average speed of answer (ASA) specifying an average time for one of the computing device instances to initiate handling of a particular task after the particular task has been assigned to the second queue and (b) a second service level specifying a percentage of tasks for which handling is initiated within a specified time frame after the tasks are assigned to the second queue;
   determining, by the at least one computing device, using as inputs (a) the first time-based service metrics, (b) the second time-based service metrics, (c) data describing eligible staffing changes, and (d) at least one predetermined constraint, at least one staffing change for at least one of the first queue or the second queue, wherein the at least one staffing change is a modification to the queue assignment of a subset of the computing device instances that is predicted to improve at least one of the first net staffing attribute or the second net staffing attribute; and
   implementing, by the at least one computing device, the at least one staffing change by modifying the queue assignment of the subset of the computing device instances.

2. The method of claim 1, wherein the computing device instances associated with the contact center comprise chat bots and/or computing devices each having a logged-in handling instance.

3. The method of claim 1, wherein the respective tasks to be handled at the computing device instances associated with the contact center relate to customer communications selected from the following: telephonic communications, chat sessions, email communications, or text message communications.

4. The method of claim 3, wherein each of the customer communications is assigned by the ACD server to a respective queue of the at least two queues to await handling by one of the computing device instances having a queue assignment that includes the respective queue.

5. The method of claim 1, wherein the first time-based service target and the second time-based service target relate to contractual obligations of the contact center to maintain specified service levels over respective predetermined service time periods.

6. The method of claim 5, wherein the respective predetermined service time periods are selected from daily, monthly, quarterly, or annually.

7. The method of claim 1, wherein the first time-based service target and the second time-based service target are selected from the group consisting of (a) an average speed of answer (ASA) specifying an average time for one of the computing device instances to initiate handling of a particular task after the particular task has been assigned to one of the at least two queues and (b) a service level specifying a percentage of tasks for which handling is initiated within a specified time frame after the tasks are assigned to one of the at least two queues.

8. The method of claim 1, wherein the at least one predetermined constraint includes a user-defined constraint selected from the group consisting of constraints relating to (a) queue priority or (b) fairness preferences involving computing device instances.

9. The method of claim 8, wherein the constraints relating to queue priority are selected from (a) an allowed staffing change type, (b) a queue fill strategy, (c) a requirements model, or (d) a requirements buffer percentage.

10. The method of claim 8, wherein the constraints relating to fairness preferences involving computing device instances are selected from (a) a maximum number of queue assignments for each of the computing device instances, (b) a maximum number of staffing changes over a predetermined time period for each of the computing device instances, (c) a maximum number of changes in queue assignment per staffing change for each of the computing device instances, or (d) a maximum occupancy percentage for each of the computing device instances.

11. A system for modifying a queue assignment for a contact center, the system comprising:
one or more hardware processors on one or more computing devices, the processors configured to execute instructions stored on at least one non-transitory computer readable medium to perform tasks including:
receiving, at a first time instance, by the at least one computing device, first queue data associated with at least two queues including a first queue and a second queue, the first queue data maintained by an automated call distribution (ACD) server, the at least two queues each comprising an ordering of respective tasks to be handled at computing device instances associated with the contact center, and the computing device instances each having a respective queue assignment to one or more of the at least two queues to handle the respective tasks of each of the at least two queues;
storing, by the at least one computing device, in a storage device accessible by the at least one computing device, the first queue data;
receiving, at a second time instance, by the at least one computing device, second queue data associated with the at least two queues, the second queue data maintained by the ACD server and relating to a time duration spanning between the first time instance and the second time instance;
storing, by the at least one computing device, in the storage device accessible by the at least one computing device, the second queue data;
determining, by the at least one computing device, from the first queue data and the second queue data, first time-based service metrics associated with the first queue and second time-based service metrics associated with the second queue;
determining, by the at least one computing device, from the first time-based service metrics and a first time-based service target associated with the first queue, a first net staffing attribute indicating a first staffing surplus or shortage of the first queue relative to the first time-based service target for a predetermined first service target time period;
determining, by the at least one computing device, from the second time-based service metrics and a second time-based service target associated with the second queue, a second net staffing attribute indicating a second staffing surplus or shortage of the second queue relative to the second time-based service target for a predetermined second service target time period;
determining, by the at least one computing device, using as inputs (a) the first time-based service metrics, (b) the second time-based service metrics, (c) data describing eligible staffing changes, and (d) at least one predetermined constraint, at least one staffing change for at least one of the first queue or the second queue, wherein the at least one staffing change is a modification to the queue assignment of a subset of the computing device instances that is predicted to improve at least one of the first net staffing attribute or the second net staffing attribute, wherein the at least one predetermined constraint includes a user-defined constraint that relates to queue priority and is selected from the group consisting of (a) an allowed staffing change type, (b) a queue fill strategy, (c) a requirements model, or (d) a requirements buffer percentage; and
implementing, by the at least one computing device, the at least one staffing change by modifying the queue assignment of the subset of the computing device instances.

12. The system of claim 11, wherein the computing device instances associated with the contact center comprise chat bots and/or computing devices each having a logged-in handling instance.

13. The system of claim 11, wherein the respective tasks to be handled at the computing device instances associated with the contact center relate to customer communications selected from the following: telephonic communications, chat sessions, email communications, or text message communications.

14. The system of claim 13, wherein each of the customer communications is assigned by the ACD server to a respective queue of the at least two queues to await handling by one of the computing device instances having a queue assignment that includes the respective queue.

15. The system of claim 11, wherein the first time-based service target and the second time-based service target relate to contractual obligations of the contact center to maintain specified service levels over respective predetermined service time periods.

16. The system of claim 15, wherein the respective predetermined service time periods are selected from daily, monthly, quarterly, or annually.

17. The system of claim 11, wherein the first time-based service target and the second time-based service target are selected from the group consisting of (a) an average speed of answer (ASA) specifying an average time for one of the computing device instances to initiate handling of a particular task after the particular task has been assigned to one of the at least two queues and (b) a service level specifying a percentage of tasks for which handling is initiated within a specified time frame after the tasks are assigned to one of the at least two queues.

18. The system of claim 11, wherein the at least one predetermined constraint additionally includes a user-defined constraint relating to fairness preferences involving computing device instances.

19. The system of claim 18, wherein the user-defined constraint relating to fairness preferences involving computing device instances is selected from (a) a maximum number of queue assignments for each of the computing device instances, (b) a maximum number of staffing changes over a predetermined time period for each of the computing device instances, (c) a maximum number of changes in queue assignment per staffing change for each of the computing device instances, or (d) a maximum occupancy percentage for each of the computing device instances.

20. An article of manufacture including a non-transitory computer-readable medium, having stored thereon program instructions that, upon execution by one or more hardware processors in at least one computing device, cause the one or more processors to perform tasks comprising:
receiving, at a first time instance, by at least one computing device, first queue data associated with at least two queues including a first queue and a second queue, the first queue data maintained by an automated call distribution (ACD) server, the at least two queues each comprising an ordering of respective tasks to be handled at computing device instances associated with the contact center, and the computing device instances each having a respective queue assignment to one or more of the at least two queues to handle the respective tasks of each of the at least two queues;

storing, by the at least one computing device, in a storage device accessible by the at least one computing device, the first queue data;

receiving, at a second time instance, by the at least one computing device, second queue data associated with the at least two queues, the second queue data maintained by the ACD server and relating to a time duration spanning between the first time instance and the second time instance;

storing, by the at least one computing device, in the storage device accessible by the at least one computing device, the second queue data;

determining, by the at least one computing device, from the first queue data and the second queue data, first time-based service metrics associated with the first queue and second time-based service metrics associated with the second queue;

determining, by the at least one computing device, from the first time-based service metrics and a first time-based service target associated with the first queue, a first net staffing attribute indicating a first staffing surplus or shortage of the first queue relative to the first time-based service target for a predetermined first service target time period;

determining, by the at least one computing device, from the second time-based service metrics and a second time-based service target associated with the second queue, a second net staffing attribute indicating a second staffing surplus or shortage of the second queue relative to the second time-based service target for a predetermined second service target time period;

determining, by the at least one computing device, using as inputs (a) the first time-based service metrics, (b) the second time-based service metrics, (c) data describing eligible staffing changes, and (d) at least one predetermined constraint, at least one staffing change for at least one of the first queue or the second queue, wherein the at least one staffing change is a modification to the queue assignment of a subset of the computing device instances that is predicted to improve at least one of the first net staffing attribute or the second net staffing attribute, wherein the at least one predetermined constraint includes a user-defined constraint that relates to fairness preferences involving computing device instances and is selected from the group consisting of (a) a maximum number of queue assignments for each of the computing device instances, (b) a maximum number of staffing changes over a predetermined time period for each of the computing device instances, (c) a maximum number of changes in queue assignment per staffing change for each of the computing device instances, or (d) a maximum occupancy percentage for each of the computing device instances; and implementing, by the at least one computing device, the at least one staffing change by modifying the queue assignment of the subset of the computing device instances.

21. The article of manufacture of claim 20, wherein the computing device instances associated with the contact center comprise chat bots and/or computing devices each having a logged-in handling instance.

22. The article of manufacture of claim 20, wherein the respective tasks to be handled at the computing device instances associated with the contact center relate to customer communications selected from the following: telephonic communications, chat sessions, email communications, or text message communications.

23. The article of manufacture of claim 22, wherein each of the customer communications is assigned by the ACD server to a respective queue of the at least two queues to await handling by one of the computing device instances having a queue assignment that includes the respective queue.

24. The article of manufacture of claim 20, wherein the first time-based service target and the second time-based service target relate to contractual obligations of the contact center to maintain specified service levels over respective predetermined service time periods.

25. The article of manufacture of claim 15, wherein the respective predetermined service time periods are selected from daily, monthly, quarterly, or annually.

26. The article of manufacture of claim 20, wherein the first time-based service target and the second time-based service target are selected from the group consisting of (a) an average speed of answer (ASA) specifying an average time for one of the computing device instances to initiate handling of a particular task after the particular task has been assigned to one of the at least two queues and (b) a service level specifying a percentage of tasks for which handling is initiated within a specified time frame after the tasks are assigned to one of the at least two queues.

27. The article of manufacture of claim 20, wherein the at least one predetermined constraint additionally includes a user-defined constraint relating to queue priority.

28. The article of manufacture of claim 27, wherein the user-defined constraint relating to queue priority is selected from (a) an allowed staffing change type, (b) a queue fill strategy, (c) a requirements model, or (d) a requirements buffer percentage.

* * * * *